United States Patent [19]

Nakamura

[11] Patent Number: 5,168,373
[45] Date of Patent: Dec. 1, 1992

[54] DIAGNOSTICS SYSTEM FOR USE WITH A RECORDING APPARATUS

[75] Inventor: Hideyasu Nakamura, Kanagawa, Japan

[73] Assignee: Fuji Xerox Corporation, Ltd., Tokyo, Japan

[21] Appl. No.: 631,298

[22] Filed: Dec. 20, 1990

[30] Foreign Application Priority Data

Dec. 21, 1989 [JP] Japan .................................. 1-331946

[51] Int. Cl.⁵ ............................................. H04N 1/40
[52] U.S. Cl. ..................................... 358/406; 358/429
[58] Field of Search ....................... 358/406, 400–401, 358/448, 163, 429, 458, 461, 468, 430

[56] References Cited

U.S. PATENT DOCUMENTS

| 4,660,082 | 4/1987 | Tomohisa et al. | 358/406 |
| 4,903,141 | 2/1990 | Morton et al. | 358/406 |
| 4,965,676 | 10/1990 | Ejiri et al. | 358/406 |
| 4,987,498 | 1/1991 | Shimazaki | 358/429 |

Primary Examiner—Stephen Brinich

Attorney, Agent, or Firm—Finnegan, Henderson, Farabow, Garrett and Dunner

[57] ABSTRACT

A diagnostics system that performs checking, adjustments and other services on a recording apparatus. The system includes an imaging unit having a CCD line sensor assembly, a first board for processing dot sequential color video signals from the CCD line sensor assembly to produce them as digital signals, a second board for converting the dot sequential color video signals from the first board into simultaneous color video signals and for performing shading correction, a third board for performing predetermined image processing on the output from the second board, a fourth board for receiving video signals branched from the third board at predetermined positions to perform predetermined edit processing on the received video signals which are returned to the third board, an image output terminal for receiving the output from the third board, a film projector for projecting a film image, and a user interface. The second board includes a CPU, which performs diagnosis or adjustments on the first through fourth boards and the film projector on the condition that predetermined procedures have been taken on the user interface.

26 Claims, 42 Drawing Sheets

| MEMORY ADDRESS | 0000~00FF | 0100~01FF | 0200~02FF | 0300~03FF | 0400~04FF | 0500~05FF | 0600~06FF | 0700~07FF | 0800~08FF | 0900~09FF | 0A00~0AFF | 0B00~0BFF | 0C00~0CFF | 0D00~0DFF | 0E00~0EFF | 0F00~0FFF | 1000~10FF | 1100~11FF | 1200~12FF | 1300~13FF |
|---|---|---|---|---|---|---|---|---|---|---|---|---|---|---|---|---|---|---|---|---|
| SHC-MEMORY (R) | FF | 00 | 00 | FF | 00 | FF | FF | FF | 00 | 00 | 00 | 00 | FF | FF | FF | 00 | 00 | FF | 00 | FF |
| SHC-MEMORY (G) | FF | 00 | FF | 00 | FF | 00 | FF | FF | 00 | FF | FF | FF | 00 | FF | FF | 00 | FF | 00 | FF | 00 |
| SHC-MEMORY (B) | FF | FF | 00 | 00 | FF | FF | 00 | FF | 00 | 00 | 00 | FF | FF | 00 | FF | 00 | 00 | 00 | FF | FF |

→ FS DIRECTION

FIG. 12(c)

```
DIAGNOSTIC MODE

VIDEO SIGNAL INTERFACE TEST
    PRESS START OR EXIT DC651

PRTRUE              GOOD    IIT LINE SYNC (IPS-A)       GOOD
IOT PAGE SYNC       GOOD    IIT LINE SYNC (IPS-B)       GOOD
IOT LINE SYNC       GOOD    IIT VIDEO CLOCK (IPS-A)     GOOD
IOT BYTE CLOCK      GOOD    IIT VIDEO CLOCK (IPS-B)     GOOD
SCAN READY          GOOD    IIT PAGE SYNC (IMAGE AREA)  GOOD
LEAD EDGE AT REG    GOOD    IMAGE AREA                  GOOD
SENSOR ENABLE       GOOD    WHITE REFERENCE             GOOD

[    ]  EXIT
```

FIG. 13

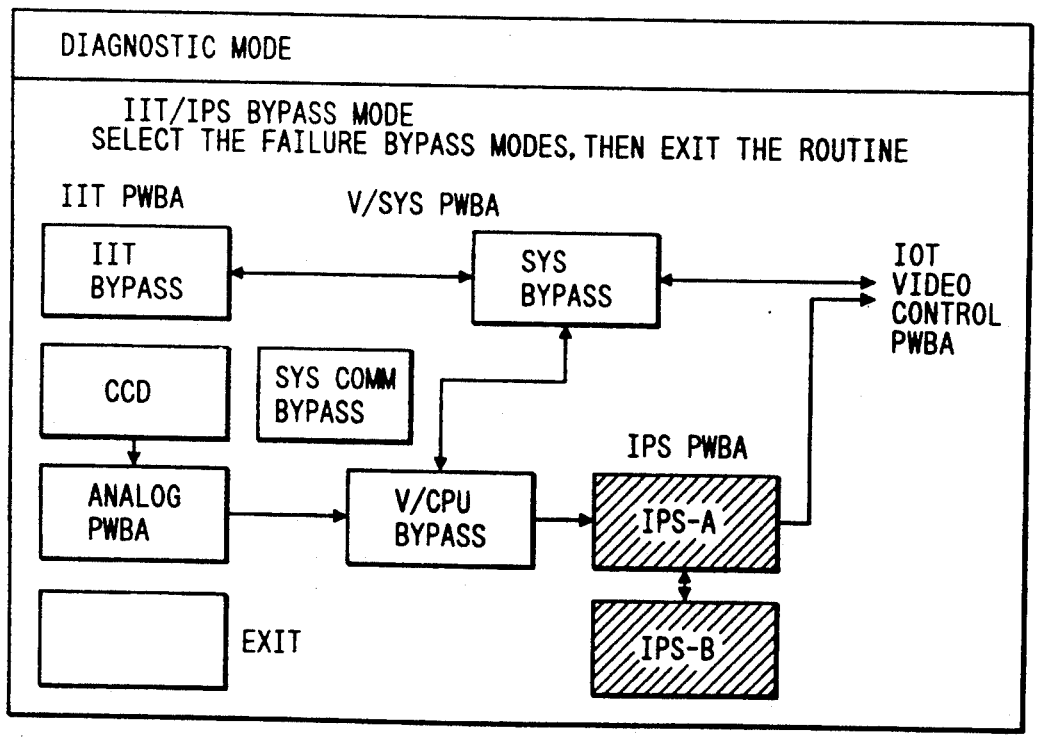

| | |
|---|---|
| $x_{min}$ REGISTER | |
| $x_{max}$ REGISTER | |
| $y_{min}$ REGISTER | |
| $y_{max}$ REGISTER | |
| PLATEN SLICE LEVEL Y REGISTER | |
| PLATEN SLICE LEVEL M REGISTER | |
| PLATEN SLICE LEVEL C REGISTER | |
| DOD START REGISTER | |
| DOD END x REGISTER | |
| DOD END y REGISTER | |

| | |
|---|---|
| VALID AREA Xmin | 0~432mm (IN 1mm STEPS) |
| VALID AREA Xmax | 0~432mm (IN 1mm STEPS) |
| VALID AREA Ymin | 0~300mm (IN 1mm STEPS) |
| VALID AREA Ymax | 0~300mm (IN 1mm STEPS) |
| DOD THRESHOLD | 0 ~ 255 |
| FRAME ERASURE THRESHOLD Y | 0 ~ 255 |
| FRAME ERASURE THRESHOLD M | 0 ~ 255 |
| FRAME ERASURE THRESHOLD C | 0 ~ 255 |
| FRAME ERASURE NOISE FILTER | 0 ~ 4 |
| FRAME ERASURE ADJUSTMENT | 0 ~ 15 |

FIG. 14(i)

```
┌─────────────────────────────────────────────────┐
│ DIAGNOSTIC MODE                                 │
├─────────────────────────────────────────────────┤
│      NVM READ/WRITE/INITIALIZATION              │
│   SELECT THE FUNCTION:                          │
│   ┌─────┐                                       │
│   │     │    NVM READ/WRITE                     │
│   └─────┘                                       │
│   ┌─────┐                                       │
│   │     │    NVM INITIALIZATION                 │
│   └─────┘                                       │
│                                                 │
│                                                 │
│   ┌─────┐                                       │
│   │     │    EXIT                               │
│   └─────┘                                       │
└─────────────────────────────────────────────────┘
```

FIG. 14(j)

```
┌──────────────────────────────────────────────────────┐
│ DIAGNOSTIC MODE                                      │
├──────────────────────────────────────────────────────┤
│      NVM READ/WRITE                                  │
│   1) ENTER NVM LOCATION WITH KEYPAD OR SCROLL        │
│      TO LOCATION WITH UP/DOWN BUTTONS                │
│   2) PRESS "ENTER NVM LOCATION"                      │
│                                                      │
│  ┌─────┐                              ┌───┐  ┌─────┐ │
│  │     │  ENTER NVM LOCATION          │ ▲ │  │ NVM │ │
│  └─────┘                        765 { └───┘  │LOCA-│ │
│  ┌─────┐                              ┌───┐  │TION │ │
│  │     │  CHANGE NVM VALUE            │ ▼ │  │ 100 │ │
│  └─────┘                              └───┘  └─────┘ │
│  ┌─────┐                                     ┌─────┐ │
│  │     │  DISPLAY PREVIOUS SCREEN            │ NVM │ │
│  └─────┘                                     │VALUE│ │
│  ┌─────┐                                     │ 100 │ │
│  │     │  EXIT                               └─────┘ │
│  └─────┘                                             │
└──────────────────────────────────────────────────────┘
```

FIG. 15(a)

| PLATEN AGC CH1 | 0 ~ 99 |
|---|---|
| CH2 | 0 ~ 99 |
| CH3 | 0 ~ 99 |
| CH4 | 0 ~ 99 |
| CH5 | 0 ~ 99 |
| PLATEN AOC CH1 | 0 ~ 255 |
| CH2 | 0 ~ 255 |
| CH3 | 0 ~ 255 |
| CH4 | 0 ~ 255 |
| CH5 | 0 ~ 255 |

FIG. 15(b)

DIAGNOSTIC MODE

AGC AOC ADJUSTMENT MANUAL
TO CHANGE THE NVM VALUE:
1) ENTER NEW VALUE WITH KEYPAD
2) PRESS "ENTER NEW VALUE"

☐ ENTER NEW VALUE

VALUE ENTERED WITH KEYPAP
100

☐ DISPLAY PREVIOUS SCREEN

CURRENT NVM VALUE
100

☐ EXIT     ☐ JOB PROGRAM

FIG. 16(d)

| REGISTERED COLOR 1Y | 0 ~ 255 |
|---|---|
| REGISTERED COLOR 1M | 0 ~ 255 |
| REGISTERED COLOR 1C | 0 ~ 255 |

FIG. 16(e)

| DESIGNATED COLOR 1Y | 0 ~ 255 |
|---|---|
| DESIGNATED COLOR 1M | 0 ~ 255 |
| DESIGNATED COLOR 1C | 0 ~ 255 |

FIG. 16(f)

| STANDARD COLOR 1Y | 0 ~ 255 |
|---|---|
| STANDARD COLOR 1M | 0 ~ 255 |
| STANDARD COLOR 1C | 0 ~ 255 |

FIG. 16(g)

| COLOR DETECTION MARGIN Y | ±a (0~ 255) |
|---|---|
| COLOR DETECTION MARGIN M | ±a (0~ 255) |
| COLOR DETECTION MARGIN C | ±a (0~ 255) |

FIG. 16(h)

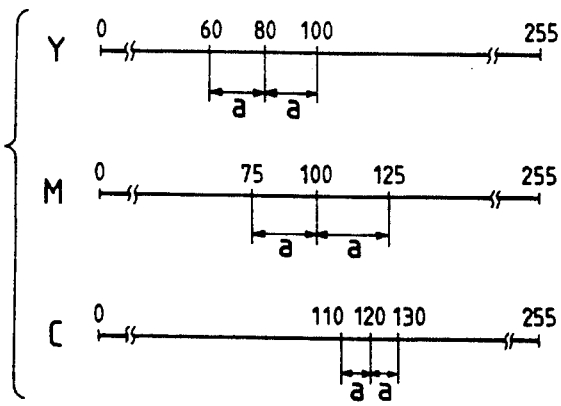

FIG. 16(i)

| RED DETECTION RANGE, UPPER LIMIT FOR Y | 0 ~ 255 |
|---|---|
| RED DETECTION RANGE, LOWER LIMIT FOR Y | 0 ~ 255 |
| RED DETECTION RANGE, UPPER LIMIT FOR M | 0 ~ 255 |
| RED DETECTION RANGE, LOWER LIMIT FOR M | 0 ~ 255 |
| RED DETECTION RANGE, UPPER LIMIT FOR C | 0 ~ 255 |
| RED DETECTION RANGE, LOWER LIMIT FOR C | 0 ~ 255 |

FIG. 16(j)

| MARKER COLOR DETECTION RANGE, UPPER LIMIT FOR Y | 0 ~ 255 |
|---|---|
| MARKER COLOR DETECTION RANGE, LOWER LIMIT FOR Y | 0 ~ 255 |
| MARKER COLOR DETECTION RANGE, UPPER LIMIT FOR M | 0 ~ 255 |
| MARKER COLOR DETECTION RANGE, LOWER LIMIT FOR M | 0 ~ 255 |
| MARKER COLOR DETECTION RANGE, UPPER LIMIT FOR C | 0 ~ 255 |
| MARKER COLOR DETECTION RANGE, LOWER LIMIT FOR C | 0 ~ 255 |

FIG. 17(f)
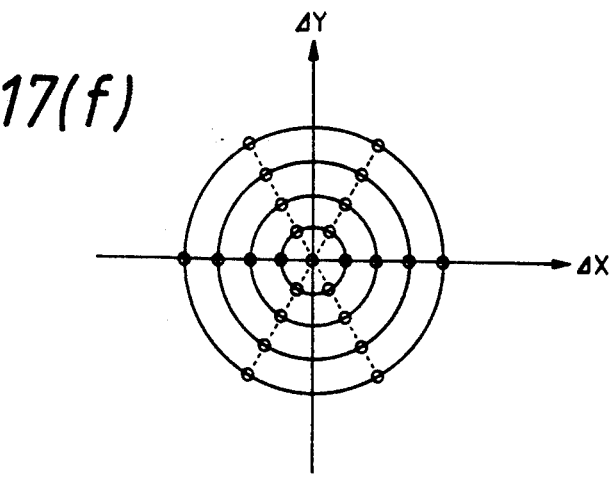
FIG. 17(g)
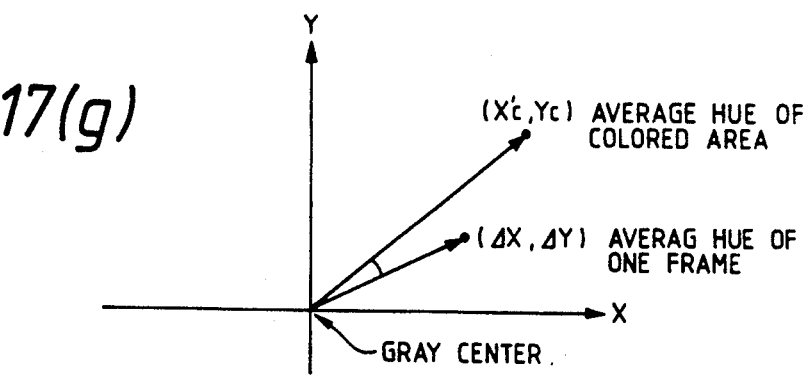
FIG. 17(h)
| FLESH COLOR DENSITY CORRECTING MODE SELECTION | 0 or 1 |
|---|---|

FIG. 18(a)

| FILM SIZE | NEGA/POSI | PROJECTION/CONTACT | VERT./HORI. | MANUFACTURER | SCAN AREA X0 (mm) | SCAN AREA X1 (mm) | SCAN AREA Y0 (mm) | SCAN AREA Y1 (mm) |
|---|---|---|---|---|---|---|---|---|
| 35mm | NEGA | PROJECTION | VERTICAL | A | 183 | 348 | 130 | 240 |
| 35mm | NEGA | PROJECTION | VERTICAL | B | ↑ | ↑ | ↑ | ↑ |
| 35mm | NEGA | PROJECTION | VERTICAL | C | ↑ | ↑ | ↑ | ↑ |
| 35mm | NEGA | PROJECTION | VERTICAL | REGISTERED | ↑ | ↑ | ↑ | ↑ |
| 35mm | NEGA | PROJECTION | VERTICAL | OTHERS | ↑ | ↑ | ↑ | ↑ |
| 35mm | NEGA | PROJECTION | HORIZONTAL | A | 211 | 321 | 103 | 268 |
| 35mm | NEGA | PROJECTION | HORIZONTAL | B | ↑ | ↑ | ↑ | ↑ |
| 35mm | NEGA | PROJECTION | HORIZONTAL | C | ↑ | ↑ | ↑ | ↑ |
| 35mm | NEGA | PROJECTION | HORIZONTAL | REGISTERED | ↑ | ↑ | ↑ | ↑ |
| 35mm | NEGA | PROJECTION | HORIZONTAL | OTHERS | ↑ | ↑ | ↑ | ↑ |
| 35mm | POSI (SLIDE) | PROJECTION | VERTICAL | - | 183 | 348 | 130 | 240 |
| 35mm | POSI (SLIDE) | PROJECTION | HORIZONTAL | - | 211 | 321 | 103 | 268 |
| 35mm | NEGA | CONTACT | FREE | A | 176 | 356 | 95 | 275 |
| 35mm | NEGA | CONTACT | FREE | B | ↑ | ↑ | ↑ | ↑ |
| 35mm | NEGA | CONTACT | FREE | C | ↑ | ↑ | ↑ | ↑ |
| 35mm | NEGA | CONTACT | FREE | REGISTERED | ↑ | ↑ | ↑ | ↑ |
| 35mm | NEGA | CONTACT | FREE | OTHERS | ↑ | ↑ | ↑ | ↑ |
| 6≑6 | POSI | CONTACT | VERTICAL OR HORIZONTAL | - | 226 | 278 | 145 | 197 |
| 4≑5 | POSI | CONTACT | VERTICAL | - | 225 | 342 | 144 | 235 |
| 4≑5 | POSI | CONTACT | HORIZONTAL | - | 225 | 316 | 144 | 261 |

FIG. 18(c)

| | | |
|---|---|---|
| FP SCAN AREA CORRECTION, 35mm, PROJECTION, VERTICAL | $\pm X_0$ | $\pm 10$mm (IN 1mm STEPS) |
| ↑ | $\pm X_1$ | ↑ |
| ↑ | $\pm Y_0$ | ↑ |
| ↑ | $\pm Y_1$ | ↑ |
| FP SCAN AREA CORRECTION, 35mm, PROJECTION, HORIZONTAL | $\pm X_0$ | ↑ |
| ↑ | $\pm X_1$ | ↑ |
| ↑ | $\pm Y_0$ | ↑ |
| ↑ | $\pm Y_1$ | ↑ |
| FP SCAN AREA CORRECTION, 6×6 SIZE, CONTACT | $\pm X_0$ | $\pm 5$mm (IN 1mm STEPS) |
| ↑ | $\pm X_1$ | ↑ |
| ↑ | $\pm Y_0$ | ↑ |
| ↑ | $\pm Y_1$ | ↑ |
| FP SCAN AREA CORRECTION, 4×5 SIZE, VERTICAL | $\pm X_0$ | ↑ |
| ↑ | $\pm X_1$ | ↑ |
| ↑ | $\pm Y_0$ | ↑ |
| ↑ | $\pm Y_1$ | ↑ |
| FP SCAN AREA CORRECTION, 4×5 SIZE, HORIZONTAL | $\pm X_0$ | ↑ |
| ↑ | $\pm X_1$ | ↑ |
| ↑ | $\pm Y_0$ | ↑ |
| ↑ | $\pm Y_1$ | ↑ |

DIAGNOSTICS SYSTEM FOR USE WITH A RECORDING APPARATUS

BACKGROUND OF THE INVENTION

1. Field of the Invention

The present invention relates to a diagnostics system (hereinafter sometimes referred to as "DIAG") that performs checking, adjustments and other services on recording apparatus including copiers, facsimile equipment and printers. More particularly, the present invention relates to a diagnostics system for recording apparatus that reduces the number of steps involved in checking and adjustments by servicemen, thereby shortening the required service time.

2. Discussion of the Related Art

With the aid of computers, modern recording apparatus including copiers, facsimile equipment and printers utilize sophisticated control and image data processing techniques to provide high image quality and multiple functions. The improvements in machine reliability have also been so remarkable that those recording apparatus are currently used extensively in various fields.

However, for certain reasons, troubles sometimes occur to cause machine shutdown or image deterioration. The causes of such troubles are various and include aging, failure of machine parts that have reached their life, errors in parameter settings, jamming and the loss of toner. With the increasing sophistication and complexity of the control by the hardware and software in modern recording apparatus, users have to rely on servicemen for elimination of all troubles except those which can be easily dealt with by clearing the jam or replenishing the toner. In response to this need of uses, servicemen perform various kinds of checking using testers and other various measuring devices or instruments.

In color copiers that perform digital image processing and which have various editing capabilities, hardware and software control is sophisticated and complex, requiring servicemen to display extremely high skill in eliminating troubles, adjusting the machine and doing other services. However, it is very difficult and hence unrealistic to require servicemen to fulfill these demands. In conventional copiers which use an analog system that performs direct exposure on a photoreceptor through an optical lens, practically no control is effected in the process of forming the latent image of a document in a developing unit. This is in sharp contrast with color copiers that resolve the document image with a CCD line sensor and which digitize associated data to perform various kinds of image processing. With such color copiers, the machine operation can be checked with extracted image data but this requires not only a new device for checking but also the ability of a serviceman to evaluate the status of machine operation on the basis of the extracted image data. It will therefore be understood that color copiers are entirely different from the conventional analog copiers in terms of servicing.

If a serviceman having ordinary skill is asked to service a color copier having sophisticated capabilities, a considerably long time will be spent which increases the machine downtime, or the time during which the machine is disabled. It is therefore important to shorten the time required to service such color copiers. If this can be done, the machine downtime is shortened and one serviceman can attend to more machines, with the result that the service cost and hence the final cost to users is reduced.

SUMMARY OF THE INVENTION

This invention has been achieved under these circumstances and has as its principal object the providing of a diagnostics system with which a serviceman having ordinal skill can complete the servicing of a recording apparatus within a period no longer than about 30 minutes.

Another object of the present invention is to provide a means by which the cause of a trouble in a recording apparatus can be easily located.

Still another object of the present invention is to provide a means of facilitating adjustments of a recording apparatus A further object of the present invention is to provide an inexpensive diagnostic system for use with a recording apparatus.

To attain the aforementioned objects, a diagnostics system for use with a recording apparatus according to the present invention comprises an imaging unit having a CCD line sensor assembly mounted thereon; a first board, for processing dot sequential color video signals from the CCD line sensor assembly to produce them as digital signals; a second board, having a CPU mounted thereon, for converting the dot sequential color video signals from the first board into simultaneous color video signals and for performing shading correction; a third board, for performing predetermined image processing on the output from the second board; a fourth board for receiving video signals branched from the third board at predetermined positions to perform predetermined edit processing on the received video signals which are returned to the third board at predetermined positions; an image output terminal for receiving the output from the third board; a film projector for projecting a film image; and a user interface, wherein the CPU mounted on the second board performs diagnosis or adjustments on the first board, the second board, the third board, the fourth board and the film projector on the condition that predetermined procedures have been taken on the user interface.

BRIEF DESCRIPTION OF THE DRAWINGS

FIGS. 12(a) through 12(c) are diagrams for explaining video interface signal check;

FIG. 13 is a diagram for explaining failure bypass mode;

FIGS. 14(a) through 14(l) are diagrams for explaining DOD level adjustment;

FIGS. 15(a) and 15(b) are diagrams for explaining gain/offset manual adjustments;

FIGS. 16(a) through 16(j) are diagrams for explaining color margin adjustment;

FIGS. 17(a) through 17(h) are diagrams for explaining flesh color density correcting mode selection;

FIGS. 18(a) through 18(d) are diagrams for explaining FP registration adjustment;

DETAILED DESCRIPTION OF THE PREFERRED EMBODIMENTS

Figure 1:
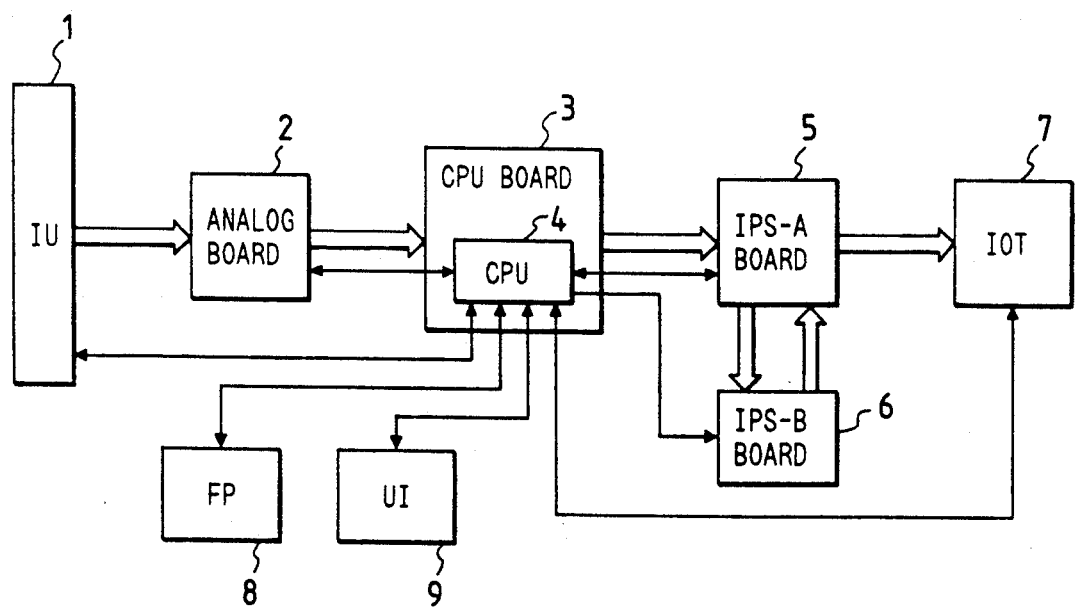
FIG. 1 is a diagram showing an embodiment of an image recording apparatus incorporating the diagnostics system of the present invention.

FIG. 1 is a diagram showing an embodiment of an image recording apparatus incorporating the diagnostics system of the present invention. In FIG. 1, the system comprises an imaging unit (hereinafter abbreviated as "IU"), an analog board 2, a CPU board 3, a CPU 4, an image processing system (hereinafter abbreviated as "IPS") A board 5, an IPS-B board 6, an image output terminal (hereinafter referred to as "IOT") 7, a film projector (hereinafter abbreviated as "FP") 8, and a user interface (hereinafter abbreviated as "UI") 9. Solid lines in FIG. 1 represent the flow of control signals, and open arrows represent the flow of analog or digital video signals.

The system shown in FIG. 1 will operate in the following general manner. IU 1 includes a CCD line sensor assembly that converts reflected light from a light source or a document into an electric signal and which outputs dot sequential color video signals for the three primary colors, B, G and R, as reflectance data, a drive circuit for driving said CCD line sensor assembly, and a drive mechanism for causing the CCD line sensor assembly to move in a subsidiary scanning direction. Dot sequential color video signals which are output from the CCD line sensor assembly are fed into the analog board 2. As will be described later in this specification, the CCD line sensor assembly used in the recording apparatus under consideration comprises five short CCD line sensors that are arranged in a zigzag pattern to realize a long CCD line sensor assembly that is capable of reading information from documents of A3 size.

The analog board 2 has mounted thereon circuits that sample and hold (S/H) analog dot sequential color video signals for the CCD line sensor of each output channel from IU 1, that perform automatic gain control (hereinafter abbreviated as "AGC") and automatic offset control (hereinafter abbreviated as "AOC") and that conduct A/D conversion.

The dot sequential color video signals digitized on the analog board 2 are fed to the CPU board 3 where they are subjected to zigzag correction and color separation/synthesis to produce a simultaneous signal of the three primary colors, which is then subjected to shading correction before it is fed to the IPS-A board 5. The CPU board 3 has mounted thereon the CPU 4 which not only controls the overall operation of the recording apparatus but also executes the DIAG of the present invention.

The simultaneous color video signal from the CPU board 3 is fed to the IPS-A board 5 and the IPS-B board 6, where it is subjected to various desired kinds of image processing before it is fed to the IOT 7 for copying. The IPS which performs various kinds of image processing has to be equipped with a huge volume of hardware and to this end, it is composed of two boards as physical entities, IPS-A board 5 and IPS-B board. If a circuit failure occurs, it is usually repaired by changing individual boards. If the IPS is to be composed of a single board, it is bulky and replacing it after failure will involve considerable cost. However, if the IPS is composed of two boards as in the case under consideration, the cost of individual boards will accordingly decrease. Needless to say, the IPS may be divided into more than two boards but, then, trouble isolation for locating the failing board will require much time. In consideration of this factor, as well as the space for accommodating boards, the IPS in the system under discussionis composed of two boards as shown in FIG. 1.

FP 8 is a device for projecting the image of a film onto a platen so as to enable copying of the film image. UI 9 is composed of a suitable display unit (e.g. a color CRT or a color liquid-crystal display) and a control panel furnished with a ten-key pad and other buttons. Operating the UI 9, the user can set various desired modes such as copy mode, edit function, etc.

In the recording apparatus having the construction described above, CPU 4 is equipped with software modules which at least execute the following DIAG modes with respect to an image input terminal (hereinafter abbreviated as "IIT") including IU 1, as well as IPS on the condition that UI 9 has performed predetermined operations:

(1) D/A converter check mode checking the D/A converters for AGC and AOC to see if it operates normally;

(2) PG (pattern generator) copy mode for performing copying using PGs to isolate troubles on boards;

(3) IPS A/B bypass mode for isolating a trouble on the IPS-A board from a trouble on the IPS-B board;

(4) video interface signal check mode for checking to see if the control signals necessary for copying have been generated;

(5) failure bypass mode for checking to see if any fault has occurred in IPS;

(6) DOD (document detector) level adjustment for adjusting threshold levels for detecting the size and position of a document;

(7) gain/offset manual adjustments for adjusting the gain in AGC and offset in AOD manually;

(8) color adjustment for adjusting threshold levels for color detection during color conversion;

(9) flesh color density correcting mode selection which determines as to whether correction of the density of flesh color should be effected;

(10) FP registration adjustment for adjusting registration during copying using FP;

(11) FP control check for checking to see if FP functions normally; and

(12) FP lamp check for checking to see if the lamp on FP has failed.

According to the present invention, these DIAG modes are executed to insure that a serviceman can isolate or adjust troubles in an easy way to complete the necessary servicing in a short period of time.

An embodiment of the present invention is described below in detail. In the embodiment, description is made with a color copier taken as an example of recording apparatus. Needless to say, this is not the sole example of the present invention and it can also be applied to printers, facsimile equipment and other image recording apparatus.

Before going into detailed description of the embodiment, the overall construction of a color copier to which the present invention is applied, the hardware and software architecture of an electrical control system, a video signal processing circuit, the module composition of IPS, the construction of display screen and the construction of FP are first described below. For the module composition of other systems, the relation between the system and other remotes, the general construction of the imaging unit, the general construction of IOT, the hardware composition of UI and the construction of mirror unit in FP, see the description in U.S. patent application Ser. No. 07/522,892.

Figure 2:
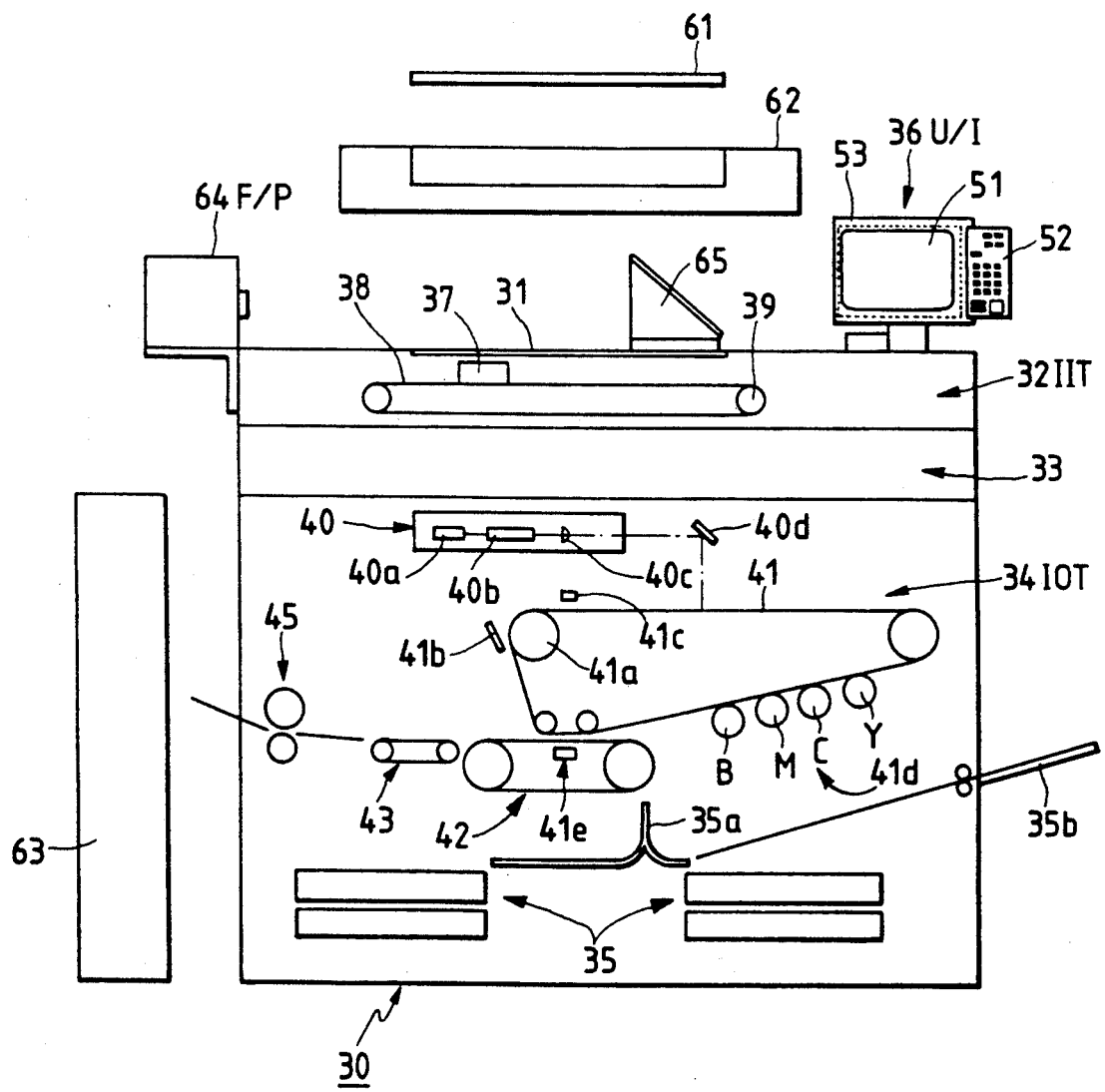
FIG. 2 is a diagram showing an example of the overall construction of a color copier to which the present invention is applied.

FIG. 2 is a diagram showing an example of the overall construction of the color copier to which the present invention is applied. The color copier has a base machine 30 as its main frame and it comprises basically a glass platen 31 on the top of which a document is to be placed, an image input terminal (IIT) 32, an electric control housing 33, an image output terminal (IOT) 34, a receiving tray 35 and a user interface (U/I) 36. The base machine 30 includes the following options: an edit pad 61, an auto-document feeder (ADF) 62, a sorter 63, and a film projector (F/P) 64.

Electrical hardware is necessary to control IIT, IOT, U/I, etc. and such hardware is divided into a plurality of boards as units for performing various kinds of processing with IIT, IPS (for image processing of output signals from IIT), U/I, F/P, etc. These boards are accommodated within the electric control housing 33 together with a SYS board for controlling those boards and an MCB (master control board) board for controlling IOT, ADF, sorter, etc.

The embodiment under description is characterized in that a mirror unit (M/U) 65 is placed on top of the glass platen 31 and that a film image projected from F/P 64 onto the mirror unit 65 is read as an image signal by means of an imaging unit 37 in IIT 32, whereby a color copy can be directly taken from a color film. Documents that can be duplicated with the copier under consideration include negative films, positive films and slides. The copier is also equipped with an auto-focusing mechanism and a correction filter auto-change mechanism.

Figure 3:
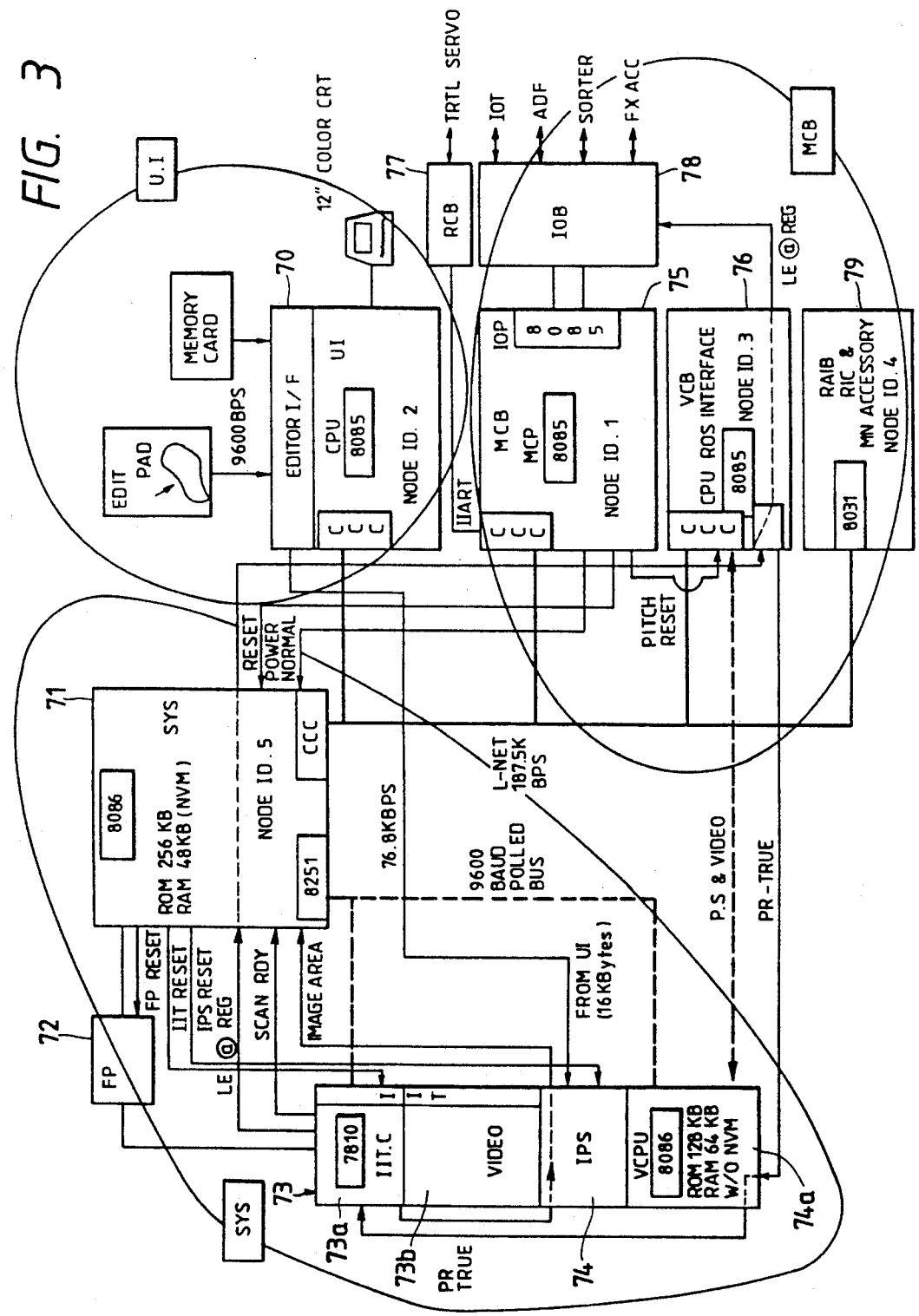
FIG. 3 is a diagram showing the hardware architecture in the copier of FIG. 2.
Figure 4:
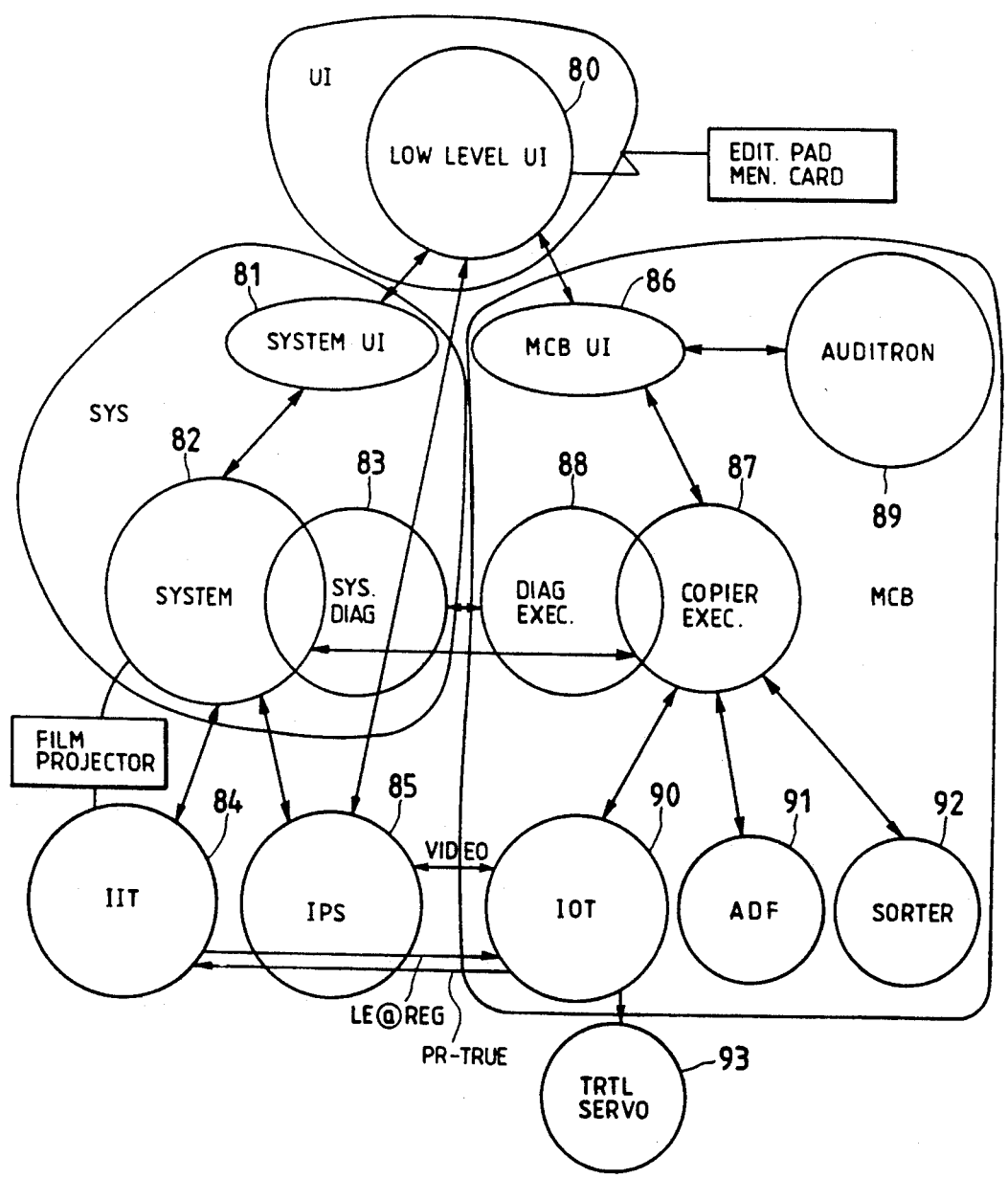
FIG. 4 is a diagram showing the software architecture in the copier of FIG. 2.

FIG. 3 shows the hardware architecture in the system, and FIG. 4 shows the software architecture in the system.

When a color CRT is used as UI as in the case of the copier under discussion, more data is necessary to perform color display than when a monochromatic CRT is used. Further, the volume of data is also increased if one wants to construct a more user friendly UI by improving the composition of display screen and the efficiency of transition from one scene to another.

This problem could be solved by using a CPU with a high-capacity memory but then the board becomes too bulky to be accommodated within the copier. Further, flexibility in adaptation to changes in design specifications is reduced and the production cost is increased.

Under these circumstances, the copier under consideration is adapted to solve the problem of increased data by decentralizing the CPU using a plurality of remotes which are known as techniques to permit the CRT controller to be operated in common with other machine models or apparatus.

As shown in FIG. 3, the electrical hardware used in the system under consideration is roughly divided into three units, UI, SYS and MCB. The UI unit includes a UI remote 70. The SYS unit is decentralized into an F/P remote 72 for controlling F/P, an IIT remote 73 for reading image information from a document, and an IPS remote 74 for performing various kinds of image processing; and the IIT remote 73 has an IIT controller 73a for controlling the imaging unit, and a VIDEO circuit 73b for digitizing the image signal readout before it is sent to the IPS remote 74, and it is controlled by VCPU 74a together with the IPS remote 74. A SYS (system) remote 71 is provided to collectively control the individual remotes that are already mentioned and those which are to be described below.

SYS remote 71, which requires a huge capacity of memory for storing the program for controlling scene transition in UI, uses Model 8086 that incorporates a 16-bit microcomputer. Besides Model 8086, Model 68000 can also be used.

The MCB unit has an MCB (master control board) remote 75 that decentralizes and collectively controls the following remotes: a VCB (video control board) remote 76 which is a raster output scan (ROS) interface that receives from the IPS remote 74 those video signals which are used to form a latent image on a photoreceptor belt with a laster; an RCB remote 77 for performing servo control on a tow roll transfer loop (TRTL), an IOB remote 78 as an I/O port for IOT, ADF, sorter and accessories; and an accessory remote 79.

Each of the remotes shown in FIG. 3 is composed of a single board. Thick solid lines in FIG. 3 represent a 187.5 kbps LNET high-speed communications network, thick dashed lines represent a 9600 bps master/slave serial communications network, and fine solid lines represent hot lines which are transmission paths of control signals. The symbol 76.8 kbps in FIG. 3 represents a line exclusively used to insure that figure information written on the edit pad, copy mode information entered from a memory card and a figure information in the edit area are notified from the UI remote 70 to the IPS remote 74. The symbol CCC (communication control chip) in FIG. 3 represent an IC for supporting the protocol of the high-speed communications line LNET.

As described above, the hardware architecture in the system under consideration consists basically of the UI unit, SYS unit and MCB unit. The processing jobs to be executed by these remotes is described below with reference to the software architecture shown in FIG. 4. Arrows in FIG. 4 represent data exchange conducted through the 187.5 kbps LNET high-speed communications network and 9600 bps master/slave serial communications network shown in FIG. 3, or the transmission of control signals over the hot lines also shown in FIG. 3.

The UI remote 70 is composed of an LLUI (low-level UI) module 80 and a module (not shown) for performing the processing associated with the edit pad and memory card. LLUI module 80 is the same as what is generally known as CRT controller and is a software module for displaying scenes on a color CRT. The contents of scenes to be displayed on the color CRT are controlled by SYS UI module 81 or MCB UI module 86. Obviously, this enables the UI remote to be operated in common with other machine models or apparatus since the CRT controller is to be used as an integral unit with CRT although the specific scene composition or the specific way of scene transition varies from machine model to model.

SYS remote 71 is composed of three modules, SYS UI module 81, SYSTEM module 82, and SYS DIAG module 83.

The SYS UI module 81 is a software module for controlling scene transition. The SYSTEM module 82 is a module containing the following kinds of software: F/F (feature function) selecting software that identifies which coordinates in the soft panel have been selected in which scene (i.e. which job has been selected); job confirming software that makes a final job check to see, for example, if there is any inconsistency in copy executing conditions; and software that controls communications for establishing exchange of various kinds of information (e.g. F/F selection, job recovery and machine state) between SYSTEM module 82 and other modules.

The SYS. DIAG module 83 is a module that is activated in a customer simulation mode which performs copying operation in a diagnostic state. The customer simulation mode performs a normal copying operation, so SYS. DIAG module 83 is essentially the same as SYSTEM module 82 except that the SYS. DIAG module which is to be used in a special "diagnostic" state, is shown in FIG. 4 as separate from but partly overlapping the SYSTEM module 82.

The IIT remote 73 accommodates an IIT module 84 for controlling the stepping motor used in the iamging unit, and IPS remote 74 accommodates an IPS module 85 for performing various processing jobs associated with IPS. These modules are controlled by the SYSTEM module 82.

The MCB remote 75 accommodates the following modules: an MCB UI module 86 which is software for controlling scene transition in a diagnostic state, in an auditron state or when a fault such as jamming occurs; an IOT module 90 for performing the necessary processing jobs for copying, including the control of a photoreceptor belt, a developer and a fuser; and ADF module 91 for ADF contro; a SORTER module 92 for sorter control; a copier executive module 87 for managing these kinds of software; a DIAG executive module 88 for performing various kinds of diagnosis; and an auditron module 89 which accesses an electronic counter in response to PIN (personal identification number) to perform accounting.

The RCB remote 77 stores a TRTL servo module 93 which controls the operation of a tow roll transfer loop. The TRTL servo module 93 is managed by the IOT module 90 to control the transfer step of a xerographic cycle. In FIG. 4, the copier executive moudle 87 is shown to partly overlap the DIAG executive module 88 for the same reason that the SYSTEM module 82 partly overlaps the SYS. DIAG module 83.

The video signal processing circuit which uses the CCD line sensor assembly 226 to read reflectance signals that are obtained by separating a color document into three colors R, G and B, which further converts the readout into digital density signals is described below with reference to FIG. 5.

Figure 5:
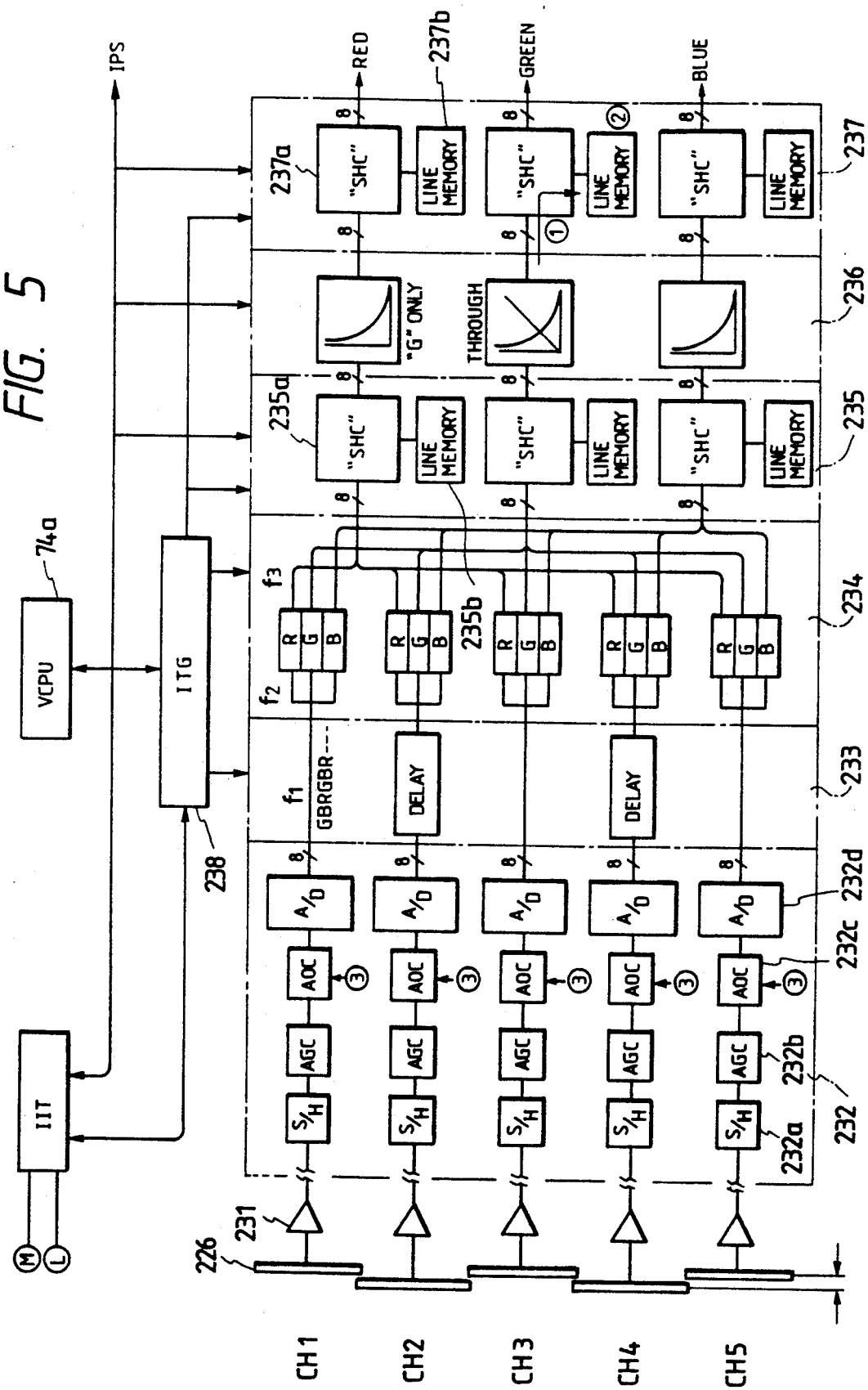
FIG. 5 is a diagram showing the video signal processing circuit in the copier of FIG. 2.

Shown by 232 in FIG. 5 is a readout data adjusting/converting circuit that samples and holds analog video signals and that performs gain and offset adjustments to convert them to digital signals. The circuit 232 comprises sample- and-hold circuits 232a, gain adjusting circuits AGC (automatic gain control) 232b, offset adjusting circuits AOC (automatic offset control) 232c, and A/D converter circuits 232d. The white signal (signal readout from a white reference plate) from the CCD line sensor assembly and the black signal output signal in the dark) from the same assembly usually vary from chip to chip or from one pixel in a chip to another. In the gain adjusting circuits AGC 232b, a maximum (peak) value of the white signal in each channel is adjusted to a reference value, for example, "200" of 256 levels of graduation, and in the offset adjusting circuits AOC 232c, a minimum value of the black signal is adjusted to a reference value, for example, "10" of 256 levels of gradation.

ITG (IIT timing generator) 238 controls a delay setting circuit 233 which performs zigzag correction and a separation/synthesis circuit 234. In accordance with the contents of a register that have been set by a VCPU 74a, ITG 238 controls the amount of delay for zigzag correction to adjust the timing of outputs from the 5 channels of CDD line sensor assembly 226, thereby performing the necessary control to distribute the delay among three color separation signals B, G and R.

The delay setting circuit 233 is a so-called "zigzag correcting" circuit which corrects the amount by which the installation of CCD line sensor assembly 226 deviates in a subsidiary scanning direction. This circuit is composed of a line memory of FIFO configuration and it stores the signal from the first line of CCD line sensors (which scan the document first) and then delivers it in synchronism with an signal output from the ensuing second line of CCD line sensors. The circuit 233 controls the number of delay lines in accordance with the setting of delay determined by enlargement or reduction ratio in ITG 238.

The separation/synthesis circuit 234 stores in a line memory an 8-bit data train (BGRBGR . . . ) from each channel after separating it into R, G and B, and it then delivers the signal from each channel after serial synthesis for each of R, G and B.

Conversion table 236 has two tables, one being a logarithmic conversion table LUT for converting a reflectance signal to a density signal, and a "through" conversion table LUT, each table being typically stored in a ROM. In this conversion table 236, R, G and B signals of reflectance read from the document are converted to R, G and B signals of density that correspond to a recording material associated amount (e.g. the amount of toner).

A shading correcting unit 235 (or 237) is composed of a shading correcting circuit 235a (or 237a) and SRAM 235b (or 237b, and performs such operations as correction of pixel deviation, correction of shading, and adjustment of image data entry. The correction of pixel deviation involves weighted averaging of pixel data. As already mentioned, R. G and B data are received into the signal processing circuit in a parallel way but because of misalignment in the position of R, G and B filters, weighted averaging of the pixel data is necessary. The correction of shading is such an operation in which image data written into SRAM as reference data is boardd from the input image data that has been corrected for pixel devication, with the result of substraction being then delivered. The correction of shading is effective in compensating for variations due to the light distribution characterisctics of a light source and its time-dependent change, variations in the optical system due to such factors as dirt on optical elements such as a reflecting mirror, and variations in sensitivity between bits of each CCD line sensor. The shading correcting circuit 235a is inserted before the conversion table 236 to perform correction of the dark level (i.e. the output in the dark when the fluorescent lamp is turned off), whereas the shading correcting circuit 237a is inserted after the conversion table 236 to perform correction of the output readout from the white reference plate.

Figure 6:
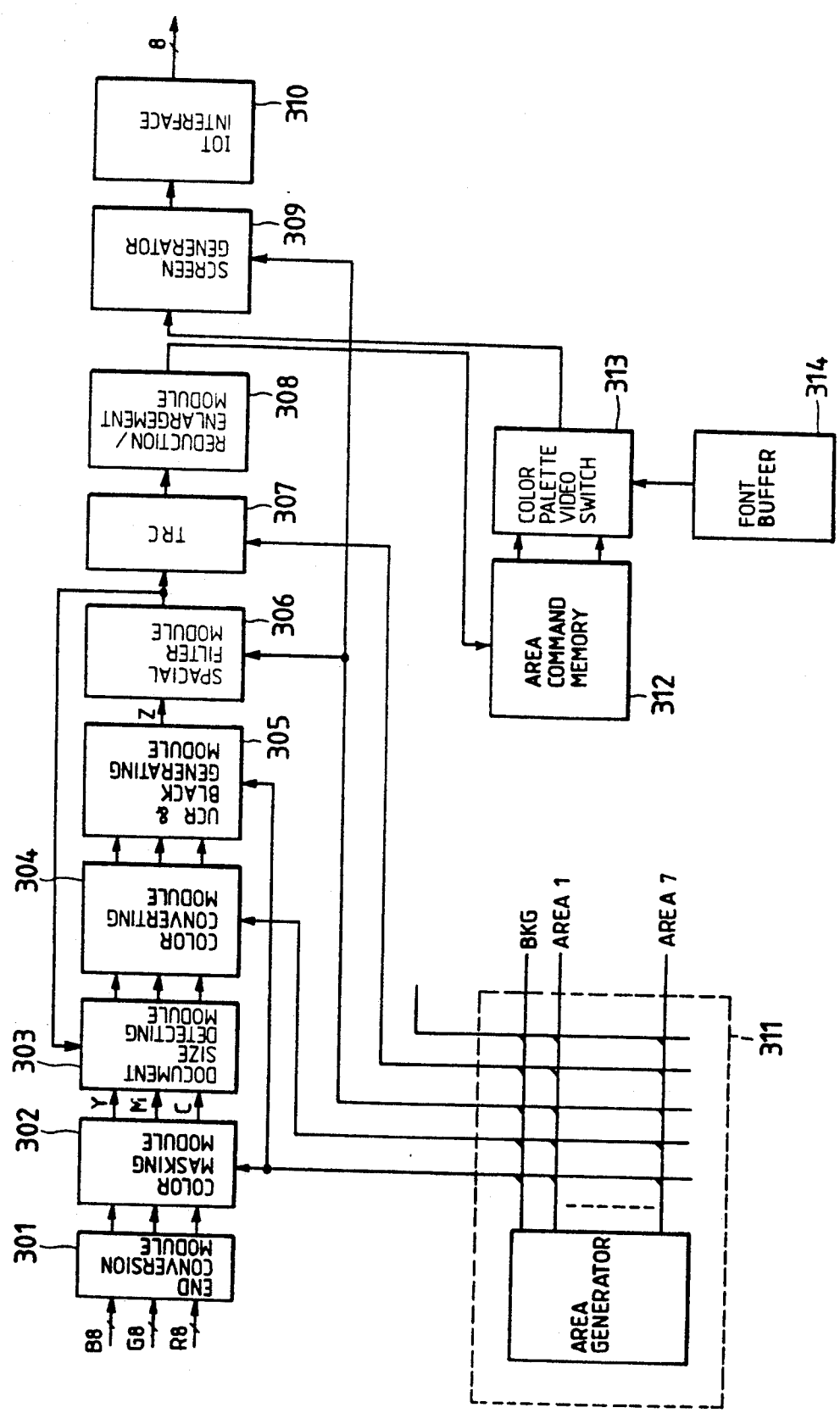
FIG. 6 is a diagram showing an outline of the module composition of IPS.

FIG. 6 shows an outline of the module composition of IPS.

IPS receives 8-bit data (providing 256 levels of gradation from IIT with respect to each of three color (B, G and R) separation signals, which are then converted into Y, M, C and K toner signals. Thereafter, IPS selects toner signals X for process colors and performs binary coding on those signal to produce ON/OFF data for the toner signals of process colors, which data is then supplied into IOT. In the meantime, IPS performs various kinds of data processing in order to enhance the reproduction of colors, gradation and fine details.

END (equivalent neutral density) conversion module 301 is a module by which optical readout signals for the color document obtained in IIT are adjusted (converted) to gray-balanced color signals. This module has 16 conversion tables which, when a gray document is read, perform conversion to three color (B, G and R) separation signals with an invariably equal gradation in accordance with the specific level of the document (from black to white), with those separation signals being then delivered.

A color masking module 302 converts three color (B, G and R) separation signals to toner signals for Y, M and C, which conversion is effected by a matrix operation or with the aid of conversion tables.

A document size detecting module 303 performs two operations: detecting the document size during prescanning; and removing the platen color (frame erasure) during scanning for document reading. When the document is placed on the platen obliquely or if it is not rectangular in shape, the module detects and stores maximum and minimum values in both vertical and horizontal directions (x1, x2, y1 and y2).

A color converting module 304 performs conversion on the basis of the color designated in a specified area. In response to an area signal from an area image control module, the module 304 sends out Y, M and C signals of the document unaltered if the present area is not a color conversion area; if the present area is a color conversion area, the designated color is detected to send out Y, M and C signals of the converted color.

UCR (under color removal) & black generating module 305 generates a sufficient amount of K to prevent color contamination and, in accordance with the amount of K, Y, M and signals are reduced (under color removed) by an equal amount. In this way, module 305 prevents contamination of black and reduction in chroma in low-lightness, high-chroma colors.

A spatial filter module 306 generates dot removal information and edge emphasis information with the aid of digital filters and modulation tables and performs something if the document is a photo or a halftone print and conducts edge emphasis if the document is composed of characters or a line image.

In response to an ON/OFF signal from IPS, IOT executes four copying cycles (in the case of 4-full color copying) using Y, M, C and K process colors, thereby enabling the reproduction of a full-color document. In practice, however, faithful reproduction of colors determined theoretically by signal processing requires subtle adjustments taking the characteristics of IOT into consideration.

TRC (tone reproduction control) module 307 is used to improve the fidelity of tone reproduction. It has editing capabilities including density adjustment, contrast adjustment, negative-to-positive reversal, color balance adjustment, character mode, transillumination synthesis, etc. that are to be performed in accordance with area signals.

A reduction/enlargement module 308 performs reduction or enlargement in the main scanning direction by elimination or addition during data read/write mode using aline buffer. The module is also capable of image shifting in the main scanning direction by reading data from the line fubber in the middle of writing procedure or reading it at a delayed time; the module is capable of repetition by performing repeated reading; further, the module is capable of mirror image processing by reading backward. In a subsidiary scanning direction, the module changes the scan speed of IIT from 2:1 to 1:4, thereby allowing the copying ratio to vary from 50% reduction to 400% enlargement.

A screen generator 309 generates gradation toner signals of process color after converting then into ON/OFF binary toner signals. The screen generator performs binary coding and error diffusion by comparison between a threshold matrix and data values expressed in gradation. IOT receives the resulting binary toner signals and turns on or off a generally elliptical laster beam (80 $\mu$m $\times$ 60 $\mu$m) to produce 16 dots/mm, thereby reproducing a halftone image. Further, the quantization error between the binary ON/OFF signals produced by the screen generator and the input gradation signals is detected and fed back to perform error diffusion, whereby the macroscopic reproduction of gradation is improved.

An area image control module 311 is capable of setting seven rectangular areas and the order of their priority, with area control information being set in association with each of those areas. Control information may be exemplified by color mode information (whether to perform color conversion or to copy in a monochromatic or full color), modulation select information for photos, characters, etc., TRC select information, and screen generator select information. Such control information is used to control color masking module 302, color converting module 304, UCR module 305, spatial filter 306 and TRC module 307.

An edit control module reads a document containing not rectangles but other figures such as a circular graph and enable "coloring" of a kind that stains a designated area (not limited in shape) with a designated color. This module sets commands 0-15 as commands for performing such processing as "fill pattern", "fill logic" or LOGO.

As described above, the IPS of the present invention first performs END conversion on signals read from the document by IIT. Then, color masking is done and document size detection, frame erasure and color conversion are performed, which operations are more efficient to accomplish with full-color data. Only thereafter are conducted under color removal and black generation, thereby enabling operation with process color data. Subsequent operations including spatial filtering, color modulation, TRC and reduction/enlargement are performed by processing process color data and this effectively reduces the volume of processing compared to the case of processing with full-color data, as a result of which the number of necessary conversion tables is reduced to one third of the tables that are otherwise required. This in turn permits the use of more versatile conversion tables, thereby enhancing the flexibility of adjustments and the fidelity of the reproduction of colors, gradation and fine details.

As shown in FIG. 2, U/I is equipped with a 12" color display 51 monitor and a hard control panel 52 attached to its side in order to provide improved operability. Through various modifications of color display, a menu is offered that can be easily seen and recognized by the user. At the same time, color display 51 is combined with an IR touch board 53 to provide direct access to the screen by manipulation of soft buttons. Further, various operations are efficiently distributed among the hard buttons on the hard control panel 52 and the soft buttons on the screen of the color display 51, thereby enabling simplified operations and efficient composition of the menu of the screen.

The U/I of the present invention uses a display of compact size and various modifications are made to the display screen and its control. For example, the information to be displayed on the screen is roughly classified to appear in a plurality of areas. Detailed information will "pop up" in each sub-area, rather than on the primary screen, whereby a simple scene can be composed of the minimum necessary information. In areas showing more than one piece of information, the features of color display and emphasis display are provided to insure that the necessary information can easily be recognized or identified in each scene.

Figure 7A:
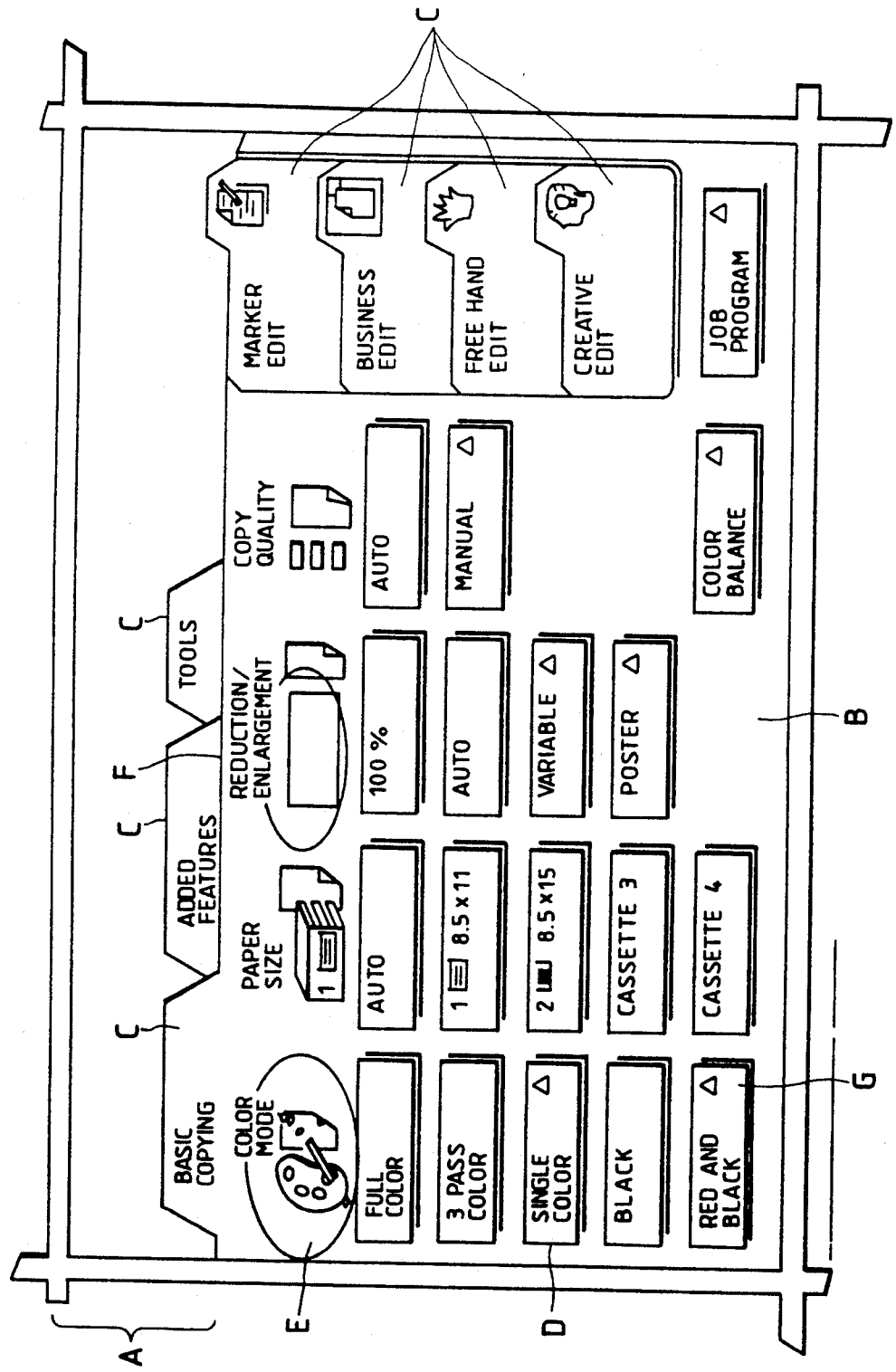
FIGS. 7(a) and 7(b) show examples of the composition of the display screen.
Figure 7B:
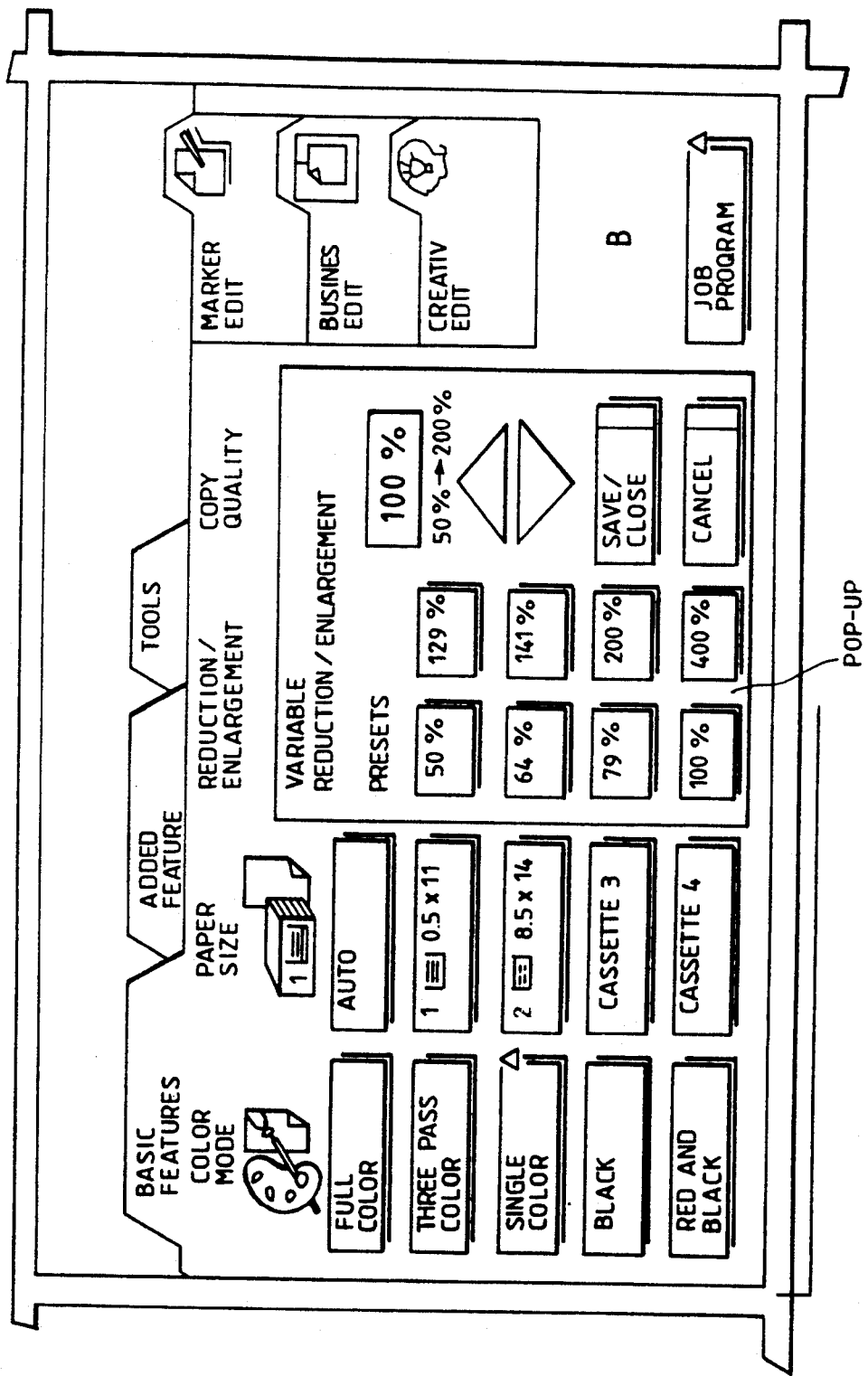

FIGS. 7(a) and 7(b) show examples of the composition of the display screen. FIG. 7(a) shows the composition of a basic copy screen, and FIG. 7(b) shows how a "pop-up scene" appears on the basic copy screen.

The U/I of the present invention displays as an initial screen the basic copy screen which sets a copy mode as shown in FIG. 7. The copy mode setting composes a soft control panel and is divided into a "message area" A and a "pathway" B.

The message area A occupies top three lines on the screen. The first line is used to provide a state massage, and the second and third lines display predetermined messages, i.e. a message indicating any inconsistency in the selection of functions, a message relating to any abnormal state of the machine, and a message for warning information. The right end of message area A is a "copy count area" where the number of copies to print which has been entered from a tan-key or the number of pages being copied are displayed.

The "pathway" B is an area where selection is made from various functions. It has pathways for "basic copying", "added features", "marker edit", "business edit", "free hand edit", "creative edit" and "tools". Pathway tabs C are displayed in relation to these respective pathways. Each pathway has a "pop-up" capability to provide efficient manipulation. The pathway B typically displays soft buttons D which are selectively touched to select functions, icons E that vary with the selected function and which displays it, and a reduction/enlargement indicator F. The functions that are to pop up by depressing soft buttons D are labelled with a pop-up mark (Δ) G. When pathway tabs C are touched, the associated pathways will open and their functions are selected by touching soft buttons. Considering manipulability, soft buttons are arranged in such a way that they are manipulated in order from the upper left portion to the lower right portion.

As described above, the basic copy screen is separated from other scenes so as to maximize compatibility with other machine modules and the hard console panel. In addition, the edit screen is composed of more than one layer so as to provide scenes and functions that mach the skill of the operator. Further, this screen composition is combined with a "pop-up" capability to provide user friendly scenes by insuring that those having sophisticated or complicated functions will pop up. FIG. 7(b) shows how reduction and/or enlargement ratios pop up on the screen as a result of touching "variable ratio" soft buttons.

Except for the bit map area, the screen adopts a "tile" display method, with one tile measuring 3 mm in width (8 pixels) and 6 mm in height (16 pixels). The screen contains 80 tiles in the horizontal direction and 25 tiles in the vertical direction. The bit map area is displayed by 151 pixels in the vertical direction and 216 pixels in the horizontal direction.

As shown in FIG. 13, the hard control panel is attached to the right side of the color display in such a way that it is directed further to the center than the screen. The control panel is equipped with a "ten-key" pad, as well as "ten-key clear", "all clear", "stop", "interrupt", "start", "information", "auditron" and "language" buttons. Besides these buttons, the control panel may optionally be equipped with LED (light-emitting diode) lamps to indicate the status of operation of respective buttons.

Figure 8:
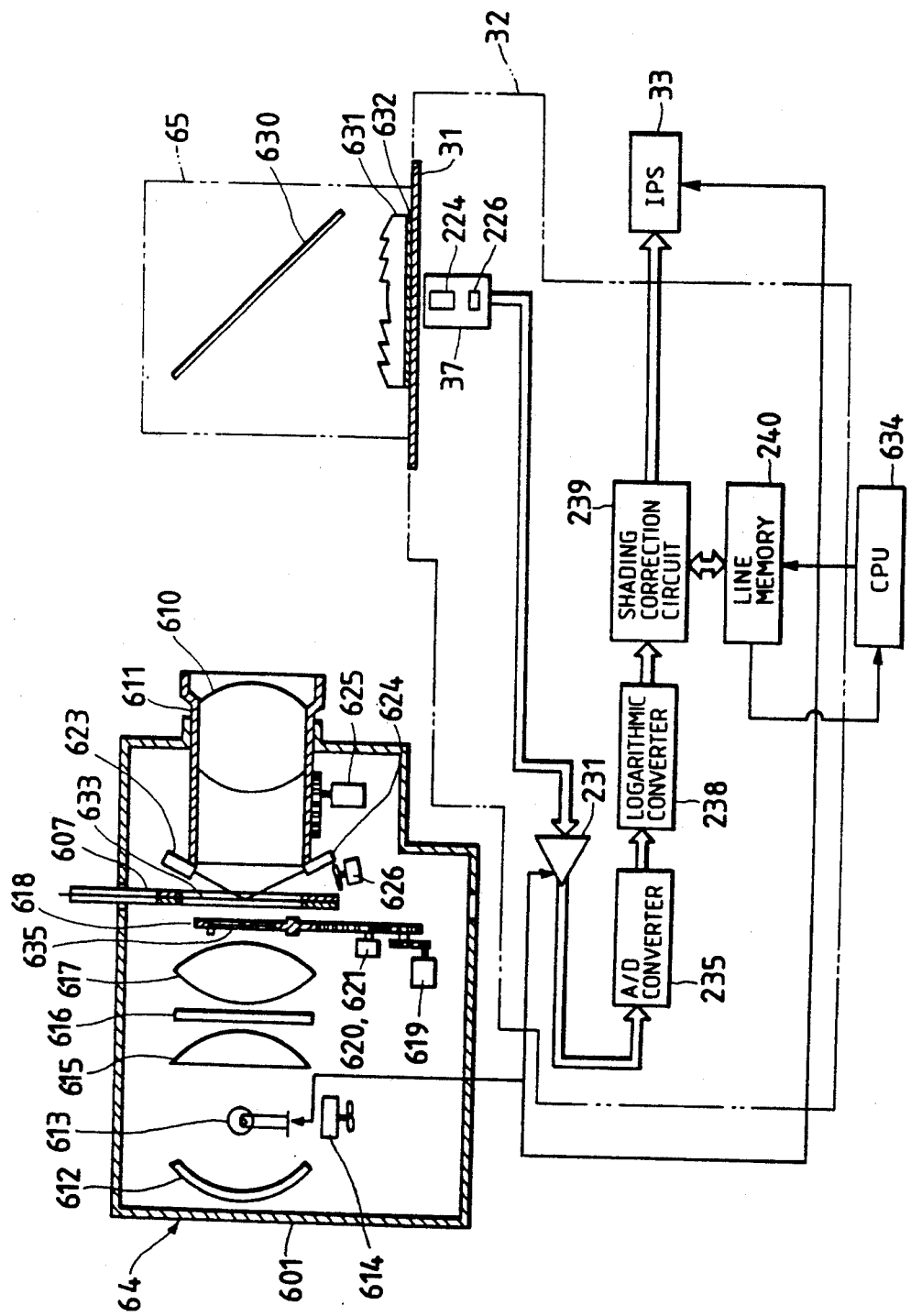
FIG. 8 is a schematic view showing an outline of the construction of F/P.

FIG. 8 is a schematic view showing an outline of the construction of F/P. A housing 601 slidably supports a projection lens holder 611 on its right side. The holder 611 holds a projection lens 610. The housing 601 contains a reflector 612 and a light-emitting lamp 613 typically made of tungsten halogen lamp, which are provided coaxially with the projection lens 610. The lamp 613 is cooled with a cooling fan 614 provided near to it. Provided on the right side of the lamp 613 are an aspheric lens 615 for converging light from the lamp 613, a heat ray absorbing filter 616 for cutting off rays of light having a predetermined wavelength, and a convex lens 617, which are all coaxial with the projection lens 610.

Provided on the right side of the convex lens 617 is a correction filter auto-change device that comprises a correction filter retainer 618 that supports correction filters 635 for adjusting the density of a 35-mm negative film or a positive film (only the correction filter for either one of the two films is shown in FIG. 8), a motor 619 for driving the retainer 618, a first and a second position detecting sensor 620 and 621 for detecting the rotational position of the retainer 618, and a control unit for controlling the drive motor 619 (this unit is contained in F/P 64 but not shown in FIG. 8). While a plurality of correction filters 635 are supported by the filter retainer 618, a filter that matches a specific document film 633 is automatically selected and brought into alignment with a working position that is coaxial with projection lens 610 and other lenses used. The correction filters in the filter auto-change device may be placed in any position on the optical axis of projected light, such as between a platen glass 31 and an imaging unit 37.

The F/P shown in FIG. 8 is also equipped with an auto-focus unit comprising an auto-focus sensor light-emitting device 623 and light-receiving device 624 which are operatively associated with the projection lens holder 611, and a sliding motor 625 that allows the lens holder 611 to slide within the housing 601. When a film retaining case 607 is inserted into the housing 601, the document film 633 supported in that case will be positioned between the correction filter retainer 618 and each of the light-emitting device 623 and the light-receiving device 624. A fan 626 for cooling the document film 633 is provided near the position where the film is to be set.

The F/P 64 has a power source which is separate from the power supply to the base machine 30 but it is accommodated within the base machine.

M/U 65 contains a mirror 630, a Fresnel lens 631 and a diffuser plate 632. The Fresnel lens 631 and the diffuser plate 632 are made of a single acrylic plate, with the Fresnel 631 being formed on one surface of said acrylic plate and the diffuser plate 632 formed on the other side. The projected light reflected by the mirror 630 has a tendency to diffuse and the purpose of the Fresnel lens 631 is to collimate this light so that the marginal area of the image will not become dark. The diffuser plate 632 serves to diffuse the collimated light from the Fresnel lens 631 by a small amount so that the shadow of a rod lens array 224 in the imaging unit 37 which is formed by that collimated light will not detected by the line sensor array 226.

The M/U 65 is folded and stored in a given place when color copying is not performed with F/P 64. When necessary, M/U 65 is unfolded and placed in a predetermined position on the platen glass 31 of the base machine 30.

The film image reading unit has the following basic capabilities: correction filter auto-change, detection of the direction in which a document film is inserted, autofocus (AF), manual focus (MF), manual lighting of the light-emitting lamp, automatic change of copying ratio and scan area, automatic correction of shading, and automatic adjustment of image quality.

As will be understood from the foregoing description, the copier under consideration incorporates sophisticated control technology, so once a trouble occurs, it will take a considerably long time to locate the cause and find the appropriate solution, In particular, when a fault occurs in electronic circuits such as ICs and LSIs, considerable difficultly will be involved in identifying the faulty component. Needless to say, replacements are usually conducted not on a component-by-component basis but on a board-by-board basis, so a serviceman only needs to identify the board in which the fault has occurred and he is not necessarily required to identify the faulty component. However, the failure rate of components is an important factor for the reliability of the copier taken as a whole, so it is critical to provide a DIAG system that permits the serviceman to check whether certain principal components function normally. Further, such DIAG system must be performed easily and in a way that minimizes the inevitable increase in cost.

This is also true with the setting of parameters that determine the conditions of copying. Stated more specifically, the performance of copying requires various parameters including those for setting the timing of individual operations and those for setting image quality and color tone. Such parameters are set to standard values upon delivery from the factory but they are not necessarily satisfactory to specific users. Even if the standard settings are satisfactory to users, the conditions of copying such as image quality and color tone will inevitably change due to aging and other factors As a result, the serviceman has to reset the parameters but this resetting job is time-consuming since the machine incorporates sophisticated control technology.

However, spending a lot of .time on one machine is not desirable from the viewpoint of servicing costs because the long time required for troubleshooting and adjustments obviously extends the machine downtime during which the user is unable to use the machine. Further, one serviceman has to attend to many copiers but if he spends much time on one machine, he will be unable to deal with troubles if they have occurred simultaneously in a plurality of machines.

On the other hand, if a faulty area can be identified or adjusted within a short time, the machine downtime is shortened whereas the number of machines that can be attended to by one serviceman is increased, and this will eventually lead to lower servicing costs and higher reliability.

It is therefore important that if a trouble occurs, a serviceman can locate the cause of the trouble, find an appropriate solution and conduct various adjustments within a period not longer than about 30 minutes and in a simple manner. The diagnostics system of the present invention offers a means of achieving this object in relation to recording apparatus.

The diagnostics system of the present invention is described below in greater detail.

(1) D/A Converter Check

As shown in FIGS. 1 and 5, analog dot sequential color video signals produced from the respective channels of the CCD line sensor assembly are fed to the analog board 2 so that they are converted to digital signals. Before this digitization, the video signals are subjected to gain adjustment in AGC 232b and to offset adjustment in AOC 232c. These adjustments re conducted in order to provide constant white and black levels between channels. In AGC 232b, the gain of amplifiers is controlled in such a way that the white level, or the white density read in the CCD line sensor assembly, will attain a predetermined target value in all channels. In AOC 232c, the offset of amplifiers is controlled in such a way that the black level, or the dark density read in the CCD line sensor assembly, will attain a predetermined target value in all channels. Therefore, if the image obtained by copying has a density difference between channels, one may assume that there is something abnormal in AGC 232b or AOC 232c. To verify this possibility, D/A converter check is made. Before describing this check mode, the construction and operation of AGC 232b and AOC 232c are described below.

Figure 9A:
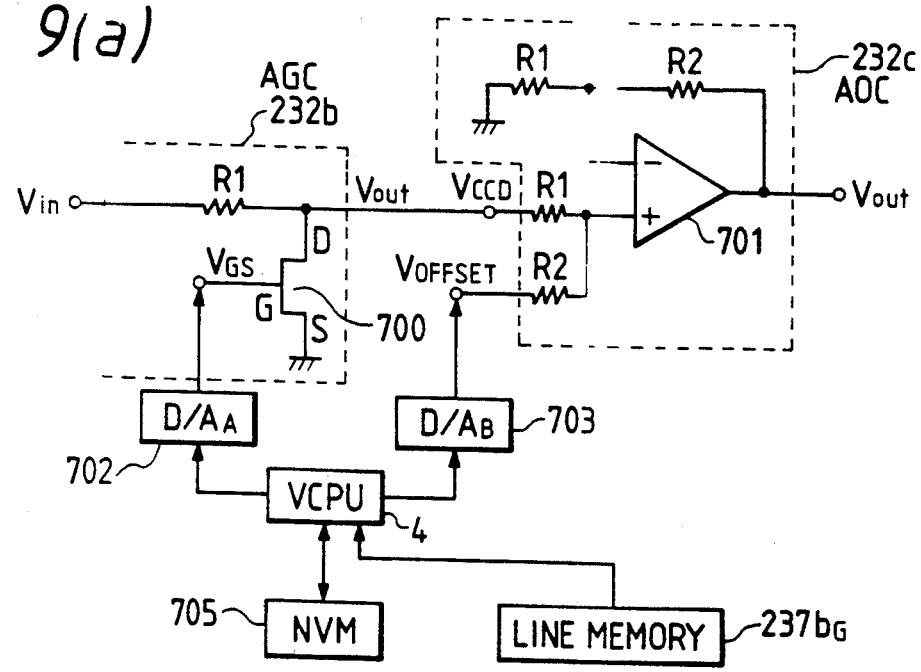
FIGS. 9(a) through 9(g) are diagrams for explaining D/A converter check.

FIG. 9(a) shows the circuit configuration of AGC 232b and AOC 232c. As shown, AGC 232b has a voltage-controlled variable resistor element 700 which is supplied at the gate with a control voltage $V_{GS}$ from $D/A_4$ so as to vary the drain-source resistance of the element 700. If the drain-source resistance is written as $R_2$, the gain is given by:

$$V_{OUT}/V_{IN} = R_2/(R_1 + R_2).$$

Hence, if the data provided from VCPU 4 to $D/A_4$ 702 is assumed to consist of 8 bits, the gain can be adjusted at 256 levels. AOC 232c has an operational amplifier 701 which is supplied at the non-inverting input with video signal $V_{CCD}$ via resistor $R_1$ and with offset control voltage $V_{OFFSET}$ from D/A$_B$ 703 via resistor $R_2$. The inverting input of amplifier 701 is supplied with the voltage at the junction between resistors $R_1$ and $R_2$ as shown in FIG. 9(a). Therefore, the output of AOC is given by:

$$V_{OUT} = (R_2/R_1)V_{CCD} + V_{OFFSET}.$$

If the data supplied from VCPU 4 to D/A$_B$ 703 is assumed to consist of 8 bits, the video signal is amplified by a fixed ratio and the offset voltage can be adjusted at 256 levels. The output of AOC 232c is so adjusted that the final output density will be at a prescribed value with respect to the document density to be read.

Referring to the circuit configuration shown in FIG. 9(a), VCPU 4 will normally operate in the following manner. A non-volatile memory (hereinafter referred to as "NVM") is preloaded with the gain and offset values for each channel of the CCD line sensor assembly. A line memory 237$b_G$ for green color correction by the white shading correction circuit 237 (FIG. 5) has written therein white reference data for each pixel that has been obtained by reading the white reference plate (not shown) in the home position of IU 1 prior to the execution of copying operation. When copy start is instructed, VCPU 4 first reads the gain and offset values for each channel stored in NVM 705, and performs predetermined mathematical operations, the results of which are supplied as initial gain and offset values to D/A$_A$ 702 and D/A$_B$ 703 of each channel. In the next step, VCPU 4 determines a maximum gain-associated value of the whiter reference data for a specified pixel in line memory 237$b_G$ and checks as to whether said maximum value is within the limits of a predetermined target. If the answer is yes, the gain is stored in NVM 705 and if the answer is negative, a gain is reset from said maximum value by predetermined operational formula and a maximum value of the white reference data is determined again, with the above-described procedure being subsequently repeated. As for offset, VCPU 4 determines a minimum value of the white reference data for a specified pixel in line memory 237$b_G$ and checks as to whether said minimum value is within the limits of a predetermined target. If the answer is yes, the offset is stored in NVM 705 and if the answer is negative, an offset is reset from said minimum value by a predetermined operational formula and a minimum value of the white reference data is determined again, with the above-described procedure being subsequently repeated.

Figure 9B:
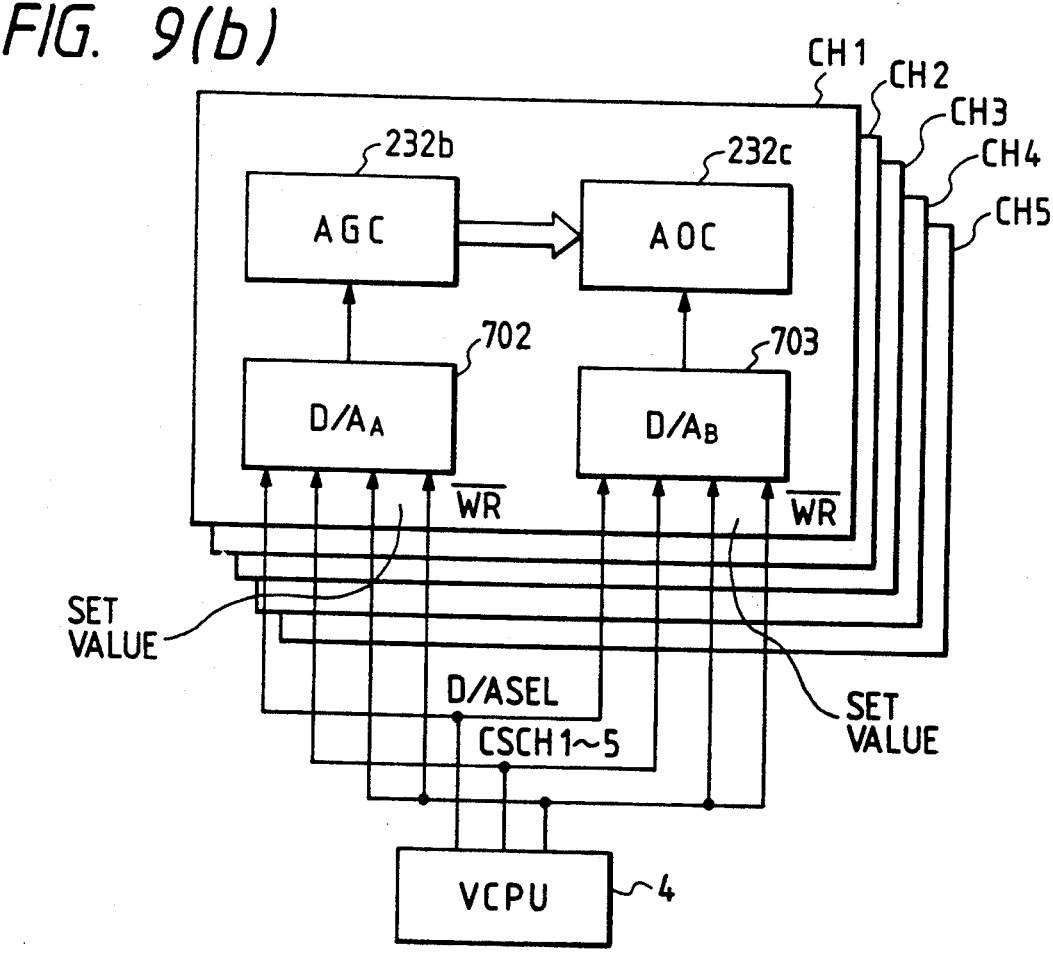
Figure 9C:
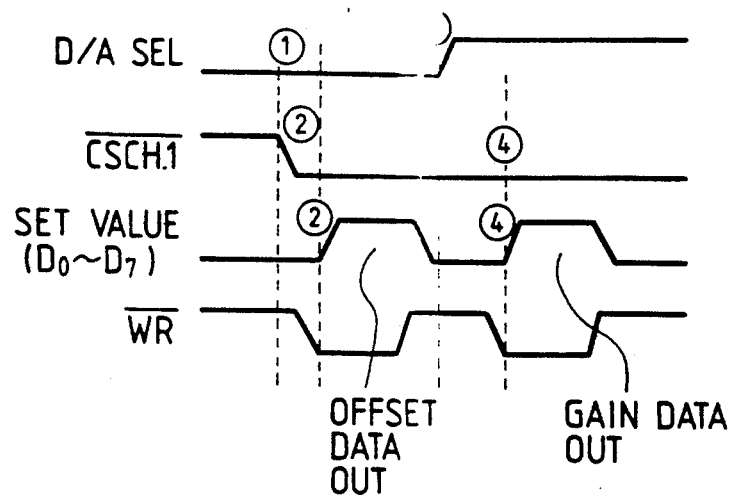

The procedures of AGC and AOC are as described above. An example of the interface between the analog board 2 and VCPU 4 is shown in FIG. 9(b). As shown, D/A converters 702 and 703 of each channel are notified from VCPU 4 of the following four kinds of data: $\overline{\text{CSCH1}}$-$\overline{\text{CSCH5}}$ signals for instructing channel selection; D/A SEL signal for instructing which of D/A$_A$ 702 and D/A$_B$ 703 should be selected; an 8-bit setting notified via a data bus; and $\overline{\text{WR}}$ signals that instructs writing into D/A converters 702 and 703. Suppose here that D/A$_A$ 702 is selected when D/A SEL signal is at high (H) level, whereas D/A$_B$ 703 is selected when D/A SEL signal is at low (L) level. Also suppose that the mode of writing into D/A converters becomes effective if $\overline{\text{CSCH}}$ signals and $\overline{\text{WR}}$ signals are both at L level. Then, writing into D/A converters is performed in the manner shown in FIG. 9(c). In the case of setting gain and offset values for channel 1, VCPU 4 first brings $\overline{\text{CSCH1}}$ signal and D/A SEL signal to L level (step 1). In the next step, VCPU 4 brings $\overline{\text{WR}}$ signals to L level and sets an offset value at a predetermined address, whereupon D/A$_B$ 703 shifts into a WRITE mode to initiate the writing of said offset value (Step 2). Then, VCPU 4 brings D/A SEL signal to H level in order to set a gain value in D/A$_A$ 702 (step 3). As already described above, VCPU 4 brings $\overline{\text{WR}}$ signals to L level and sets a gain value at a predetermined address, whereupon said gain value is written into D/A$_A$ 702 (step 4). By performing this procedure for other channels 2-5, a predetermined gain value will be set in D/A$_A$ 702 of each channel whereas a predetermined offset value is also set in D/A$_B$ 703 of each channel.

Normally, AGC and AOC are performed in the manner described above. As will be apparent from the foregoing discussion, if AGC and/or AOC does not function normally on account of abnormalcy in D/A converters, a copy will be obtained that has a density difference between channels. Stated conversely, if the copy obtained has a density difference between channels, one may assume that some abnormalcy has occurred in D/A converters and there is the need to check to see if the D/A converters are normal in their operation. The D/A converter check is performed to meet this need.

Figure 9D:
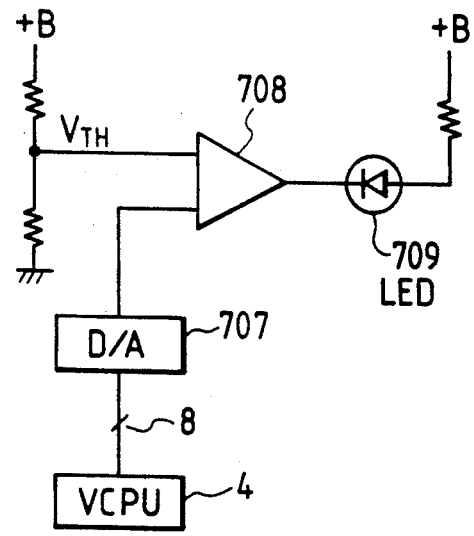
Figure 9E:
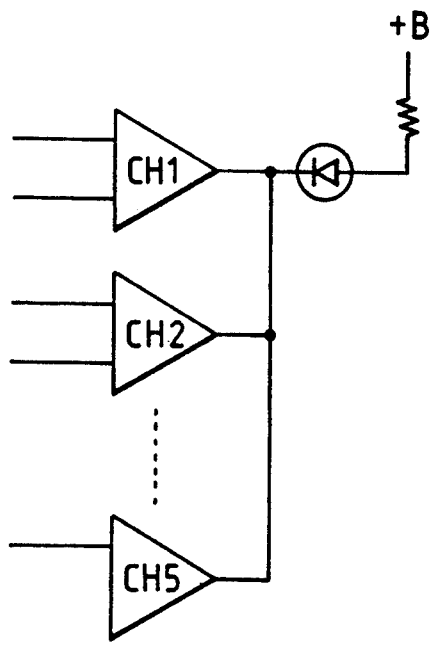
Figure 9F:
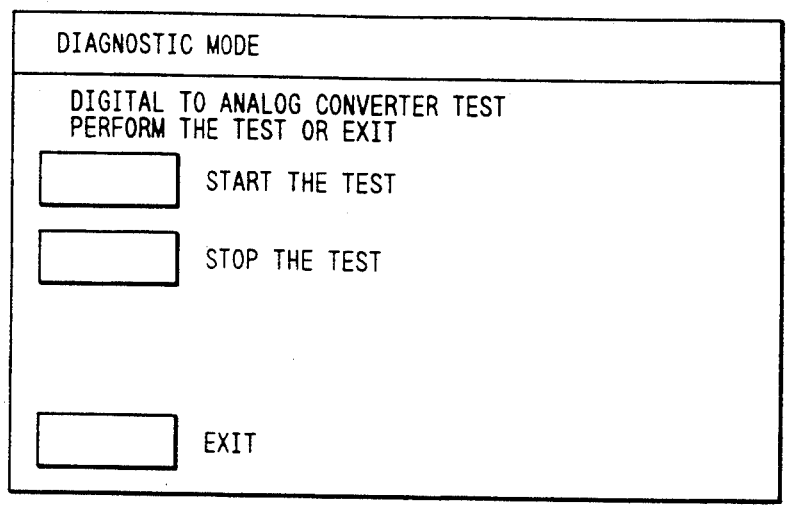
Figure 9G:
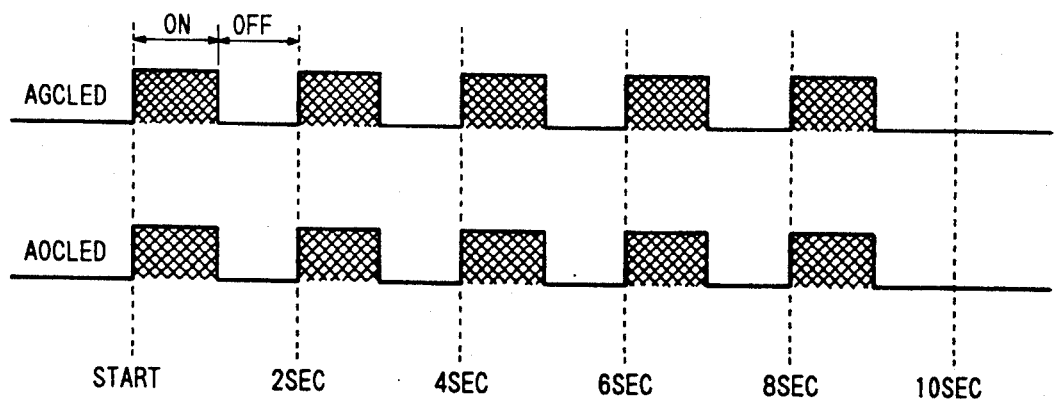

FIG. 9(d) shows a circuit configuration for performing the D/A converter check. A comparator 708 is supplied with the output of D/A converter 707 at one of the input terminals and with a predetermined threshold voltage $V_{TH}$ at the other input terminal. The output terminal of comparator 708 is typically connected to a light-emitting device 709 such as LED so that the latter will turn on if the output of D/A converter 707 is greater than the threshold value $V_{TH}$ whereas it will turn off if the output is smaller than $V_{TH}$. With this circuit configuration, if UI 9 has performed predetermined operations and when D/A converter check of DIAG mode is instructed the screen of UI 9 will produce a display as shown in FIG. 9(f). If "START THE TEST" soft button on the screen is depressed, the instruction is first notified to DIAG execution module (DIAG. EXEC.) 88 in MCB (see FIG. 4) since the DIAG mode is managed by MCB. Recognizing that this DIAG mode should be executed by IPS module 85, DIAG. EXEC. module 88 instructs IPS module 85 via system DIAG (SYS. DIAG) module 83 to execute the D/A converter check. In response to this instruction, IPS module 85 stored in VCPU 4 activates the procedure of D/A converter check. When the D/A converter check is initiated, IPS module 85 causes $00_H$ and $FF_H$ to be set alternately at a predetermined period in D/A converter 707 of the designated channel. Since the threshold value $V_{TH}$ is set intermediate between $00_H$ and $FF_H$, the light-emitting device 709 will turn on if $00_H$ is set in D/A converter 707 and it will turn out if $FF_H$ is set in the converter. Consequently, if D/A converter 707 functions normally, the light-emitting device 709 will turn on and off cyclically at a given interval, allowing the serviceman to check the operation of D/A converter 707 merely by confirming that the light-emitting device 709 keeps turning on and off. While the period at which the light-emitting device 709 turns on and off cyclically is not critical, it is desirably adjusted to be about one to two seconds to facilitate recognition by servicemen. FIG. 9(g) shows the case in which the light-emitting device 709 is allowed to turn on and off at an interval of 2 seconds. Needless to say, data should be set in D/A converter 707 by the procedure already described above. FIG. 9(f) shows "EXIT" button which is used to have the system exit from the DIAG mode under consideration.

As described above, the operation of D/A converters can be readily checked by adding only a comparator and a light-emitting device to each D/A converter. Further, this check can be accomplished at a relatively low cost. However, the circuit configuration shown in FIG. 9(d) needs 10 light-emitting devices and this results in an increased cost. If, on the other hand, the outputs of the comparators for the respective channels are connected to provide wired OR for each of AGC and AOC as shown in FIG. 9(e), only two light-emitting devices need be used for AGC and AOC, whereby the cost is lowered.

Conventionally, checking the operation of D/A converters requires detection of H or L level with a tester for each bit and this is a cumbersome and lengthy job for servicemen to accomplish. The above-described method of the present invention provides great facility in checking since it only requires visual confirmation. Further, the checking circuit can be constructed at fairly low cost since it only needs the addition of comparators and light-emitting devices.

(2) PG Copy Mode

As shown in FIG. 1, the copier under discussion has four boards, analog board 2, CPU board 3, IPS-A board 5 and IPS-B board 6, provided between IU 1 and IOT 7. If replacements are to be performed on a board-by-board basis, identification of troubles such as a density difference between channels or "clear spots" in copy image requires "trouble isolation" to determine the specific board in which such troubles have occurred. Under these circumstances, the diagnostics system of the present invention provides a means of trouble isolation between the analog board 2 and the CPU board 3 by the following procedure: a total of three PGs are provided, one at the input terminal of analog board 2, a second at the input terminal of CPU board 3 and the third at the out terminal of the CPU board; predetermined patterns are generated by these PGs; and those patterns are copied not only to achieve trouble isolation but also to check the quality of the copy. An outline of the circuit configuration for implementing this method is shown in FIG. 10(a).

Figure 10A:
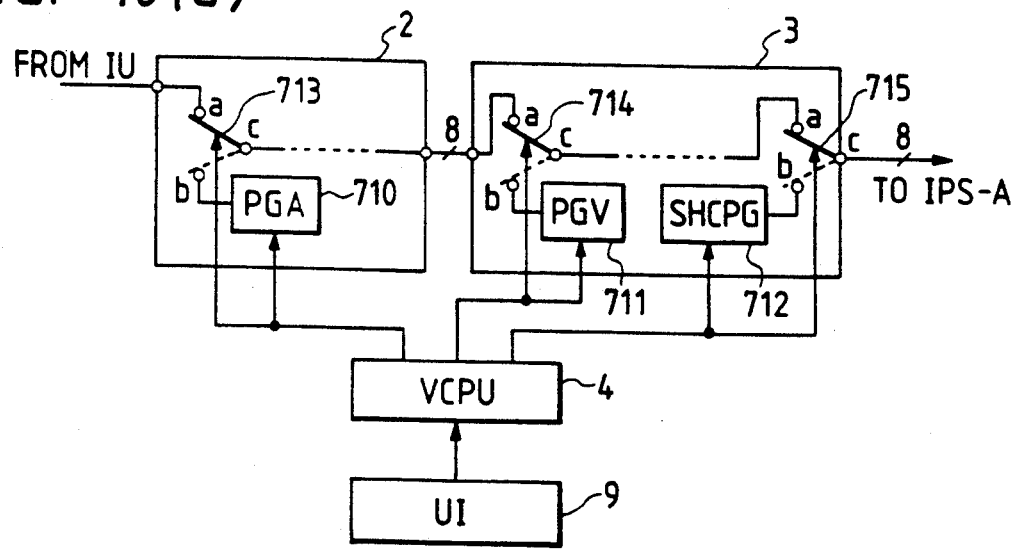
FIGS. 10(a) through 10(p) are diagrams for explaining PG copy mode.

As shown in FIG. 10(a), a switch 713 is provided at the input terminal of analog board 2 and video signal from IU 1 is supplied to terminal a whereas video signal from PGA 710 which is the first PG is supplied to terminal b. Switch 713 is normally connected to terminal a as shown by solid line in FIG. 10(a) and the video signal supplied from IU 1 passes through the S/H circuit, AGC circuit, AOC circuit, etc. and is thereafter digitized in A/D converter and thence exits from the output terminal of analog board 2 to be supplied to CPU board 3. A switch 714 is provided at the input terminal of CPU board 3 so that it is capable of switching between the 8-bit video signal from analog board 2 and the digital pattern signal from PGV 711 which is the second PG. Switch 714 is normally connected as shown by solid line in FIG. 10(a) and the video signal supplied from the analog board 2 passes through the color separation/synthesis circuit, black shading correction circuit, conversion table and white shading correction circuit and is thence supplied at terminal a of a switch 715. Terminal b of switch 715 is supplied with the pattern signal from SHCPG 712 which is the third PG. Switch 715 is normally connected to terminal a as shown by solid line in FIG. 10(a) and the video signal from CPU board 3 is supplied to the IPS-A board (not shown) to perform predetermined image processing.

On the condition that a serviceman has performed predetermined operations with UI 9, VCPU 4 in the circuit configuration described above will selectively shift the contact position of switch 713, 714 or 715. The analog board 2 has five channels of signal processing circuit in correspondence to the five channels of the CCD line sensor assembly. FIG. 10(a) illustrates only one channel of such signal processing circuit as a representative case but it should be understood that the other channels have some configuration.

Referring to the circuit configuration shown in FIG. 10(a), trouble isolation is performed in the following manner. If the serviceman instructs for DIAG mode on UI 9 in such a way that the pattern from SHCPG 712 should be copied, that instruction will be notified to DIAG. EXEC. module 88 where it is recognized that the SHCPG copy mode of interest is a job to be performed by IPS module 85; then, DIAG. EXEC. module 88 instructs IPS module 85 via SYS DIAG. module 83 to execute the SHCPG copy mode. As a result, the module IPS 85 stored in VCPU 4 activates a module for executing the SHCPG copy mode, whereupon switch 715 shifts to terminal b as indicated by dashed line in FIG. 10(a) and at the same time SHCPG 712 will start to operate. In this case, IPS module 85 allows both switches 713 and 714 to be connected to terminal a. In SHCPG copy mode, the switches 713 and 714 may be connected to either terminal a or b but in the case under consideration, they are connected to terminal a as in the normal state. This is also true with conversion table 236 (see FIG. 5) and selection is made between the "through" conversion table or logarithmic conversion table. After these settings have been completed, IPS module 85 notifies SYSTEM module 82 of that effect. Upon receiving that notification, SYSTEM module 82 instructs IOT 7 and other remotes to execute copying. This enable is the copying of the pattern present in SHCPG 712. If there is nothing in abnormal the resulting copy image, one may safely conclude that there is nothing wrong with IPS-A board and subsequent units and that the trouble must have occurred in either IU 1, analog board 2 or CPU board 3.

Suppose here that the pattern from SHCPG 712 has been obtained in the normal way and also suppose that the serviceman instructs UI 9 to start PGV copy mode in order to copy the pattern from PGV 711. In the same way as already described above. IPS module 85 activates the PGV copy mode executing module and causes switch 714 to shift to terminal b as shown by dashed line in FIG. 10(a) while at the same time it actuates PGV 711. In this case, switches 713 and 715 are caused to shift to terminal Furthermore, in PGV copy mode, the pattern from PGV 711 must be copied unaltered, so the "through" conversion table is selected from conversion table 236 and the line memory 235b for black shading correction circuit 235 and the line memory 237b for white shading correction circuit 237 are both cleared.

Upon confirming the completion of these settings by notification from IPS module 85, SYSTEM module 82 instructs the respective remotes to execute copying. As a result, an image corresponding to the pattern signal present in PGV 711 will be produced. If the predetermined pattern is obtained as copy output, one may safely conclude that there is nothing abnormal in CPU board 3 but if the predetermined pattern is not produced, it is verified that a certain trouble has occurred in CPU board 3.

If it is confirmed that there is nothing abnormal in CPU board 3, the serviceman will then select PGA copy mode on UI 9. As a result, PUS module 85 stored in VCPU 4 activates the PGA copy mode executing module executing and causes switch 713 to shift to terminal b and switches 714 and 715 to terminal a while at the same time, the module actuates PGA 710. As in PGV copy mode, the pattern signal from PGA 710 must be copied unaltered and to this end, the "through" conversion table is selected from conversion table 236 and the line memory 235b for black shading correction circuit 235 and the line memory 237b for white shading correction circuit 237 are both cleared. When the completion of these settings is verified, the SYSTEM module 82 will instruct the respective remotes to execute copying. If the copy output provides the predetermined pattern preset in PGA 710, one may safely conclude that there is nothing abnormal in analog board 2, indicating that the trouble has occurred in IU 1. If the copy output is abnormal, the serviceman may safely conclude that the trouble has occurred in analog board 2.

The operating procedures described above are given for illustrative purposes only and it will be obvious to one skilled in the art that the procedures may be reversed to start checking with PGA 710 first.

Trouble isolation in a video signal system is commonly performed by checking video signals per se but to do this, servicemen are always required to carry oscilloscopes and other measuring instruments with themselves. In contrast, according to the diagnostics system of the present invention, servicemen only need to perform copying and check the patterns of PGs visually. In other words, trouble isolation can be accomplished easily in a short time without using any special measuring instruments. Furthermore, the hardware that has to be added involves only three switches and an equal number of PGs and this contributes to a minimum cost increase.

The construction of PGs 710, 711 and 712 will depend on the form of input signals to the respective boards and that of output signals produced therefrom specific examples of the construction of these PGs are shown below.

(A) PGA

Figure 10B:
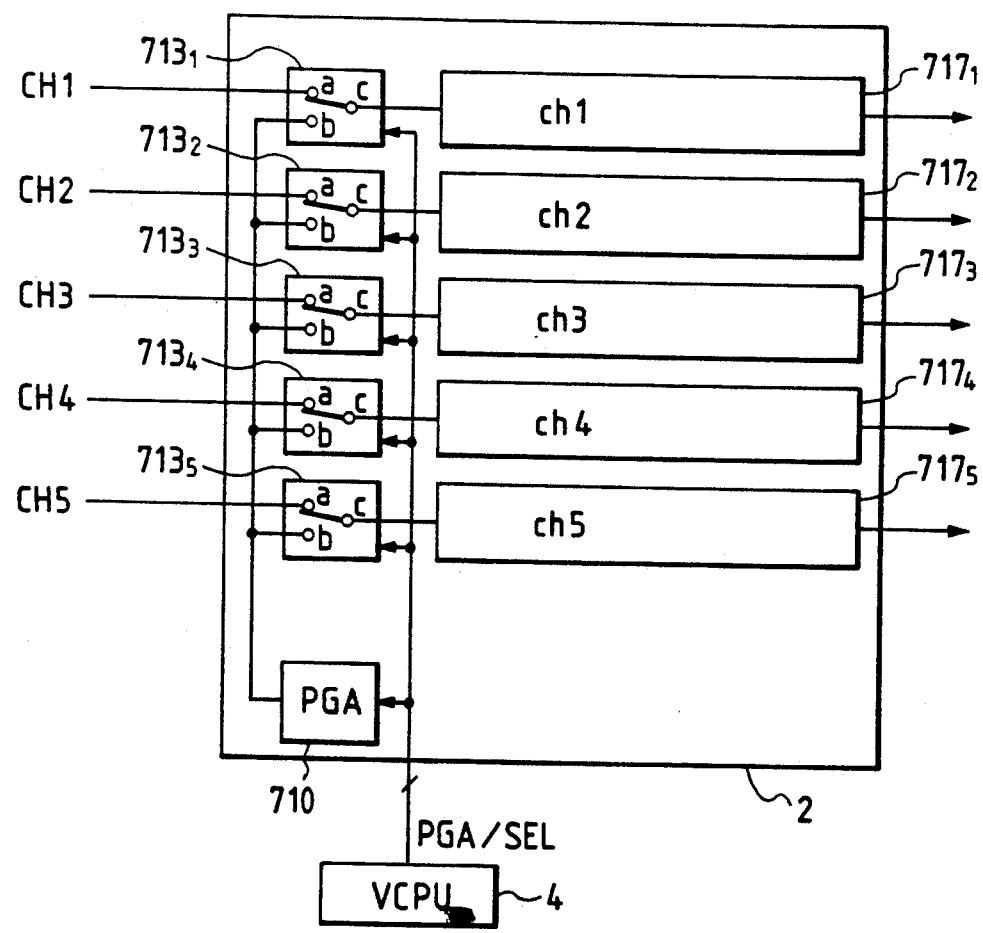

As shown in FIG. 10(b) PGA 710 is used in common to all channels. Each of numerals 717₁-717₅ represents one block of the signal processing circuit of each channel starting with S/H circuit 232a and ending with A/D converter 232d as shown in FIG. 5.

Referring to FIG. 10(b), when PGA copy mode is instructed for activation, IPS module 85 permits PGA/-SEL signal to be produced from predetermined output port of VCPU 4, whereupon switches 713₁-713₅ are caused to shift from the state shown in FIG. 10(b) to the state where terminal b is connected to terminal c. At the same time, PGA 710 is enabled by PGA/SEL signal, whereupon preset signals are supplied simultaneously from PGA 710 to signal processing circuits 717₁-717₅. This is because video signals are simultaneously read from all channels of the CCD line sensor assembly, so that signals from PGA 710 must also be supplied simultaneously to all channels.

Since analog signals are supplied to the input terminal of analog board 2, PGA 710 can be composed of an appropriate form of analog oscillator. PGA 710 may be designed to generate any kind of signals but preferably the signals it generates are such that not only trouble isolate on but also the checking of the quality of halftone representation can be accomplished simultaneously.

Figure 10C:
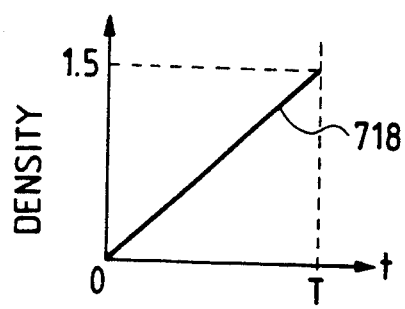

From the viewpoints described above, PGA 710 is designed to generate signals which, when viewed on an output copy image, will produce a pattern that experiences a generally linear density change from white to black in the main scanning direction as shown in FIG. 10(c). The preferred density range is from zero to about 1.5, which range is most frequently used. Symbol T in FIG. 10(c) represents the time required for video signals to be read by one channel of CCD line sensor assembly.

Figure 10D:
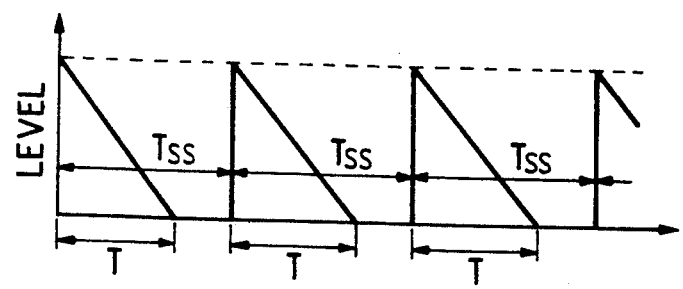

Obviously, PGA 710 is required to generate predetermined signals in synchronism with the main scanning of CCD line sensor assembly. If PGA 710 is supposed to generate a pattern having the density change shown by 718 in FIG. 10(c), the copier under discussion will produce a black color if the level of output signal from the CCD line sensor assembly is low and a white color if that level is high. Hence, PGA 710 is required to generate a signal having the waveform shown in FIG. 10(d) and such a signal waveform can be obtained with a sawtooth generator having an appropriate configuration. Symbol Tss in FIG. 10(d) represents the period of scanning lines, namely, the period of line sync (LS).

Figure 10E:
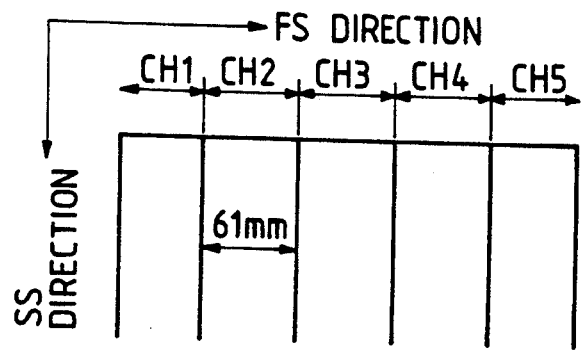
Figure 10F:
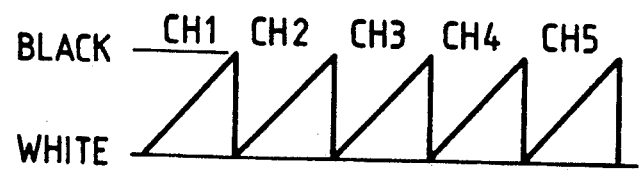

Images of copy output obtained by sing the PG of interest are shown in FIGS. 10(e) and 10(f). FIG. 10(e) shows the case where copy is made on paper of A3 size, producing a pattern in which five stripes corresponding to the five channels of the CCD line sensor assembly align in the main scanning direction. In FIG. 10(e) and the subsequent figures, the main scanning direction is indicated as "FS (Fast Scan) direction", and the subsidiary scanning direction is indicated as "SS (Slow Scan) direction". Each of these stripes has a density change from white to black in the main scanning direction as shown in FIG. 10(f).

Therefore, by visually inspecting the copy output, the serviceman can not only check for the occurrence of a trouble in analog board 2 and subsequent stages but also identify the channel in which the trouble, if any, has occurred. For example, if the copy obtained by the usual practice contains a certain area that is very light in color or which has no color at all, the possible cause is that the CCD line sensor of a certain channel has failed or the signal processing system of that channel has failed. If the pattern output of that channel is found to be normal, one may safely conclude that the fault has occurred in the CCD line sensor assembly.

In connection with the above description, it should be mentioned that since signals are supplied from PGA 710 into analog board 2 in place of G, B and R color dot sequential signals that are usually fed as video signals to analog board 2, G, B and R will assume the same value and hence a black-and-white image will obviously be obtained.

As described above, the use of PGA 710 on analog board 2 enables a pattern of white-to-black gradation to be produced and not only does this permit easy trouble isolation but also checking can be made as regards the drive mechanism of IU 1 and the quality of half-tone representation.

(B) PGV

Figure 10G:
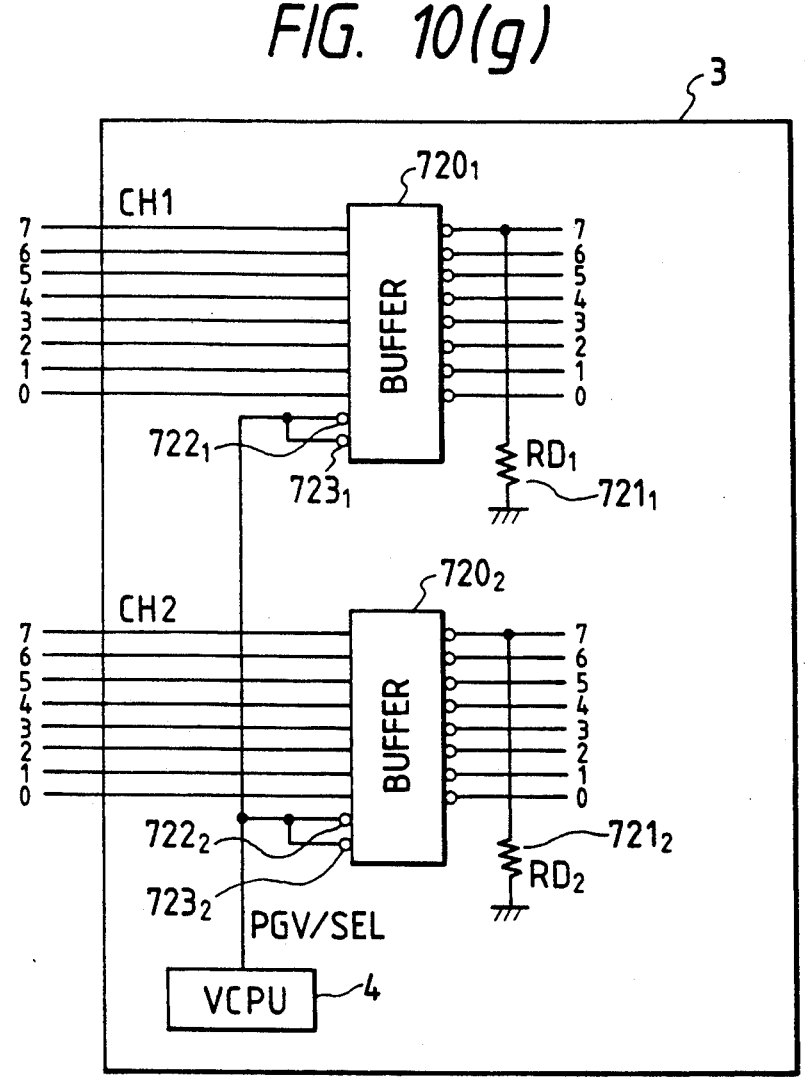

PGV 711 may be constructed as shown in FIG. 10(g).

A video signal for each channel that has been converted to an 8-bit digital signal in A/D converter 232 at the last state of analog board 2 is supplied to CPU board 3 where it is first fed into a buffer 720. FIG. 10(g) shows only channel 1 (CH1) and channel 2 (CH2) and the other channels (CH3–CH5) are omitted since they have the same compositions as CH1 and CH2.

Among the 8 output bits from buffer 720, the line of a suitable bit is connected to a pull-down resistor $R_D$. buffer 720 has either control or interrupt terminals 722 and 723 which are to be supplied with PGV/SEL signal from VCPU 4. PGV/SEL signal is normally at low (L) level and in this case a video signal supplied to buffer 720 will pass through unaltered. If the level of PGV/SEL signal becomes high (H), the buffer 720 will produce a high-impedance output.

With the circuit configuration described above, if PGV copy mode is instructed, IPS module 85 will bring PGV/SEL signal to H level. As a result, the buffer 720 will produce a high-impedance output and the level of the input to the next stage will be H. However, pull-down resistor $R_{D1}$ is connected to the output of most significant bit (MSB) from buffer $720_1$, so only the MBS output from buffer $720_1$ will have L level whereas the other bits have H level. Hence, the video signal in CH1 will have a value of $7F_H$. As for CH2, pull-down resistor $R_{D2}$ is connected to the second (2nd) MSB of the output from buffer $720_2$, so the video signal will have a value of $BF_H$. The same discussion will apply to the other channels and by connecting a pull-down resistor to a predetermined bit of buffer output, a video signal of a desired value can be supplied to a subsequent stage of the processing circuit. Needless to say, each of the pull-down resistors to be used should have a value that will not affect the normal operation of the circuit. Upon receiving PGV/SEL signal, each of the buffers 720 will notify VCPU 4 of that event. As a consequence, IPS module 85 confirms the completion of the setting of PGV copy mode.

Figure 10H:
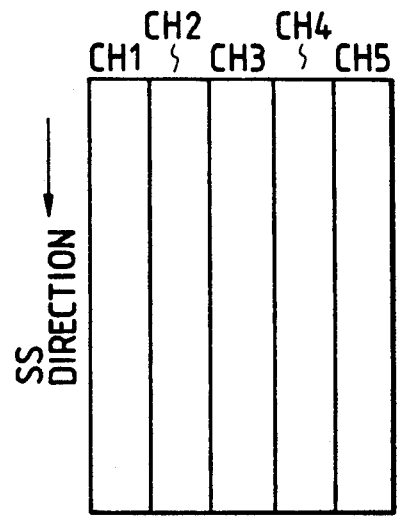
Figure 10I:
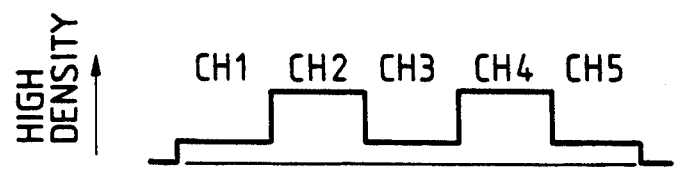
Figure 10J:
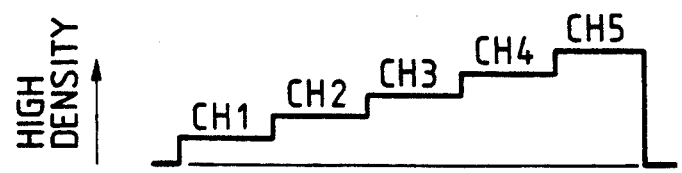

When copy is made on paper of A3 size using the video signal described above, the resulting output image will have a stripe pattern corresponding to five channel as shown in FIG. 10(h). Since the video signal for each channel has a constant value, G, B and R values will be constant, thereby producing a "solid" gray stripe pattern having no density gradation. Two examples of such density pattern are shown in FIGS. 10(i) and 10(j). In the example shown in FIG. 10(i), CH1, CH3 and CH5 have a first density whereas CH2 and CH4 have a second density different from the first density. In the patterns shown in FIG. 10(j), the density gradually increases from CH1 toward CH5.

Figure 10K:
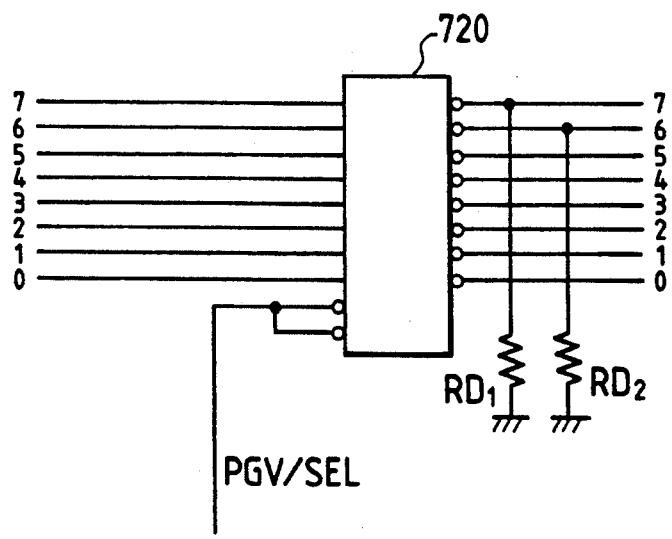
Figure 10I:
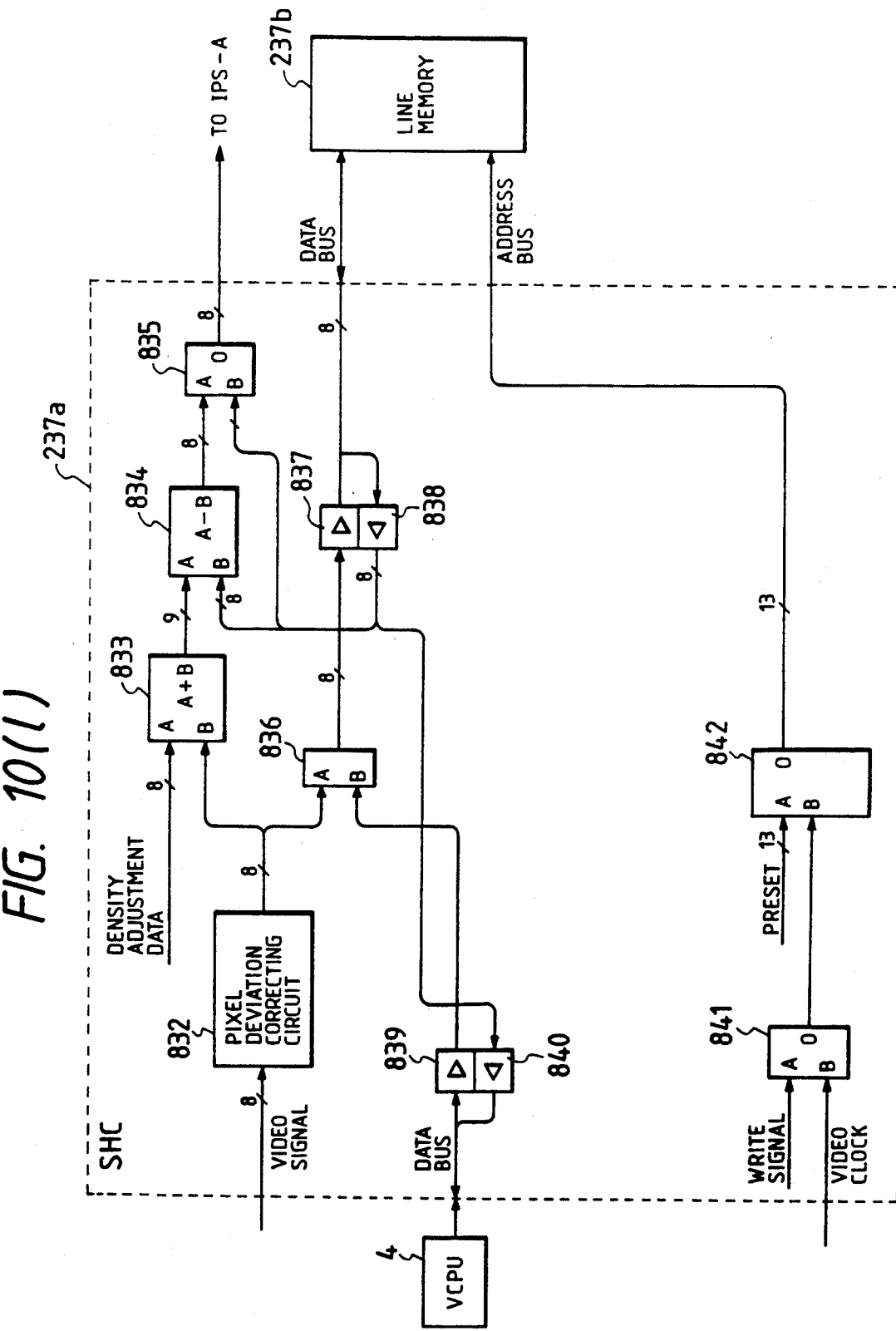

In the circuit configuration shown in FIG. 10(g), only one pull-down resistor is connected to each channel but it will be obvious to one skilled in the art that two or more pull-down resistors may be connected to each channel. If two pull-down resistors are connected as shown in FIG. 10(k), the video signal will have a value of $3F_H$. In this way, stripe patterns with desired densities can be obtained.

The densities of stripes should of course be set in such a way as to produce a clearly discernable stripe pattern. It is also important to use toners in the minimum necessary amount, so pull-down resistors are preferably connected to higher-order bits.

The above examples assume the production of stripe patterns but it will be apparent to one skilled in the art that a gray image having a given density in all area can be produced by connecting pull-down resistors to the lines of same bit for all channels.

As described above, PGV 711 adopts the circuit configuration shown in FIG. 10(g) by making use of the fact that CPU board 3 in the copier under consideration receives dot sequential digital video signals at buffer 720 in the initial stage. PGV 711 can be constructed at low cost merely by connecting a pull-down resistor to a desired bit of the output terminal of each buffer 720 which is to be supplied with PGV/SEL signal.

(C) SHCPG

SHCPG 712 utilizes the white shading correction circuit 237 unaltered so as to generate a predetermined pattern. An example of the composition of SHCPG 712 is shown in FIG. 10(l). Only one of the three G, B and R channels is shown in FIG. 10(l) but should be understood that the other channels also have the same composition.

The normal operation of the circuit shown in FIG. 10(l) is first described below. An 8-bit digital video signal is corrected for pixel deviation in a pixel deviation correcting circuit 832 and supplied to terminal B of an adder 833. This input is added to density adjustment data that is applied to terminal A of the adder 833 from VCPU 4. This completes the process of density adjustment.

A substrate 834 is supplied with the output of adder 833 at terminal A. Terminal B of the substrate 834 is supplied with shading correction data via a directional coupler 838, which data has been read from line memory 237b. In substrate 834, the shading correction data is subtracted from the video signal, thereby performing shading correction. The shading correction data is composed of the white reference data that has been read prior to copying. In other words, IU 1 reads the white reference data from the white reference plate prior to reading image information from the document and said white reference data is passed through the pixel deviation correcting circuit 832, selector 836 and directional coupler 837 to be stored in line memory 237b. In this case, selector 841 selects WRITE signal supplied from VCPU 4 and in response to said WRITE signal, an address counter 842 generates address data which is supplied into line memory 237b. Line memory 237b performs writing on the basis of that address data A preset signal is supplied to terminal A of address counter 842 in order to set an initial address for the line memory 237b.

In reading the shading correction data from line memory 237b, selector 841 selects a video clock, in response to which address counter 842 generates address data to be supplied into the line memory 237b, whereby the shading correction data is read out of the line memory 237b in synchronism with the video clock.

The video signal that has been corrected for shading in the manner described above is supplied to terminal A of selector 835. Since selector 835 is normally designed to select the signal supplied at terminal A, the output from subtractor 834 will be delivered unaltered to IPS-A board 5.

All of the procedures described above are performed under the control of VCPU 4.

The foregoing description relates to the flow of signals that are generated for shading correction during normal copying operation. The operation for producing a predetermined pattern with the circuit configuration described above is set forth below.

When a serviceman selects SHCPG copy mode on UI 9, the relevant button information is notified to DIAG. EXEC. module 88 on MCB. Recognizing that the SHCPG copy mode is a job to be executed by IPS module 85, DIAG. EXEC. module 88 instructs IPS module 85 via SYS. DIAG. module 83 to execute the SHCPG copy mode. As a result, IPS module 85 stored in VCPU 4 activates the module that executes the SHCPG copy mode. In the SHCPG copy mode, IPS module 85 first permits pattern data for each pixel in the scanning direction to be written into line memory 237b via directional coupler 839, selector 836 and directional coupler 837. The pattern data to be written into line memory 237b may be set in a desired way but in order to insure that checking can be made as to whether development is being performed normally in IOT 7, said pattern data is set to have a capability of copying pure R, G, B, Y, M, C and B1 (black). To this end, line memory 237b for each of R, G and B may be loaded with data of the type shown in FIG. 10(m). In this case, IPS module 85 will generate SHCPG/SEL signal and selector 835 will select the input at terminal B so that the pattern data read from the line memory 237b will be supplied unaltered to IPS-A board. Further, IPs module 85 will set the respective parts of IPS in the following manner. It selects a y=x conversion table in END conversion module 301 (see FIG. 6). It selects a unit matrix in color masking module 302. Stated more specifically, only the coefficient of B correction is adjusted to "1" in a Y matrix; only the coefficient of G correction is adjusted to "1" in an M matrix; and only the coefficient of R correction is adjusted to "1" in a C matrix. The IPS module selects a "full-frame" copy mode in document size detection module 303. It selects y=x in UCR & black generation module 305. It allows spatial filter 306 to generate only video data. It selects y=x in TRC 307. In reduction/enlargement module 308, the ratio is adjusted to the settings of reduction/enlargement ratio and copy paper size. Screen generator 309 selects a screen that is capable of balanced reproduction of fine details and gradation. Further, a 4-full color mode is selected.

By setting the various parts of ips in the manner described above, an ideal 7-color toner signal (R, G, B, Y, M, C and B1) can be generated and supplied to IOT 7 on the basis of the ideal three-color signal (R, G, B) that is supplied from line memory 237b.

Upon confirming that the various parts of IPS have answered that the setting of SHC copy mode was completed, IPS module 85 notifies SYSTEM module 82 of that effect, which moudle then instructs each of the remotes to execute the copying job, thereby strating the copy mode. In this case, the pattern data stored in line memory 237b is read out of the memory in synchronism with the video clock and passed through directional coupler 838 and selector 835 to be supplied to IPS-A and subsequent circuits to perform copying. It should be noted here that address data to be supplied into line memory 237b for writing and reading purposes is generated in the same manner as described above. Needles to say, all of the procedures described above are performed under the control of CPU.

Figures 10M, 10N:
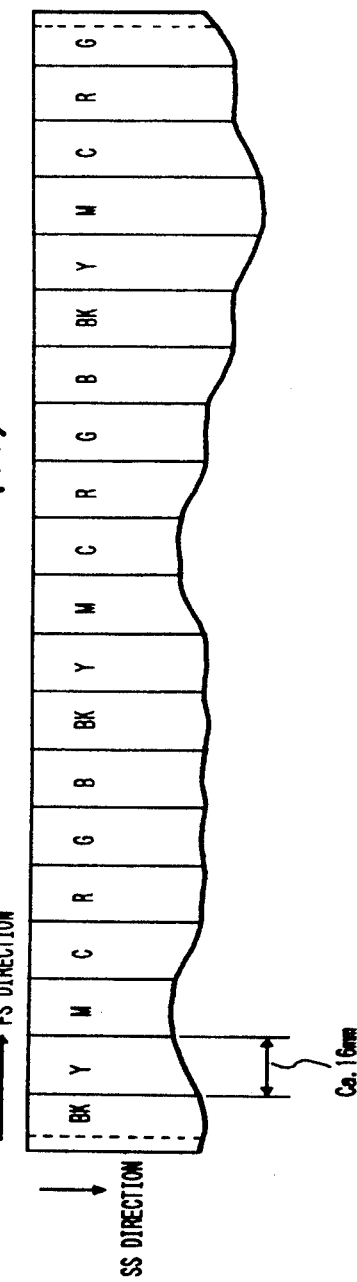

Following the procedures described above, an image is produced as shown in FIG. 10(n). The line memory 237b is supplied with pattern data in association with each of the pixels in the main scanning direction and said pattern data is repeatedly read out of the line memory for each scanning line, so the image produced has a stripe pattern as shown in FIG. 10(n). The width, color and density of each stripe can be set in a desired way by modifying the data to be written into the line memory 237b. In the example shown in FIG. 10(m), different data is to be written for each group fo 256 pixels, so the stripes in the output image will have a width of about 16 mm.

If the pattern produced in the manner described above has pure colors, it can be confirmed that IPS-A board 5 and subsequent circuits function normally and that IOT 7 also functions normally. If, on the other hand, the colors obtained are not pure but are contaminated, one can safely conclude that there is something abnormal in the IPS circuit and/or IOT 7.

With SHCPG having been described above, it is particularly worth nothing that the circuit configuration shown in FIG. 10(l) incorporates the white shading correction circuit unchanged and the hardware added is no more than selectors and signal lines for switching between selectors, except that software for diagnostic purposes is added to VCPU 4. Hence, SHCPG can be constructed at very low cost.

Figure 10O:
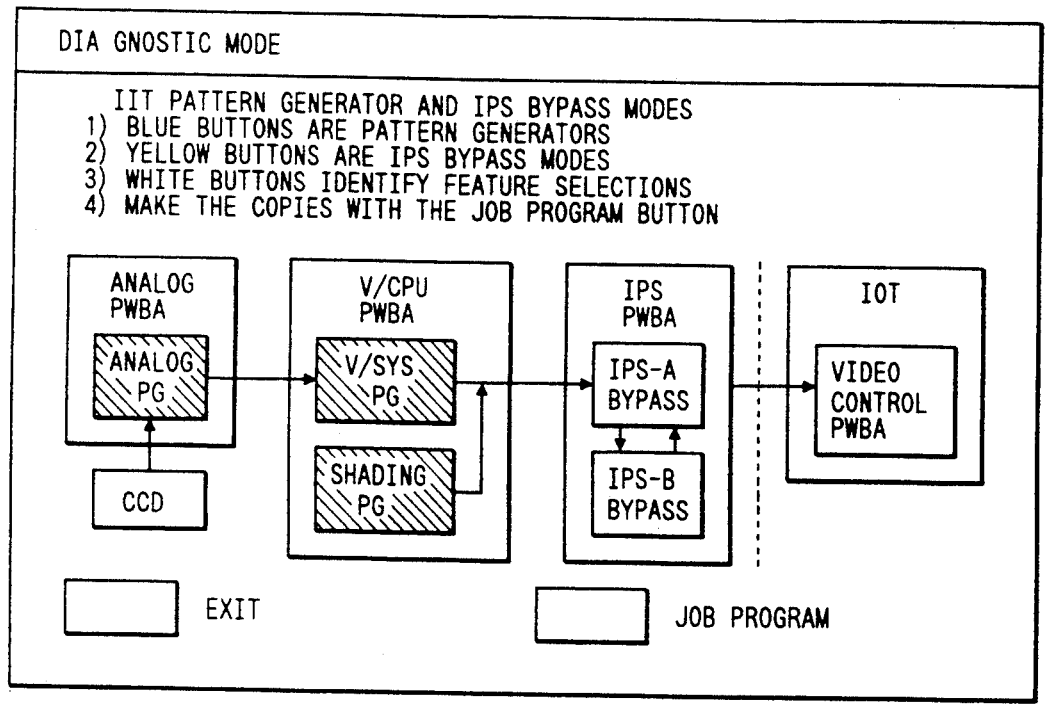

The foregoing description assumes that the operator only needs to give instructions for a predetermined DIAG mode on UI 9. A specific example of display on the screen is as follows. When the operator performs predetermined manipulations on UI 9, the system enters into a DIAG mode. If he selects a PG copy mode, a display of the kind shown in FIG. 10(o) is produced on the screen. On the screen shown in FIG. 10(o), the soft button for PG is identified by a given color, say, blue and the soft button for executing "IPS bypass" mode to be described below is identified by another given color, say, yellow. The other soft buttons are identified by still another given color, say, white. If PGS copy mode is to be executed, "ANALOG PG" button may be depressed. The same is true with PGV copy mode and SHCPG copy mode.

Figure 10P:
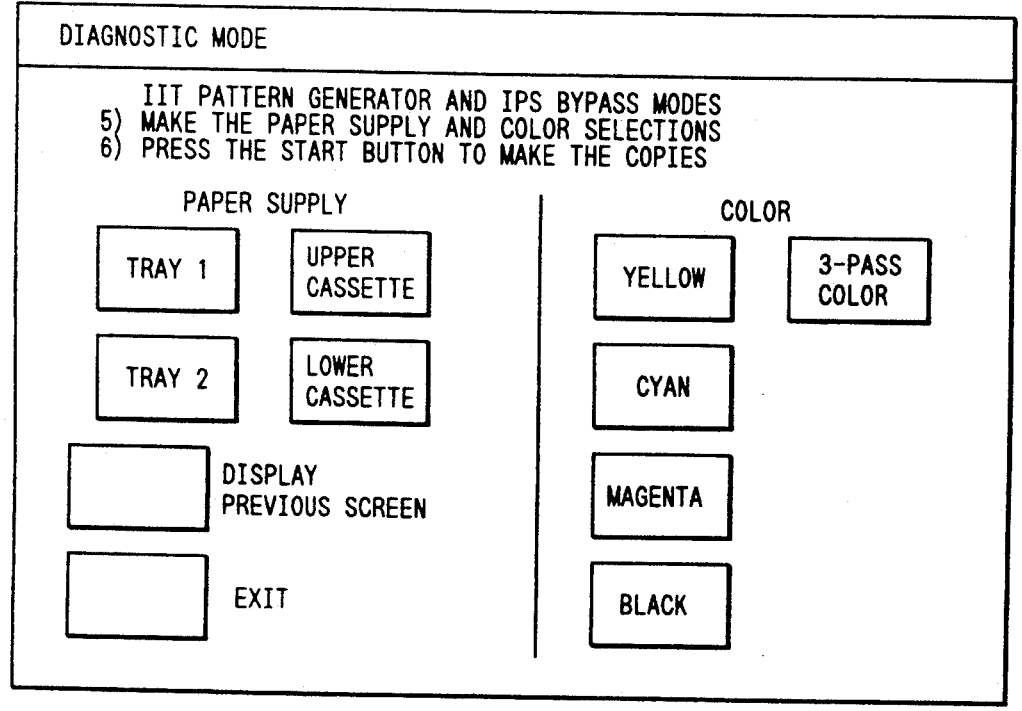

The "JOB PROGRAM" button is used to set the conditions for executing copying in the PG copy mode. If this button is depressed, the scene on the screen changes to what is shown in FIG. 10(p), enabling the operator to select appropriate copy paper and set a desired color mode. If "START" button is depressed after the setting of these parameters is completed, the above-described procedures are performed to copy the pattern from PG.

(3) IPS A/B Bypass Made

The IPS A/B bypass mode to be described below is a DIAG mode for isolating a trouble that has occurred in IPS-A board 5 from a trouble that has occurred in PIS-B board 6. Trouble isolation between analog board 2 and CPU board 3 can be accomplished in the manner described above in (2). If the copy image obtained in each of the PG copy modes is abnormal, one may safely assume that there is something abnormal in IPS. However, IPS is composed of two boards, IPS-A and IPS-B, and in order to replace the faulty board, one must first locate it. The IPS A/B bypass mode is a means of satisfying this need.

In order to determine whether a trouble has occurred in a certain board, one may check I/O levels or signal waveform for each of the devices such as ICs and LSIs that are mounted on that board. In fact, however, IPS has many ICs and LSIs in order to perform various kinds of image processing and a considerably long time will be required to check input and output for every one of the device present. Further, checking individual devices is not a recommendable practice since it is not faulty a device but a board carrying it that has to be replaced.

Under these circumstances, the IPS A/B bypass mode checks for the occurrence of troubles in the IPS boards by performing coping without allowing image data to pass through those boards. The IPS A/B bypass mode has two modes, IPSA bypass mode and IPSB bypass mode, that are briefly described below. First, perform copying with image data bypassing both IPS-A board 5 and IPS-B board 6. If the obtained copy image is abnormal, it is certain that a trouble has occurred in areas other than IPS. If there is nothing abnormal in the copy image, one can conclude that the trouble has occurred in either IPS-A board 5 or IPS-B board 6. This is the IPSA bypass mode. Then, in the second case (i.e. it is assumed that the trouble has occurred in IPS), copying is performed with image information bypassing only IPS-B board 6. If the copy image obtained is abnormal, the trouble has occurred in IPS-A board 5. If there is nothing abnormal in the copying image, one may safely conclude that the trouble has occurred in IPS-B board 6. This is the IPSB bypass mode.

Figure 11:
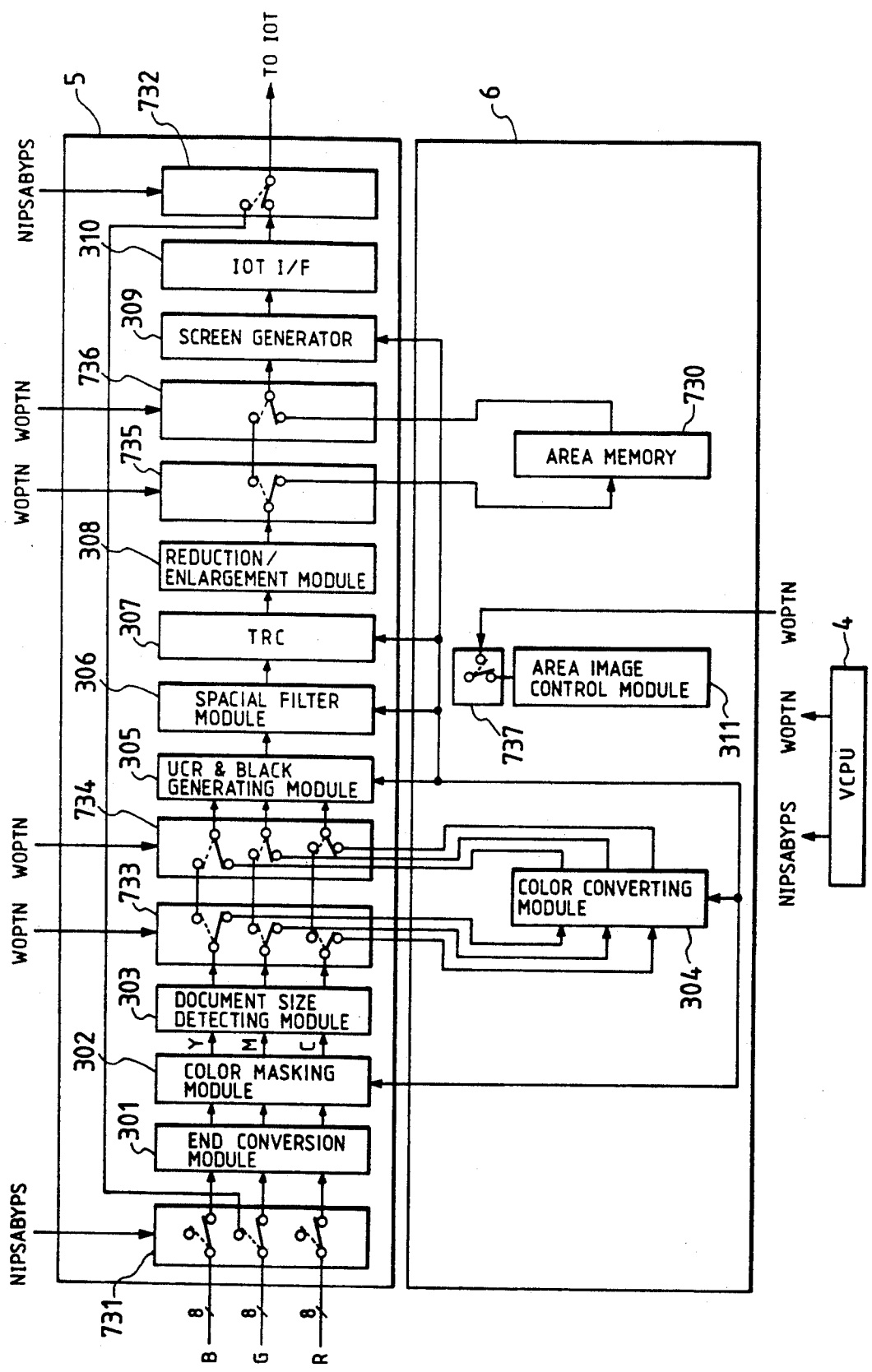
FIG. 11 is a diagram for explaining IPS A/B bypass mode.

FIG. 11 shows an example of the circuit configuration for executing the IPS A/B bypass mode. In FIG. 11, the components which are the same as those shown in FIG. 6 are identified by like numerals, except that area memory 730 includes area command memory 312, color pallet video switch 313 and font buffer 314 which are shown in FIG. 6.

The functions performed in IPS are already described in connection with FIG. 6 and will be omitted here. IPS-B board 6 has editing circuits mounted thereon that comprise a color converter 304, an area image control 311 and an area memory 730. Those circuits which perform the processing necessary to execute ordinary copying are mounted on IPS-A board 5. By distributing various functions between the two boards in this way, IPS-B board 6 can be used as an option which is only available to users who need editing capabilities.

As shown in FIG. 11, a switch 731 for executing IPSA bypass mode is provided immediately before END converting module 301 and a switch 732 which also executes IPSA bypass mode is provided in a stage subsequent to IOTI/F 310. These two switches are supplied with NIPSABYPS signal from a predetermined output port of VCPU 4. Further, a switch 733 is provided before color converting module 304, a switch 734 is provided after the module, a switch 735 is provided before area memory 730, a switch 736 is provided after the area memory, and a switch 737 is provided on the output side of area image control 311. These five switches are used to execute IPSB bypass mode and are supplied with WOPTN signal from a predetermined output port of VCPU 4.

When ordinary copying is performed with the circuit configuration shown in FIG. 11, both NIPSABYPS and WOPTN signals assume H level and switches 731-737 are connected as shown by solid lines. In this way, desired copying can be accomplished.

Suppose here that the output copy image is abnormal probably due to a trouble that has occurred in IPS. Also suppose that the serviceman performs predetermined operations on UI 9 to start a DIAG mode and places an appropriate document on the platen, followed by giving instructions to start IPSA bypass mode. Then, the relevant button information is sent to DIAG. EXEC. module 88 in MCB node. Recognizing that the DIAG mode of interest is the job to be executed by IPS module 85, DIAG. EXEC. module 88 instructs IPS module 85 via SYS. DIAG module 83 to execute said DIAG mode. As a result, the IPSA bypass mode executing module in IPS module 85 stored in VCPU 4 is activated, bringing NIPSABYPS signal to L level. When the setting is completed, IPS module 85 notifies SYSTEM module 82 of that effect and SYSTEM module 82 instructs each of the remotes to execute copying. Consequently, switches 731 and 732 are connected as shown by dashed lines in FIG. 11, with only G signal being supplied to IOT 7. It is of course possible to have three-color (R, G and B) signals bypass the IPS boards but the DIAG mode under consideration is executed only for the purpose of checking for the occurrence of any trouble in IPS and must be completed within a short time. Hence, in order to complete this mode through a single development, only G signal is caused to bypass the IPS boards.

If the copy image obtained has nothing abnormal, it is confirmed that a trouble has occurred in IPS. If the copy image is abnormal, one may safely conclude that troubles have occurred not only in IPS but also in other areas.

Having described the IPSA bypass mode, we now describe the IPSB bypass mode.

Suppose here that finding nothing abnormal in the copy obtained in the IPSA bypass mode, the serviceman performs predetermined procedures on UI 9 to start a DIAG mode and places an appropriate document on the platen, followed by giving instructions to start IPSB bypass mode. Then, the relevant button information is sent to DIAG. EXEC. module 88 in MCB node. Recognizing that the DIAG mode of interest is the job to be executed by IPS module 85, DIAG. EXEC. module 88 instructs IPS module 85 via SYS. DIAG module 83 to execute said DIAG mode. As a result, the IPSB bypass mode executing module in IPS module 85 stored in VCPU 4 is activated, bringing WOPTN signal to L level. When the setting is completed, IPS module 85 notified SYSTEM module 82 of that effect and SYSTEM module 82 instructs each of the remotes to execute copying. Consequently, switches 733, 734, 735, 736 and 737 are connected as shown by dashed lines in FIG. 11 and IPS-B board 6 is isolated from the signal line.

If the copy image obtained has nothing abnormal, it is confirmed that the trouble has occurred in IPS-B board 6. If the copy image is abnormal, one may safely conclude that a trouble has occurred in IPS-A board 5. This is the result of IPSB bypass mode. Thus, by executing both IPSA bypass mode and IPSB bypass mode, the trouble that has occurred in IPS-A board 5 can be isolated from the trouble having occurred in IPS-B board 6.

The foregoing description assumes the copying of a document but it will be apparent to one skilled in the art that the intended trouble isolation can be accomplished using the PGs already described in connection with PG copy mode in (2).

The procedures to be performed by the operator in executing the IPS bypass mode are as follows. First, predetermined procedures are performed on UI 9 to give instructions for IPS bypass mode. Then, a scene will appear on the screen as shown in FIG. 10(o). If the operator depresses "IPS-A BYPASS" button or "IPS-B BYPASS" button on the screen, the desired IPS bypass mode can be executed. As in the PG copy mode, the conditions for executing copying are set using "JOB PROGRAM" button.

(4) Video Interface Signal Check

For proper copying, IIT, IPS and IOT are required to operate in synchronism with one another. To this end, various sync signals are generated at predetermined times and used in the copier under consideration. If any one of such sync signals lacks, copying can no longer be performed normally and this fault causes the copier to stop its operation. Therefore, if the copier stops operating during the execution of copying, it is necessary to check as to whether those sync signals were actually generated.

Checking for the presence of signals or checking the timed relationship between signals is usually performed with the aid of oscilloscopes and other measuring instruments. However, sync signals generally have short pulse widths and are not always easy to measure. In addition, great skill is necessary to verify the timed relationship of many sync signals. What is more, it is cumbersome for servicemen to carry measuring instruments with themselves. Under these circumstances, the video interface signal check to be described below may be used with advantage to enable checking for the actual generation of any of the sync signals used.

Figure 12A:
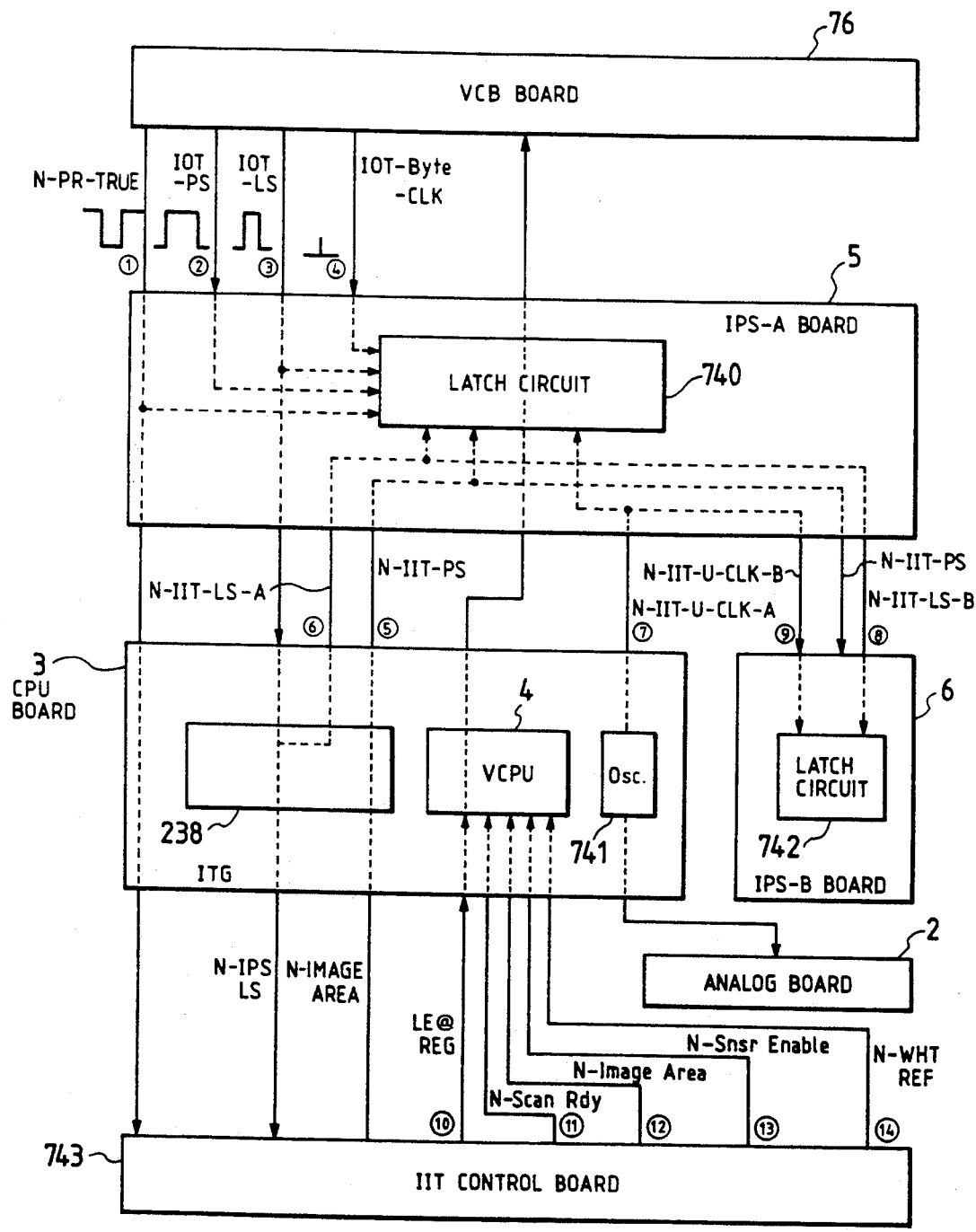
Figure 12B:
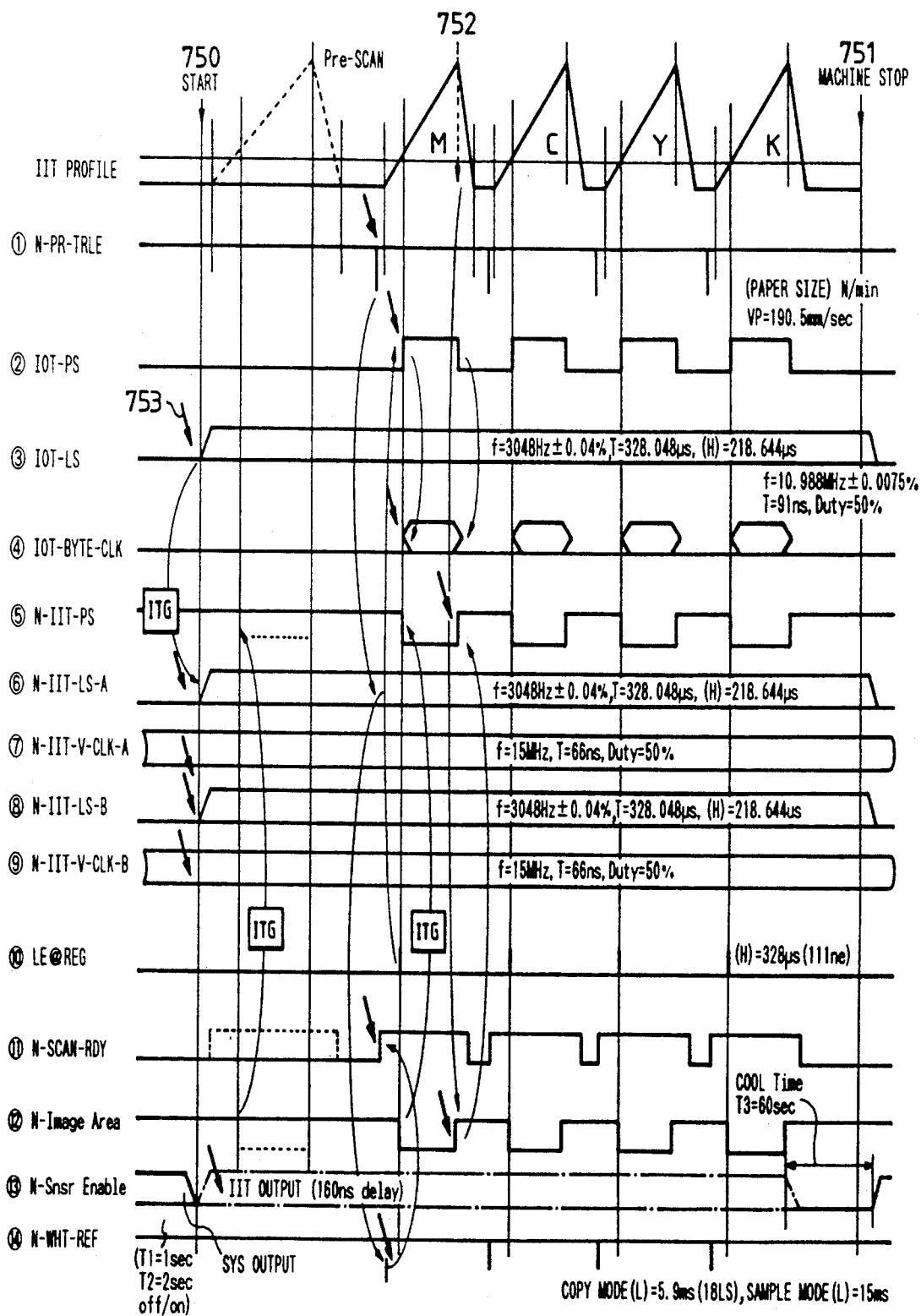

FIG. 12(a) shows an example of the circuit configuration for performing video interface signal check. FIG. 12(b) is a timing chart for various sync signals. Referring to these diagrams, 14 sync signals tagged with numbers 1-14 are first described below.

Negative-PR-TRUE (hereinafter abbreviated as "N-PR-TRUE") signal (1) is the same as PR-TRUE signal shown in FIG. 4 and it determines the timing of starting IIT scan. This signal is generated on VCB (video circuit board) board 76 (see FIG. 3) and is supplied not only to latch circuit 740 on IPS-A board 5 but also to IIT control board 743 which is stored in IU 1.

IOT Page synchronous (hereinafter abbreviated as "IOT-PS") signal (2) is a sync signal having a pulse width that corresponds to document length, or the length in the subsidiary scanning direction during the writing of binary coded image data on a light-sensitive material 41 with a laser light source 40. This sync signal is used only in IOT and not in IIT or IPS. It is supplied to latch circuit 740 for executing the video interface signal check under consideration.

IOT Synchronous (hereinafter abbreviated as "IOT-LS") signal (3) is a sync signal that rises simultaneously with the start of copying and which is generated at each line scanning with laser light source 40 as shown in FIG. 12(b). This sync signal has a frequency of 3048 Hz, a period of 328.048 μsec and a "H" level duration of 218.644 μsec. The IOT-LS signal (3) is supplied to latch circuit 740. It is also supplied to ITG 238 on CPU board 3, where it is delayed by a predetermined amount to produce negative IIT line synchronous (hereinafter abbreviated as "N-IIT-LSA") signal (6) which is then supplied to IPS-A board 5. Further, IOT-LS signal (3) is converted to negative IPS synchronous (hereinafter abbreviated as "N-IPS-LS") signal in ITG 238 and supplied to IIT control board 743.

IOT Byte clock (hereinafter referred to as "IOT-Byte-CLK") signal (4) is a sync signal used during the writing of binary coded image data on light-sensitive material 41 with laser light source 40. It has a frequency of 10.988 MHz, a period of 91 nsec nd a duty factor of 50%. The IOT-Byte-CLK signal (4) is not used in IIT or IPS but it is supplied to latch circuit 740 for executing the video interface signal check under consideration.

Negative IIT page synchronous (hereinafter referred to as "N-IIT-PS") signal (5) is a sync signal that is held at L level during document scanning. It falls when IIT passes by the REG position and maintains L level until document scanning ends. This sync signal is generated by delaying a negative image area (hereinafter referred to as "N-Image-Area") signal in ITG 238 for a predetermined time. N-Image-Area signal is generated from IIT control board 743. The N-IIT-PS signal (5) is supplied to IPS-A board 5 for use in image processing and the signal is also supplied to latch circuit 740. The N-IIT-PS signal (5) is further supplied from IPS-A board 5 to IPS-B board 6 for use in image processing.

Negative IIT line synchronous A (hereinafter referred to as "N-IIT-LS-A") signal (6) is a signal that synchronizes with the line scanning of IIT. As already mentioned above, this sync signal is obtained by delaying IOT-LS signal (3) in ITG 238 for a predetermined time. It is supplied to IPS-A board 5 for use in synchronization of image processing. The signal is also supplied to latch circuit 740 for executing the video interface signal check under consideration. Therefore, this sync signal is identical to IOT-LS signal (3) in terms of frequency, period and the duration of H level The N-IIT-LS-A signal (6) is also supplied to IPS-B board 6 as negative IIT line synchronous B (hereinafter abbreviated as "N-IIT-LS-B") signal (8), which is not only used for synchronizing the image processing in IPS-B board 6 with the operation of other remotes but also supplied to latch circuit 742 for executing the video interface signal check under consideration.

Negative IIT video clock (hereinafter abbreviated as "N-IIT-V-CLK-A") signal (7) is a sync signal used for pixel data transfer. It is generated by a reference oscillator 741 on CPU board 3 and supplied to IPS-A board 5 for use in image processing. The sync signal is also supplied to latch circuit 740 for executing the video interface signal check under consideration. As shown in FIG. 9(b), N-IIT-V-CLK-A signal (7) has a frequency of 15 MHz, a period of 66 nsec and a duty factor of 50%. The output of reference oscillator 741 is also supplied to analog board 2 for use in sample/holding, A/D conversion, etc.

N-IIT-V-CLK-A signal (7) is supplied from IPS-A board 5 to IPS-B board 6 for use in image processing on that board. The signal is also supplied to latch circuit 742 for executing the video interface signal check under consideration. The sync signal supplied to latch circuit 742 is negative IIT video clock B (hereinafter referred to as "N-IIT-V-CLK-B") signal (9).

Lead edge reg (hereinafter referred to as "LE@-REG") signal (10) is a sync signal that is produced from IIT control board 743 when IIT starts scanning for reading image information from the document. It is a pulse signal having a H level duration of 328 μsec. The LE@REG is supplied to VCPU 4 and it is also supplied to VCB board 76 for notifying it of the start of document reading with IIT.

Negative scan ready (hereinafter referred to as "N-SCAN-RDY") signal (11) is a sync signal that is generated when IIT starts scanning and which lasts until it returns to the home position. This sync signal is supplied from IIT control board 743 to a predetermined INTERRUPT terminal of VCPU 4.

Negative image area (hereinafter referred to as "N-IMAGE-AREA") signal (12) is a sync signal that lasts as long as IIT reads image information from the document and it is supplied from IIT control board 743 to a pre-determined I/O port of VCPU 4.

Negative sensor enable (hereinafter referred to as "N-SNSR-ENABLE") signal (13) is a sync signal that enables a clock signal that drives the CCD line sensor assembly. This sync signal is supplied from IIT control board 743 to a predetermined I/O port of VCPU 4.

Negative white reference (hereinafter referred to as "N-WHT-REF") signal (14) is a sync signal that triggers the reading of white reference data from the white reference plate for shading purposes. The signal is supplied from IIT control board 743 to a predetermined INTERRUPT terminal of VCPU 4.

In the circuit configuration shown in FIG. 12(a), latch circuits 740 and 742 may be composed of an LSI having a flip/flop or latch capability.

Suppose here that the operator performs predetermined procedures on UI 9 and gives instructions for executing the video interface signal check under consideration. The relevant button information is interpreted by DIAG. EXEC. module 88 in MCB node and IPS module 85 stored in VCPU 4 is informed of the issuance of the instructions for executing the video interface signal check. In response to this, IPS module 85 resets latch circuits 740 and 742 and stand by. At the same time, the module sends a "ready" (RDY) signal of SYSTEM module 82 to inform it of the completion of the preparation for the video interface signal check under consideration. As a result, SYSTEM module 82 causes each of the remotes to execute copying. When copying starts at the time indicated by 750 in FIG. 12(b), the 14 sync signals are generated with the timed relation shown in FIG. 12(b) and are latched at the times shown by arrows 753. When one cycle of copying is completed at the point of time indicated by 752, namely at the time when the cycle of development of magenta color ends, IPS module 85 checks as to whether all of the 14 sync signals are present. Stated more specifically, IPS module 85 accesses latch circuits 740 and 742 and if the level of input port to those latch circuits is "1", the result is found to be "normal" and if the input level is "0", the result is found to be "abnormal". In this way, checking can be made as to whether all of the following sync signals have been properly supplied: N-PR-TRUE signal (1), IOT-PS signal (2), IOT-LS signal (3), IOT-BYTE-CLK signal (4), N-IIT-PS signal (5), N-IIT-LS-A signal (6), N-IIT-V-CLK-A signal (7), N-IIT-LS-B signal (8) and N-IIT-V-CLK-B signal (9). Further, by checking for the occurrence of interruption in VCPU 4 or by detecting the level of I/O port of VCPU 4, checking can be made as to whether all of the following sync signals have been generated: LE@REG signal (10), N-SCAN-RDY signal (12), N-IMAGE-AREA signal (11), N-SNSR-ENABLE signal (13) and N-WHT-REF signal (14). The results of these checking operations are retained in IPS module 85 until the machine stops at the time indicated by 751 in FIG. 12(b) and when the machine stops, SYSTEM module 82 requests IPS module 85 to report the results of checking. In response to the request, IPS module 85 reports the results of checking to SYSTEM module 82. The report is transmitted unaltered from SYSTEM module 82 to DIAG. EXEC. module 88 and displayed on the screen of UI 9 via MCB UI module 86. FIG. 12(c) shows an example of the screen displaying the results of checking; the display contains the names of the 14 sync signals and the results of checking on them. If a certain sync signal is found to have been latched as a result of checking with IPS module 85, it is concluded that said sync signal has been generated and "GOOD" appears on the screen. Otherwise, "NO GOOD" appears. Thus, by looking at the screen, the serviceman can easily recognize which sync signal was not generated, whereupon he is capable of identifying the area where a trouble has occurred.

IPS module 85 performs video interface signal checking not only in a DIAG mode but also during normal copying operation and if even one sync signal is found to be absent as a result of checking, the module will inform SYSTEM module 82 of the fault, whereupon the machine will stop operating. Therefore, checking in DIAG mode differs form the checking during normal copying operation in the following two aspects: first, the machine does not stop and will perform a sequence of operations; second, the results of checking are displayed on the screen.

The procedures described above enable the serviceman to check to see if all of the sync signals that are necessary for performing copying have been generated. As will be readily understood from the foregoing description, the purpose of the video interface signal check is to determine whether all of the sync signals used to time the copying operation have been generated and not to check the timed relation of the respective signals. However, if all sync signals are found to have been generated, one may presume with high probability that those signals have been generated with a prescribed time relation. It is therefore possible to conduct the intended checking within a short time. Further, the hardware that need be added to conduct this checking is no more than latch circuits used to latch sync signals and, therefore, the video interface signal check under consideration can be accomplished without causing any substantial increase in cost.

(5) Failure Bypass Mode

The modules shown in FIG. 4 normally perform fault detection and if a fault is detected by a certain module, it informs a higher-level module of that event and eventually the fault is displayed on the screen of UI 9 by LOW LEVEL UI module 80 which received the message from MCB UI module 86. For example, IPS module 85 performs the video interface signal check during the execution of copying operation as already described in (4), and checking is made as to whether all sync signals have been generated. If a certain sync signal is found to have not been generated, IPS module 85 notifies SYSTEM module 82 of the absence of that sync signal. Then, SYSTEM module 82 transfers that notification unaltered to COPIER EXEC. module 87 which controls all of the jobs relating to fault detection. Receiving that notification, COPIER EXEC. module 87 verifies the occurrence of the fault (i.e. the absence of a sync signal) and instructs the other remotes to stop the copying operation. At the same time, the module 87 informs MCB UI module 86 of the code nuder that corresponds to the fault. MCB UI module 86 then instructs LOW LEVEL UI module 80 to display a fault scene that corresponds to said code number. LOW LEVEL UI module 80 will in turn construct the relevant fault scene and displays it on the screen. By looking at the screen, the serviceman can recognize which sync signal is absent.

As described above, even if a single fault occurs, the machine will usually stop operating and the fault is displayed on the screen of UI 9, whereby servicing of the machine can be completed in a short time. However, some disadvantages can result from the machine shutdown. For instance, the serviceman who confirmed the occurrence of a fault in a certain area may also desire to check for the presence of something abnormal in other areas. Further, a "false" fault may occur in a certain remote in the course of development of a new model of copier on account of bugs in software and this will lead to machine shutdown, eventually making it impossible to check the operation of other remotes.

Even if a fault is detected during copying operation, the machine will not stop and continue to operate if the occurrence of that fault is not reported to COPIER EXEC. module 87. Hence, if, in the case where a certain fault has occurred in one remote, it is desired to check the operation of other remotes, the obvious approach to be taken is to insure that the occurrence of that fault is not reported to COPIER EXEC. module 87. This is the failure bypass mode.

Suppose here that predetermined procedures are performed on UI 9 to select IPS failure bypass mode, followed by depressing of "START" button. The relevant button information will be reported from LOW LEVEL UI module 80 to DIAG. EXEC. module 88 via MCB UI module 86. Then, recognizing that the informed mode is a DIAG mode to be executed by IPS module 85, DIAG. EXEC. module 88 will instruct IPS module 85 via SYS. DIAG. module 83 to execute said DIAG mode. As a result, SYS. DIAG. module 83 causes the respective remotes to execute copying operation and at the same IPS module 85 will execute the IPS failure bypass mode. In this DIAG mode, however, detection of a certain fault is not reported to the higher-level SYS. DIAG. module 83. For example, IPS module 85 checks as to whether various sync signals have been generated but even if a certain sync signal is found to be absent, the module will make no report to SYS. DIAG. module 83. Then, MCB is unable to recognize the occurrence of that fault and the machine does not stop and will continue the copying operation.

The above description of the procedures for the failure bypass mode also applies to the detection of other faults. For example, IPS module 85 is responsible for AGC correction, AOC correction and ΔV dark correction during normal copying If AGC, AOC or ΔV dark is not corrected to fall within predetermined limits, IPS module 85 detects the event as a fault. If IPS failure bypass mode is selected, the detection of those faults is held invalid and DIAG. EXEC. module 88 is not informed of the occurrence of those faults. For instance, even if AGC is not corrected to fall within predetermined limits, this event is not detected as a fault and the machine will continue to operate. IPS module 85 is also responsible for detecting the occurrence of a fault in FP 8 and if an FP filter moves against the user's will, IPS module 85 will detect it as a fault. However, if IPS failure bypass mode is selected, that fault is also neglected. In other words, an accidental movement of the filter is not as a fault and the machine will continue to operate.

Thus, in the failure bypass mode, a fault will not be recognized as such and the machine will continue to operate. This can be utilized for checking the operation of remotes other than the faulty remote or performing trouble isolation.

An example of the display that appears on the screen when the failure bypass mode is selected is shown in FIG. 13. The display is obtained by performing predetermined procedures on UI 9. If "V/CPU BYPASS" button is depressed, all instances of fault detection by IPS mode 85 can be made invalid. If "IIT BYPASS" button is depressed, all instances of fault detection by the IIT module can be nullified.

(6) DOD Level Adjustment

The copier under consideration is designed to detect the position and size of a document on the platen for determining the range of scanning by IU 1, the size of copy paper (when an AUTO PAPER SELECTION mode is selected) or the copying ratio (when paper size is designated). Such document detection (DOD) is performed with a document size detector circuit (hereinafter referred to as "DOD circuit") mounted on IPS-A board. DOD circuit 303 also performs frame erasure, an outline of which is described below.

Figures 14A, 14B:
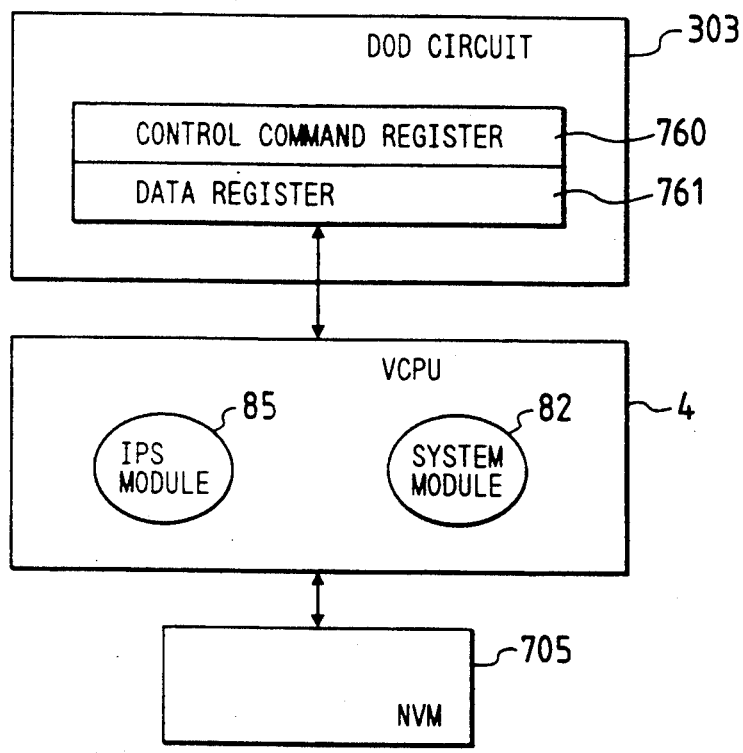

FIG. 14(a) is a diagram illustrating the interface of DOD circuit 303. Being composed of suitable hardware such as an LSI, DOD circuit 303 is controlled by IPS module 85 stored in VCPU 4. DOD circuit 303 is equipped with a control command register 760 for storing control command sent from IPS module 85 and a data register 761 for storing not only the data necessary to perform DOD but also the data obtained by DOD. As shown in FIG. 14(b), data register 761 is composed of ten registers of the following three kinds: registers that hold coordinate values recognized from the document surface and which are four in number (i.e., $x_{min}$ register into which minimum values in the subsidiary scanning direction are written with the scale being in ⅛ millimeters, $x_{max}$ register into which maximum values in the subsidiary scanning direction are written with the scale being in ⅛ millimeters, $y_{min}$ register into which minimum values in the main scanning direction are written with the scale being in 1/16 millimeters, and $y_{max}$ register into which maximum values in the main scanning direction are written with the scale being in 1/16 millimeters); registers that set criteria for identifying the background color of the platen and which are three in number (i.e., platen slice level Y register which stores reference values for Y color, platen slice level M register which stores reference values for M color, and platen slice level C register which stores reference values for C color); and registers that set the DOD valid range and which are three in number (i.e., DOD start register which stores the coordinate values in the main and subsidiary scanning directions at which DOD is started, DOD end x register which stores the coordinate values in the subsidiary scanning direction where DOD ends, and DOD end y register which stores the coordinate values in the main scanning direction where DOD ends).

NVM 705 has ten kinds of data for DOD stored at predetermined addresses as shown in FIG. 4(c) and those 10 kinds of data are as follows: coordinate values in the subsidiary and main scanning directions, Xmin, Xmax, Ymin and Ymax, which set the area where DOD is held valued; DOD threshold level; threshold levels for frame erasure of Y, M and C colors; data on the noise filter for frame erasure; and data on the amount of adjustment for frame erasure. Since the copier under consideration is capable of copying documents of up to A3 size, the DOD valid area is up to 432 mm in the subsidiary scanning direction and up to 300 mm in the main scanning direction, and typically, Xmin, Xmax, Ymin and Ymax are set at 0, 432, 0 and 300, respectively. Further, the DOD threshold value and the frame erasure threshold values for Y, M and C colors are given in 8 bits, so each of those values can be set at 256 levels within the range of 0–255.

When "START" button is depressed, SYSTEM module 82 stored in VCPU 4 instructs each of the remotes to execute copying and IPS module 85 reads data for DOD out of NVM 705 and sets it in data register 761. In this case, the DOD threshold value of NVM 705 is set unaltered as a slice level in each of the Y, M and C platen slice level registers. This will produce the same slice level for Y, M and C but no inconvenience will usually result. Needless to say, different slice levels may be set for Y, M and C.

Figures 14C, 14D:
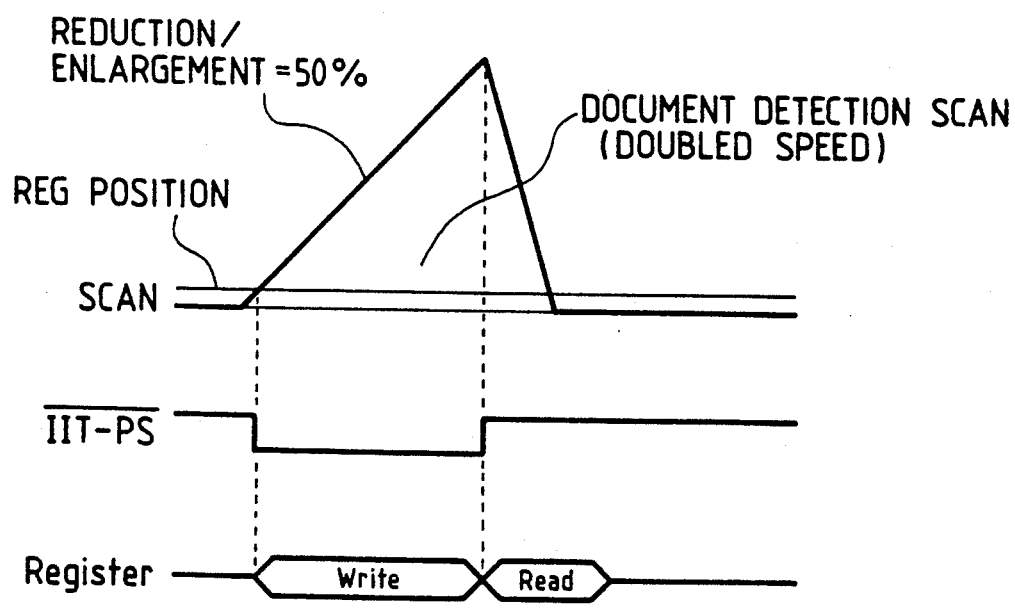

Valid area data Xmin and Ymin are set in DOD start register; valid area data Xmax is set in DOD end x register; and valid area data Ymax is set in DOD end y register. After relevant data has been set in data register 761 in this manner, a copying operation is started. In practice, however, the copying cycle is preceded by prescan for DOD, or scan for document direction. Since scan for document detection involves only the process of DOD, scanning is performed at a speed twice the usual value (i.e., *reduction-enlargement ratio*=50%) over the range that is set as the DOD valid area, as shown in FIG. 14(d). During the period for which N-IIT-PS signal remains at L level, namely, during the period from the time when IU 1 passes by the REG position to the time when it stops scanning, data is written into $x_{min}$ register, $x_{max}$ register, $y_{min}$ register and $y_{max}$ register in data register 761. When RETURN is started, IPS module 85 reads the associated data, $x_{min}$, $x_{max}$, $y_{min}$ and $y_{max}$, out of data register 761 and reports them to SYSTEM module 82, which in turn determines the scan range of IU 1, the paper size (when AUTOMATIC PAPER SELECTION is selected) or the copying ratio (when the paper size has been determined).

Figure 14E:
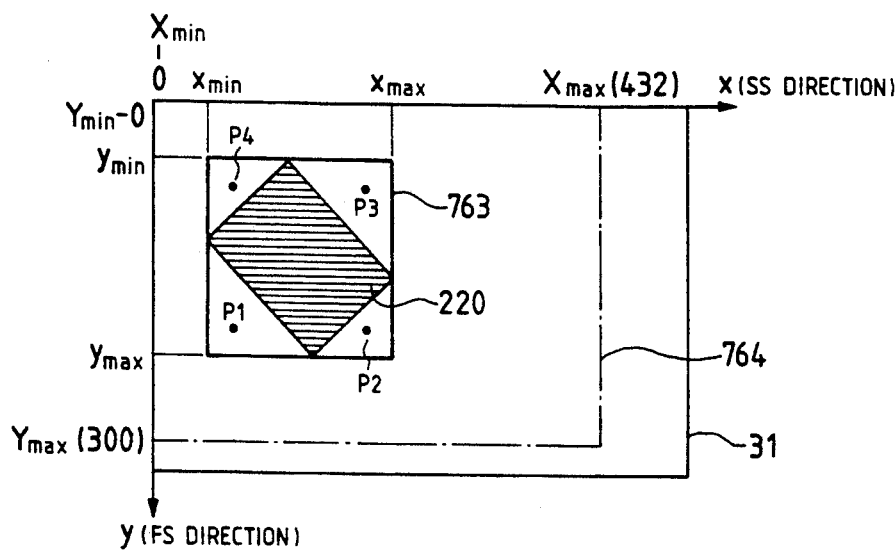
Figure 14F:
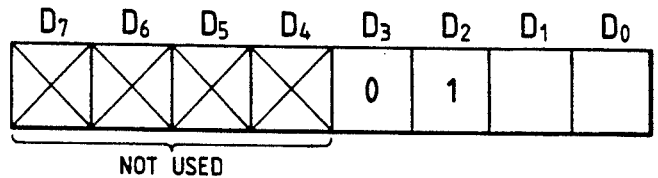
Figure 14G:
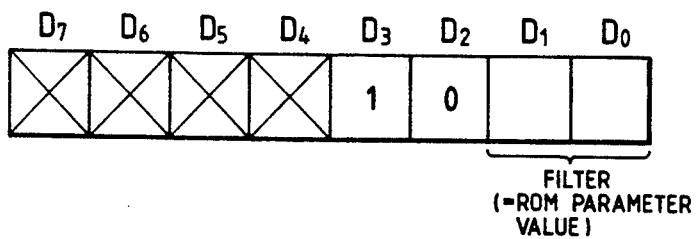
Figure 14H:
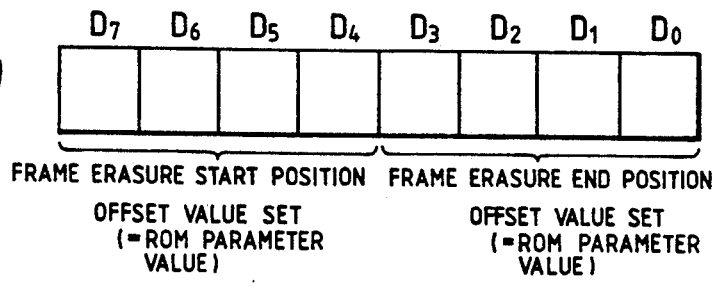

The position and size of the document are detected in the following manner. An area having a color that does not coincide with the background color of the platen is recognized as the document by DOD circuit 303 which then determines the coordinate values of that area. To this end, DOD circuit 303 reads image information from each pixel and determines whether it belongs to the document or the background of the platen. To do this, the Y, M and C levels of each pixel are compared with the Y, M and C platen slice levels set in data register 761 and if the former are higher than the latter, the pixel is judged to belong to the background of the platen. If the former levels are equal to or lower than the latter levels, the pixel of interest is judged to belong to the document. Further, the copier under consideration does not have a "rotate" capability for rotating image, so the document is to be recognized as being placed on the platen parallel to both the main and subsidiary scanning directions. The features described above provide the copier with the ability to detect document size and position and cancel the area outside the document. Suppose here that document 220 is placed on platen glass 31 in an oblique way as shown in FIG. 14(e). By DOD scanning, four coordinate values, $x_{min}$, $x_{max}$, $y_{min}$ and $y_{max}$, indicated in FIG. 14(e) are obtained in data register 761. After DOD scanning, those coordinate values are read from the register, thereby determining the size of document 220 and the position in which it is placed on the platen. In the case shown in FIG. 14(e), the document is recognized to have a size indicated by a rectangle 763. Long and short dashed line 764 represents the DOD valid area which is set by the valid area stored in NVM 705. During scanning in copying cycle, the document area is read for each main scanning and the area outside the document is canceled by replacing it with white color. For example, if copying is performed with the document placed as shown in FIG. 14(e), points $P_1$, $P_2$, $P_3$ and $P_4$, which are outside the document are replaced by white color and a white image will appear on the copy paper except for the image of document 220. During DOD scanning, IPS module 85 sets control command in DOC-DET-CTRL-0-REG (i.g., a predetermined register in control command register 760) as shown in FIG. 14(f). Bit $D_2$ represents functional change of input signal and "1" is assigned to DOD mode and "0" to input frame ensure mode. Bit $D_3$ represents functional change of from erasure and "1" is assigned to the presence of a frame to be erased and "0" to the absence of such frame. Accordingly, the command shown in FIG. 14(f) designates DOD without frame erasure. Upon completion of DOD, IPS module 85 performs frame erasure by the following procedure: it sets a control command in the predetermined register DOC-DET-CTRL-0-REG as shown in FIG. 14(g); subsequently, it sets the amount of frame erasure by setting a control command in DOC-DET-CTRL-1-REG (i.e., a predetermined register in control command register 761) as shown in FIG. 14(h). The command set in DOC-DET-CTRL-1-REG is such that offset values for the frame erasure end position are set in $D_0$–$D_3$ bits whereas offset values for the frame erasure start position are set in $D_4$–$D_7$ bits. The term "ROM parameter value" used in FIGS. 14(g) and 14(h) means the setting of the values of parameters that are set in a ROM (not shown).

DOD which is performed in the manner described above may sometimes fail to work effectively either on account of deterioration in the background color of the platen cover or flaws on its surface or depending upon the type of document to be copied. For instance, DOD can fail to work effectively with a dark document if the background color of the platen cover is black. Under these circumstances, it is effective to reset the DOD threshold value of NVM 705 by employing NVM Read/Write mode as a DIAG mode but to this end, it is necessary to check whether or not effective DOD can be performed with the reset DOD threshold value. The DOD level adjustment under consideration is conducted to meet this need.

The DOD threshold value written into NVM can be reset by the following procedure. First, predetermined procedures are taken on UI 9 to have the system enter into a DIAG mode and NVM Read/Write mode is designated. Then, a scene as shown in FIG. 14(i) appears on the screen. When "NVM READ/WRITE" button on the screen is depressed, the scene changes to the one shown in FIG. 14(j). The location number, or address, at which the DOD threshold value is stored in NVM 705 is entered by depressing a ten-key pad or scroll button 705, and "CHANGE NVM VALUE" button is depressed to change the setting of that address. Then, the scene changes to the one shown in FIG. 14(k), which displays the NVM location number in the window "NVM LOCATION" and the present setting of that location in the window "CURRENT NVM VALUE". The new setting entered with the ten-key pad is displayed in the window "VALUE ENTERED WITH KEYPAD". Hence, by entering a suitable number with the ten-key pad, the set value of that number is displayed in the window "VALUE ENTERED WITH KEYPAD". If "ENTERED NEW VALUE" button is subsequently depressed, the set value is written in predetermined NVM at a predetermined location (address).

The thus reset DOD threshold value can be checked for its appropriateness by the following procedure. A suitable document is placed on the platen and UI 9 is operated by predetermined procedures to select DOD level adjustment mode. When copying is started, SYSTEM module 82 instructs IU 1 to execute scanning for document detection (DOD scan) and, as in ordinary copying, IPS module 85 causes IU 1 to perform DOD by setting in data register 761 the DOD threshold value that has been newly set in NVM 705. When DOD scan is completed, IPS module 85 reads $x_{min}$, $x_{max}$, $y_{min}$ and $y_{max}$, or the coordinate values stored in $x_{min}$ register, $x_{max}$ register, $y_{min}$ register and $y_{max}$ register, respectively, in data register 761 and each of these coordinate values is reported to SYSTEM module 82 in two bytes, with the command "DOC. INFO COMMAND" tagged as shown in FIG. 14(l). The data stored in data register 761, namely the coordinate values obtained by DOD scan, is expressed on a pixel basis, and IPS module 85 is adapted to report that data to SYSTEM module 82 after it is converted to data expressed in millimeters rather than on a pixel basis. SYSTEM module 82 sends this data unaltered to DIAG. EXEC. module 88 in MCB node, which in turn sends the data to MCB UI module 86. As a result, $x_{min}$, $x_{max}$, $y_{min}$ and $y_{max}$, or the coordinate values that have been recognized by DOD circuit 303 as belonging to the document, are displayed on the screen of UI 9. Thus, by comparing the actual position of the document on the platen with the coordinate values displayed on the screen, the serviceman is capable of determining whether DOD functions normally.

The above example relates to changing the DOD threshold value but it should be noted that the settings of DOD valid area and other DOD-related parameters can also be checked by copying in the DOD level adjustment mode described above.

As will be understood from the foregoing description, the DOD level adjustment mode offers the advantage that servicemen can readily verify the effective working of reset values merely by looking at the display screen. Further, the intended DOD level adjustment can be realized by merely adding software and this contributes to a minimum increase in the operating cost.

(7) Gain/offset Manual Adjustments

As shown in FIG. 9(a), when IU 1 starts to read image information, VCPU 4 calculates optimum gain and offset values on the basis of not only the initial gain and offset values stored at predetermined addresses in NVM 705 but also the white reference data that was read prior to the start of copying and the calculated optimum gain and offset values are set in $D/A_A$ 702 and $D/A_B$ 703, respectively, whereby gain and offset adjustments on dot sequential video signals are effected automatically in AGC 232b and AOC 232c. As shown in FIG. 15(a), NVM 705 typically has initial gain and offset values in platen mode stored for each channel. These initial gain and offset values are set on the basis of the white reference data from the white reference plate that was read when power supply was turned on. Ordinary AGC and AOC are conducted on the basis of those initial gain and offset values. If the copy image obtained suggests the possibility that AGC 232b and AOC 232c did not operate normally, it is necessary to check whether AGC 232b and AOC 232c function normally or to isolate the trouble that has occurred in AGC 232b from the trouble that has occurred in AOC 232c. To do this, one may perform copying with the initial settings of gain and offset values in NVM being intentially changed and determine whether AGC 232b or AOC 232c functions normally. This diagnostic mode is the gain/offset manual adjustments under consideration. This DIAG mode differs from the D/A converter check described in (1) in that the latter is directed to checking only D/A converters whereas in this DIAG mode, the overall operation of AGC circuit 232b and AOC circuit 232c is checked.

The procedures of gain/offset manual adjustments and the operation of IPS module 85 in this DIAG mode are described below. First, the serviceman performs predetermined procedures on UI 9 to have the system meter into a DIAG mode and selects a gain/offset manual adjustment mode. Then, a scene appears on the screen as shown in FIG. 15(b). The scene shows in the window "CURRENT NVM VALUE" the values that are currently stored in NVM 705. New settings are displayed in the Window just above said window. Thus, the serviceman sets desired values with the ten-key pad and depresses "job program" button. He then sets a desired copy mode by creating a scene that is the same as shown in FIG. 10(p) and depresses "START" button to execute copying. It will be understood from the previous discussion that those procedures are performed by MCB UI module 86 and LOW LEVEL UI module 80 under the control of DIAG. EXEC. module 88.

The relevant button information is sent to DIAG. EXEC. module 88 which, upon recognizing that the selected DIAG mode is to be executed by IPS module 85, instructs the IPS module to execute that DIAG mode, with the new settings of gain and offset values being also informed to said IPS module. As a result, IPS module 85 first saves the currently stored initial gain and offset values as backup data at predetermined addresses in another NVM. Then, the module writes the new settings of gain and offset values into NVM 705 at predetermined addresses. The present gain and offset values are saved temporarily because, as will be described below, they have to be stored again in NVM 705 when the DIAG mode under consideration is completed and also because the initial state can be restored if a trouble occurs during gain/offset manual adjustments. When the writing of the new settings is completed, IPS module 85 notifies SYS. DIAG. module 83 of that effect. On the condition that this notification is made, SYS. DIAG. module 83 instructs the respective remotes to execute copying.

By examining the thus obtained copy image, the serviceman can check to see if AGC circuit 232b and AOC circuit 232c function normally.

In the last step, the serviceman depresses "EXIT" button on the screen to exit from the gain/offset manual adjustment mode under execution. As a result, IPS module 85 recovers the gain and offset values that have been saved in another NVM and writes them at predetermined addresses in NVM 705, whereupon the DIAG mode under discussion ends. The reason for recovering the initial gain and offset values are as follows: the gain/offset manual adjustments under consideration are performed for checking to see whether AGC and AOC function normally and to execute this DIAG mode, intentionally various experimental data are set as gain and offset values and an unnatural copy image will be obtained unless they are restored to the initial data.

Figure 14K:
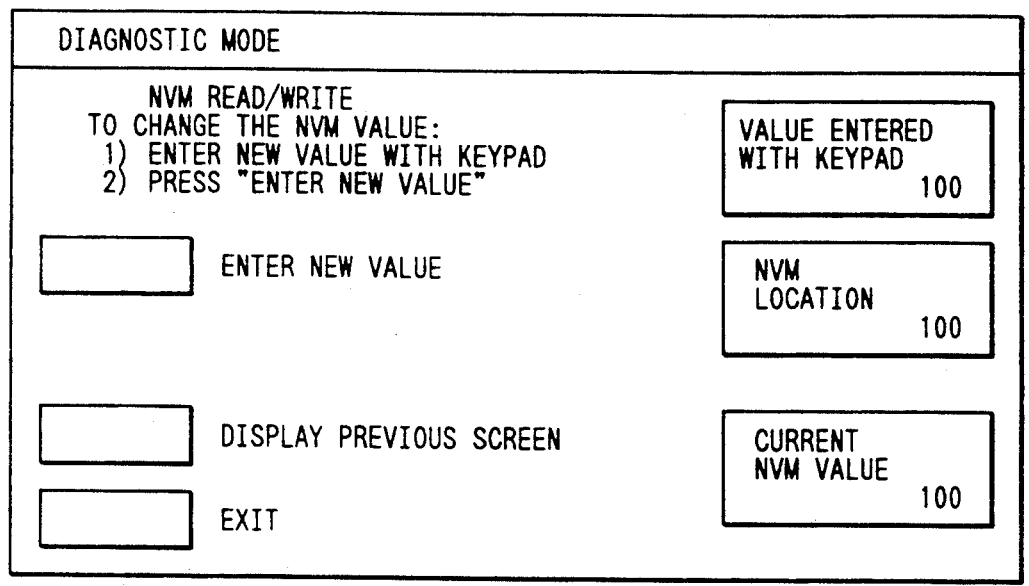
Figure 14L:
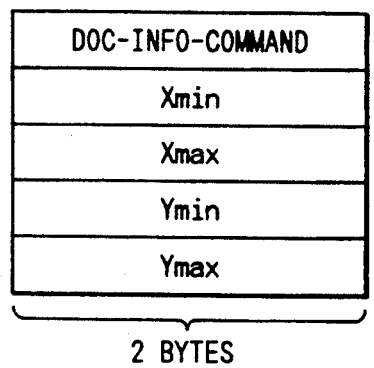

The data stored in NVM can of course be changed by using NVM Read/Write mode as shown in FIGS. 14(i)-14(k) but in that NVM Read/Write mode, the previously written data is not saved but is erased and rewritten. However, erasing the current data for the mere purpose of checking the operation of certain circuits is very risky, so in the gain/offset manual adjustment mode under discussion, the current data is saved temporarily and restored after the execution of the mode ends.

As described above, the gain/offset manual adjustments only need the addition of software to check the operation of AGC circuit 232b and AOC circuit 232c and this contributes to a minimum increase in the operating cost.

(8) Color Margin Adjustment

Among the various editing capabilities of the copier under consideration are those which involve detection of a certain color in the document and they are: color conversion for converting a designated color to another color; marker editing in which a desired edit area of the document is delineated with a marker of a predetermined color and the image in that closed area is extracted or deleted; and a red/black mode directed to a document consisting of black and red colors, in which only the area of one of those colors, say, red, is extracted or deleted. The threshold values for color detection that are necessary to perform these editing operations are preliminarily stored in NVM but depending on the document to be copied by a user, it often occurs that a designated color cannot be detected. For example, in the case of detecting a certain color in a document where colors of the same or similar shades re used, the range of threshold values for color detection has to be narrowed. Further, a broad range of threshold values can potentially cause inaccurate color detection if the document contains color staining or contamination. Under these circumstances, it is necessary to adjust the range of threshold values for color detection, or the range over which various similar colors are recognized to be the same as a designated color. The color margin adjustment mode is the DIAG mode executed to meet this need.

Figure 16A:
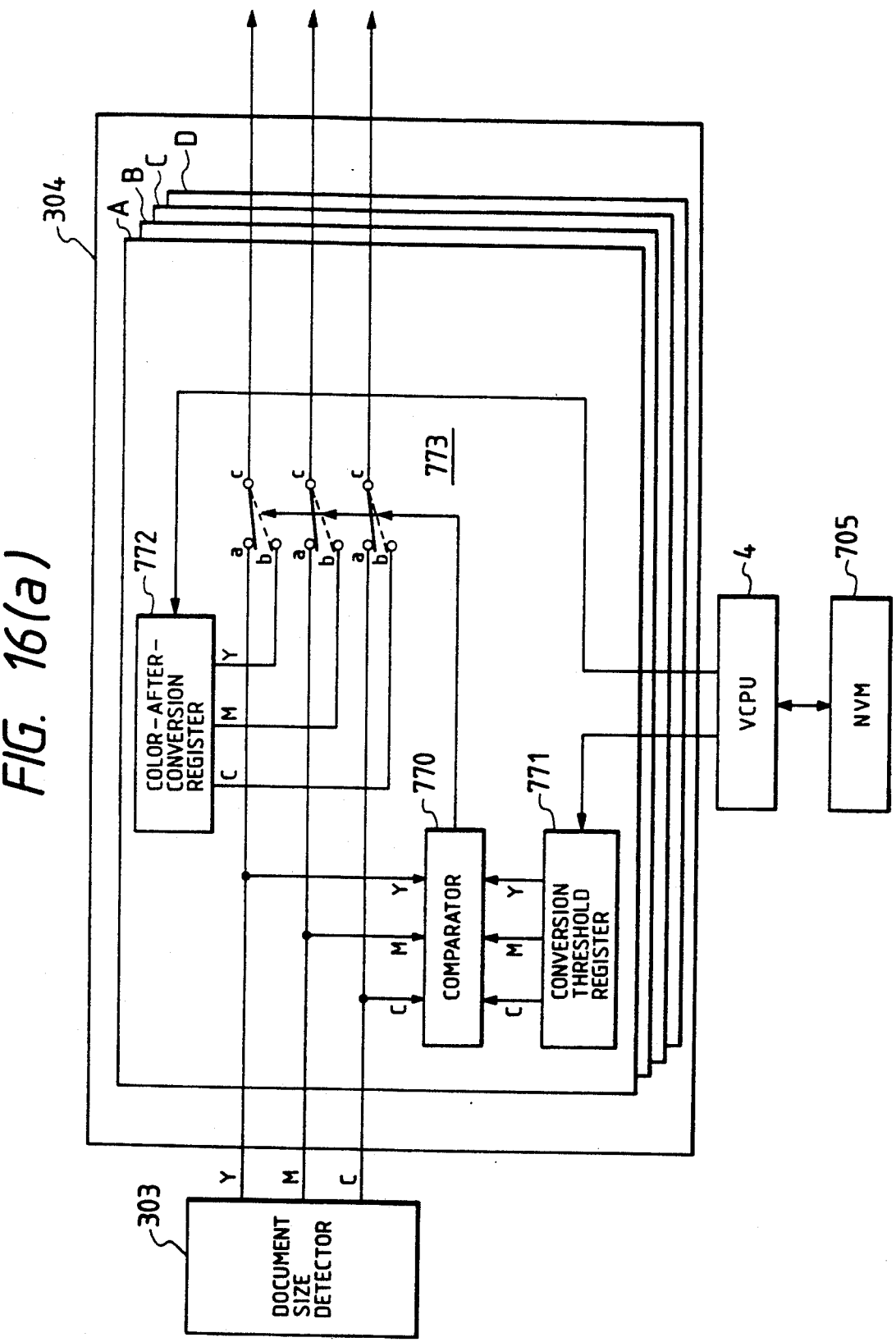
Figure 16B:
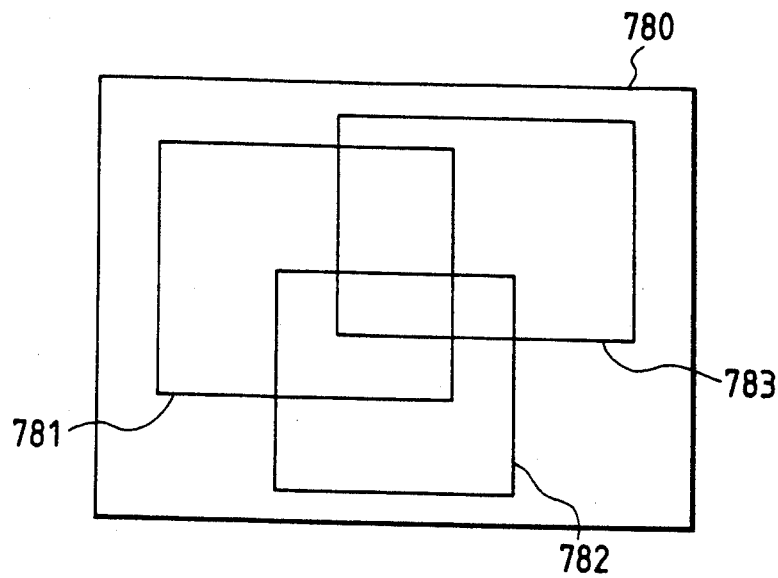
Figure 16C:
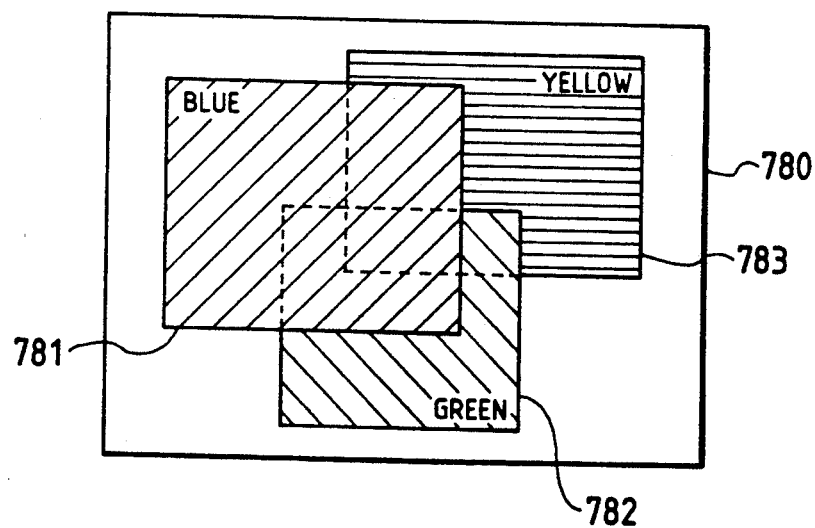

Color detection is first described below with particular reference to color conversion. Color conversion is performed with a color converter circuit 304 that is mounted on IPS-B board 6 and this circuit is configured as shown in FIG. 16(a). The copier under consideration is so designed that color conversion can be effected simultaneously in up to four areas that are set in a document and, hence, the color converter circuit 304 consists of four color converting circuits A, B, C and D having the same composition Considering the possibility that there may be an overlap between four set areas, color converting circuits A, B, C and D are given priority in the order written. Suppose here that three areas 781, 782 and 783 are set in a white document 780 as shown in FIG. 16(b). Also suppose that in area a 781, white is to be converted to blue by means of color converting circuit A, that in area b 782, white is to be converted to green by means of color correcting circuit B, and that in area c 783, white is to be converted to yellow by means of color converting circuit C. Since color converting circuit having higher priority predominate, the image after color conversion will come out as shown in FIG. 16(c). This priority processing is accomplished by IPS module 85 which controls color conversion.

Density signals for Y, M and C which are the output of document size detector circuit 303 are supplied into color converter circuit 304 at one set of input terminals of a comparator 770 and terminals a of a switch 773. The other set of input terminals of comparator circuit 770 are supplied with color data before color conversion from a conversion threshold register 771, namely, Y, M and C density data for recognizing the color to be detected. Terminals b of switch 773 are supplied with Y, M and C color data after conversion from a color-after-conversion register 772.

In the circuit configuration described above, the "color before conversion" (i.e., the color to be detected) and the "color after conversion" are each selected by UI 9 form the color data preliminarily stored in NVM 705 as a gamut of registered colors, designated colors and standard colors. Registered colors are those colors which users obtain by setting desired levels for each of Y, M and C colors as selected from 256 levels of gradation over the range 0–255. Data of registered colors consists of levels that are set for Y, M and C components of each registered color as shown in FIG. 16(d). Designated colors are those colors which are obtained by designating desired colors in the document using an edit pad. Color data obtained by reading with IU 1 is converted to Y, M and C components as shown in FIG. 16(e). Standard colors are those colors which were preliminarily written into NVM 705 when it was delivered from factory. As shown in FIG. 16(f), density data is written for Y, M and C components of each standard color. Desired numbers of colors can be registered, designated and set as standard colors but in the copier under consideration, the registered colors, designated colors and standard colors are each eight in number. Suppose here that the user operates UI 9 to select a desired "color after conversion" from among the registered, designated and standard colors. Then, IPS module 85 reads Y, M and C density data on the selected "color after conversion" out of NVM 705 and sets the data in a color-after-conversion register 772. As shown in FIG. 16(g), a color detection margin for determining threshold values of color detection is set in NVM 705 for each of Y, M and C color components. Upon notification of a "color before conversion" from UI 9, IPS module 85 determines the range of ±a for the density data on Y, M and C components of the notified "color before conversion", and sets the determined range in conversion threshold register 771. This procedure is specifically performed in the following manner. Suppose here that a color having y, M and C densities of 80, 100 and 120, respectively, is selected as a "color before conversion", and also suppose that the margin of color detection (±a) set in NVM 705 is 20, 25 and 10 for Y, M and C, respectively. Then, IPS module reads the density data and color detection margin for Y, M and C components of the notified "color before conversion" out of NVM 705 and performs the mathematical operation ±a on the density data for each color component, whereby values of 60–100, 75–125 and 110–130 are set in conversion threshold register 771 for Y, M and C, respectively as shown in FIG. 16(h).

As long as the densities of Y, M and C components of an input video signal are within the ranges set in conversion threshold register 771, comparator circuit 770 produces an output and permits the switch 772 to connect to color-after-conversion register 772. In other words, referring to FIG. 16(h), the color of the input video signal is judged to be the same as the selected "color before conversion" if the Y, M and C densities of that input video signal are within the respective ranges of 60–100, 75–125 and 110–130. On the other hand, if even one of those color components is outside the ranges set in conversion threshold register 771, the color of the input video signal is not judged to be the same as the selected "color before conversion". Connection of switch 773 is changed in accordance with the output of comparator circuit 770 in such a way that terminal c is connected to terminal b if the input video signal has the same color as the "color before conversion" whereas terminal c is connected to terminal a if the two colors are not the same.

"Colors before conversion" are converted to "colors after conversion" in the manner described above. However, if the margin for color detection that is set in NVM 705 is wide, many colors will be judged to be the same as a selected "color before conversion", so it is inappropriate and must be changed in the case of documents containing many colors of the same or similar shades. If, on the other hand, the color margin is narrow, the latitude in color detection is reduced and it may sometimes occur that the color detection intended by users cannot be accomplished.

Under these circumstances, the serviceman performs predetermined procedures on UI 9 to have the system enter into a DIAG mode and instructs for the color margin adjustment mode. Then, a scene of the same kind as shown in FIG. 15(b) will appear on the screen and the serviceman sets a new margin of ±a for each of the color components Y, M and C on the screen. At the same time, the serviceman depresses "JOB PROGRAM" button to set both a "color before conversion" and a "color after conversion" and subsequently depresses "START" button. The thus set new values are notified from LOW LEVEL UI module 80 to DIAG. EXEC. module 88 via MCB UI module 86 and hence to IPS module 85, which writes those new set values into NVM 705 at predetermined addresses. Further, IPS module 85 sets the notified "color after conversion" in color-after-conversion register 772. At the same time, the module sets data on the detection range in conversion threshold register 771 on the basis of the "color before conversion" and the margin of color detection. Upon forming that these procedures have been completed, SYS. DIAG. module 83 instructs the respective remotes to execute copying. By examining the resulting copy image, the serviceman can check as to whether the desired color conversion has been effected.

While the foregoing description concerns color conversion, it will be apparent to one skilled in the art that the same circuit can be used to detect either a black or red color in a Red/Black mode or detect a marker color in marker editing. Red/Black mode can be selected by depressing "Red and Black" button positioned at the lower left corner of the scene shown in each of FIGS. 7(a) and 7(b) and this mode is capable of deleting or extracting the red area or converting a red color to black or vice versa. Threshold values for detection of a red color are shown in FIG. 16(i), with the upper and lower limits for each of Y, M and C components being stored at desired addresses in NVM 705. These setting can be changed by the same procedures as described above.

In marker editing, a closed area is drawn on the document using a predetermined marker and the image within that area is extracted or deleted. The range for the detection of the marker color is stored in NVM 705, with its construction shown in FIG. 16(j). The serviceman many perform the same procedures as described in the previous paragraphs in order to freely reset the detection range of the marker color. FIG. 16(j) shows the detection range of only one color but it goes without saying that more than one marker color can be used and in that case the detection ranges of the market colors used are written into NVM 705.

As described above, the ranges of color detection can be easily set to desired values merely by adding software for color margin adjustments and this contributes to a minimum increase in the operating cost.

(9) Flesh Color Density Correcting Mode Selection

In copying film images using FP, density correction and adjustment of color balance are two important factors and, therefore, IPS module 85 is adapted to have the capabilities of density correction and color balance adjustment. An outline of these procedures is described below.

Figure 17A:
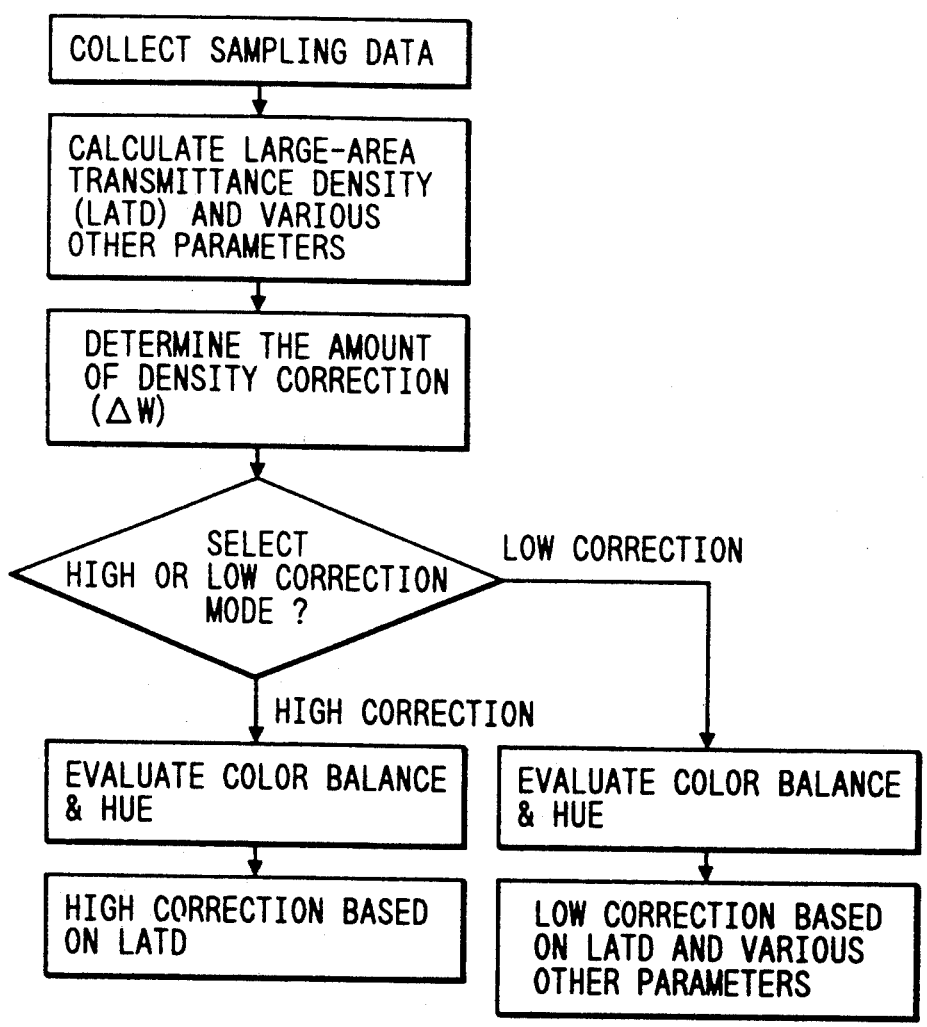

FIG. 17(a) is a flow chart of density correction and color balance adjustment. The process starts with extracting sampling data from a document film. In this step, sampling data is taken at 16 points from one line for each of R, G and B colors. Thirty-two pieces of data are taken at each point of sampling and averaged as follows:

$$\overline{R_{j1}} = \frac{1}{32} \sum_{i=j1}^{j1+31} R_i,$$

$$\overline{G_{j1}} = \frac{1}{32} \sum_{i=j1}^{j1+31} G_i,$$

$$\overline{B_{j1}} = \frac{1}{32} \sum_{i=j1}^{j1+31} B_i.$$

This procedure is taken for 16 lines to extract a total of 256 pieces of data.

Color correction is performed on the basis of each of the thus obtained color separation signals for R, G and B so as to correct color contamination and $\gamma$ values. The correction can be achieved by multiplying the data by predetermined coefficients as follows;

$$\begin{pmatrix} \hat{R} \\ \hat{G} \\ \hat{B} \end{pmatrix} = \begin{pmatrix} q_{11} & q_{12} & q_{13} \\ q_{21} & q_{22} & q_{23} \\ q_{31} & q_{32} & q_{33} \end{pmatrix} \begin{pmatrix} \overline{R} \\ \overline{G} \\ \overline{B} \end{pmatrix}$$

The R, G and B data thus corrected are converted to two-dimensional color coordinates as follows:

$$\begin{pmatrix} \hat{R} - \hat{G} \\ \hat{G} - \hat{B} \\ W \end{pmatrix} = \begin{pmatrix} 1 & -1 & 0 \\ 0 & 1 & -1 \\ 1/3 & 1/3 & 1/3 \end{pmatrix} \begin{pmatrix} \hat{R} \\ \hat{G} \\ \hat{B} \end{pmatrix}$$

where W is the average of R, G and B and represents a white color. The color coordinates are then rotated so that the flesh color area will lie on one axis (say, X-axis) as follows:

$$\begin{pmatrix} X \\ Y \\ W \end{pmatrix} = \begin{pmatrix} \cos\theta & -\sin\theta & 0 \\ \sin\theta & \cos\theta & 0 \\ 0 & 0 & 1 \end{pmatrix} \begin{pmatrix} \hat{R} - \hat{G} \\ \hat{G} - \hat{B} \\ W \end{pmatrix}$$

Figure 17B:
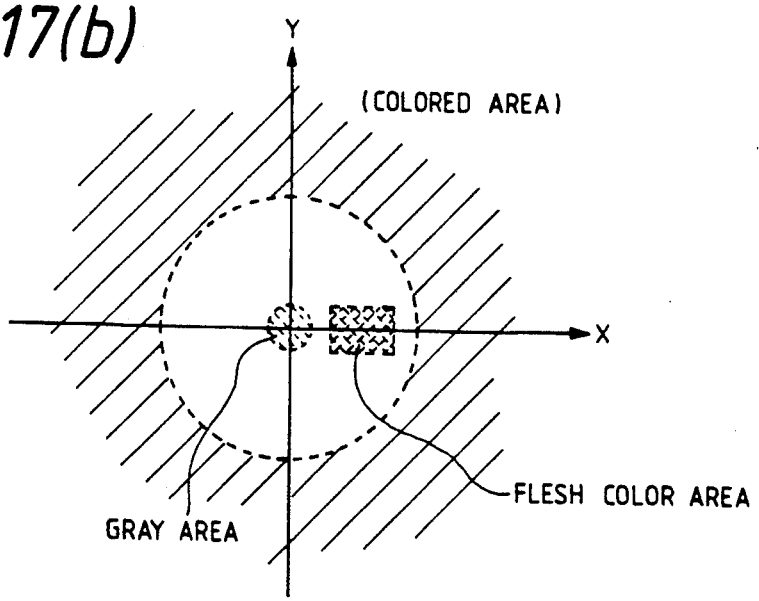

This way, 256 points of sampling data are obtained as two-dimensional coordinates (X, Y) and decision is made as to the assignment of such data $(X_{ij}, Y_{ji})$ to gray area a, flesh color area b or colored area c in FIG. 17(b), with the following parameters being then determined:

(1) Maximum density of the whole area  $WX, X_M, Y_M$
(2) Maximum density of the whole area  $WI$
(3) Flesh colore area: number  $n_F$
    average hue  $X_F, Y_F$
    density  $W_F$
(4) Gray area: number  $n_G$
    average hue  $X_G, Y_G$
(5) Colored area: number  $n_C$
    average hue  $X_C, Y_C$
(6) Whole area: average density  $LATDW$
    average hue  $\Delta X, \Delta Y$
(7) Average contrast of the whole area  $DB$ $$DB = \frac{1}{2n} \sum_{j=2}^{16} \sum_{i=2}^{16} \{|W_{i,j} - W_{i-1,j}| + |W_{i,j} - W_{i,j-1}|\}$$

Figure 17C:
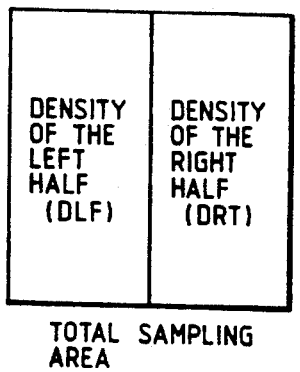
Figure 17D:
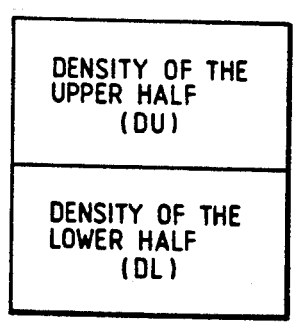
Figure 17E:
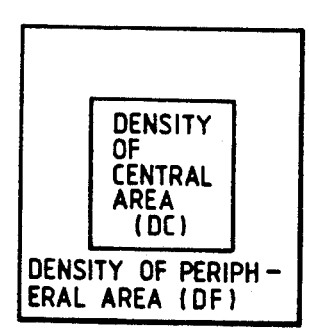

(8) Film: Average density of the upper half  $DU$
    average density of the lower half  $DL$
    average density of the right half  $DRT$
    average density of the left half  $DLF$
    average density of the central area  $DC$
    average density of the marginal area  $DF$ The areas mentioned in (8) are set as shown in FIGS. 17(c)–17(e).

In the next step, the amount of density correction, $\Delta W$, is determined on the basis of the thus obtained data. In determining $\Delta W$, films are classified into the following five types:

(A) Underexposed film
(B) Overexposed film
(C) Low-contrast film
(D) High-contrast film
(E) Standard film.

Then, the term of density correction, $\Delta W_b$, is determined as follows:

$$\Delta W_b = k_1(i) + k_2(i) \cdot WX + k_3(i) \cdot WI + k_4(i) \cdot LATDW + k_5(i) \cdot CF + k_6(i) \cdot UL + k_7(i) \cdot DB + k_8(i) \cdot nG.$$

Using the thus determined term of correction, $\Delta W_b$, the amount of density correction $\Delta W$ is calculated by one of the following two methods:

(a) If a flesh color is detected ($n_F \geq n_{FO}$), the relation $$\Delta W_a = W_F - W_{FON}(i)$$

($W_F$ is the average density of flesh color points, and $W_{FON}$ is the standard density of flesh color points) is used to obtain $$\Delta W = \Delta W_b \cdot \alpha(i) + \Delta W_a\{1 - \alpha(i)\}$$

(i is a numeral dependent on classification (A)–(E));

(b) If no flesh color is detected, $$\Delta W = \Delta W_b$$

With the amount of density correction $\Delta W$ ($\Delta W_a$, $\Delta W_b$) being thus determined, color balance is then checked.

In the usual case, ($\Delta X$, $\Delta Y$) are converted to polar coordinates (r, $\theta$) as shown in FIG. 17(f), and the amounts of correction (r, $\theta$) at the points indicated by open circle in FIG. 17(f) are used as references for data correction between those points by using the following relation:

Amount of correction of color balance $$\frac{\Delta X}{\Delta Y} = CB \cdot \frac{\Delta X}{\Delta Y}$$

$(0.2 \leq CB \leq 1.0)$.

The correction described above is set as "low correction". The copier under discussion is furnished with a table containing the amounts of correction CB (r, $\theta$) at the points indicated by open circles in FIG. 17(f).

The DIAG mode under discussion is also furnished with the following four conditions for detecting color failures.

(1) If $$N_C \cdot \frac{(X_c \cdot \Delta X + Y_C \cdot \Delta Y)}{\sqrt{\Delta X^2 + \Delta Y^2}} \geq C_2 \text{ (constant)}$$

the document film is judged to contain much coloring with uneven hues as well as high average chroma of colored data. Stated more specifically, the chroma of each sampling point is checked to see if it is a colored point and the result is evaluated by the following function:

$$n_c \cdot \frac{(X_c \cdot \Delta X + Y_C \cdot \Delta Y)}{\sqrt{\Delta X^2 + \Delta Y^2}} =$$

$$n_c \cdot \frac{\sqrt{\Delta X^2 + \Delta Y^2} \sqrt{X_c^2 + Y_c^2}}{\sqrt{\Delta X^2 + \Delta Y^2}} \cos\theta =$$

$$n_c \cdot \sqrt{X_c^2 + Y_c^2} \cdot \cos\theta$$

where $n_c$ is the number of points judged to be colored points, and ($X_c$, $Y_c$) represents the average hue of a colored point. If $n_c$, or the number of points judged to be colored points, is high, the value of the evaluation function increases and the document film is regarded as containing a color failure. Even in the presence of extremely colored points, the value of the evaluation is low if their number is small, with the result that the document is not regarded as containing color failures. Symbol $\theta$ in the evaluation function represents the angle of deviation of the average hue of a frame ($\Delta X$, $\Delta Y$) from that of colored areas ($X_c$, $Y_c$), as shown in FIG. 17(g).

It should be noted here that even if $n_c$, or the number points judged to be colored points, is high, the value of the evaluation function will not be great if the colored points have uneven hues to produce a low average chroma $$(\sqrt{\Delta X^2 + \Delta Y^2})$$

and the document is not regarded as having color failures.

In addition, the document also is not regarded as containing color failures if the average hue of the whole area ΔX, ΔY) deviates greatly from that of colored areas ($X_c$, $Y_c$) since $\cos\theta$ is small and so is the value of the evaluation function. A typical example of this case is a document that show a brilliant yellow flower against a light blue (not colored) background, in which the colored area does not affect the average hue of the whole region.

(2) If $n_F > n_{FCO}$ (set constant) and $$(X_F - X_{FO})^2 + (Y_F - Y_{FO})^2 q \leq F_2$$

the detected flesh color is regarded as having not changed.

(3) If $n_G > n_{GCO}$ (set constant) and $$X_G^2 + Y_G^2 \leq G_2$$

a gray color is detected and regarded as having not changed.

(4) If $$X_M^2 + Y_M^2 \leq G_3$$

the hue of maximum-density points is regarded as being not uneven.

By taking the logical sum of the four conditions (1)–(4), a color failure is detected so that automatic correction of color balance is performed while the occurrence of color failures due to excessive correction is prevented as much as possible.

In short, the conditions (1)–(4) are positively used to detect color subject failures and if they are detected, the amount of color correction is reduced to satisfy the relation CB=(½)CB. In practice, however, the positive detection of color failures (i.e., the color imbalance of LATD due to unevenness in the color of a subject itself) can sometimes result in the failure to effectively compensate for color case, or unevenness in the color of illumination.

Under these circumstances, a key for setting "high correction mode" is provided. If the operator finds a certain LADTD difference in color shades by taking an actual copy, he depresses this key to have the system enter into "high correction mode" so that the imbalance in LATD, ΔX and ΔY, will be corrected unconditionally.

Then, on the basis of the determined amounts of correction for color balance, ΔX and ΔY, as well as the amount of density correction, ΔW, the amount of density correction for R, G and B (ΔR, ΔG, ΔB) are calculated as follows:

$$\begin{pmatrix} \Delta R \\ \Delta G \\ \Delta B \end{pmatrix} = \begin{pmatrix} a_{11} & a_{12} & a_{13} \\ a_{21} & a_{22} & a_{23} \\ a_{31} & a_{32} & a_{33} \end{pmatrix}^{-1} \begin{pmatrix} \Delta X \\ \Delta Y \\ \Delta W \end{pmatrix}$$

where

-continued $$\begin{pmatrix} X \\ Y \\ W \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} R \\ G \\ B \end{pmatrix}.$$

On the basis of the thus determined amounts of density correction (ΔR, ΔG, ΔB), the values of $D_{adj}$ in registers in the shading circuit are rewritten and, at the same time, the gain of amplifiers and the lamp voltage are changed. The lamp voltage is to be changed only when the document is a reversal film. Further, the table of END curves which are the output of IIT is also changed on the basis of those amounts of density correction (ΔR, ΔG, ΔB).

In the manner described above, film images can be copied in F/P mode with underexposure, overexposure, density failure or color failure being effectively corrected in the produced copy.

In density correction and color balance adjustment which are performed in the manner described above, the flesh color which bears particular importance as a memory color is corrected for density if the number of points having a density comparable to the flesh color is within predetermined limits. However, such correction of the density of flesh color can sometimes produce an unnatural flesh color and in such situations where the correction of the density of flesh color is not advisable, precaution should be exercised not to perform correction of the density of flesh color.

NVM 705 has 1-bit data stored at a predetermined address for determining whether correction of the density of flesh color should be performed or not, as shown in FIG. 17(h). The data may be so constructed that if the bit is "0", correction of the density of flesh color is performed whereas if it is "1", no correction is made. If FP copy mode is selected in the presence of such 1-bit data, IPS module 85 first accesses the bit and if it is "0", correction of the density of flesh color is performed in accordance with the flow chart shown in FIG. 17(a). However, if the bit is "1", the routine of that correction in FIG. 17(a) is bypassed and no action is taken to correct the density of flesh color. Hence, the "flesh color density correcting mode selection" under discussion is a mode in which the bit stored in NVM 705 is set to either "0" or "1" depending on the need. Suppose here that the serviceman performs predetermined procedures on UI 9 and has the system enter into a DIAG mode. When he instructs for selecting the mode of correcting the density of flesh color, the values currently stored in NVM 705 are displayed on the screen and a request is made to enter "0" or "1". In response to this request, the serviceman may enter "0" or "1" with a ten-key pad or by some other suitable input means so as to perform or not perform the correction of the density of flesh color depending on the value entered. In the foregoing description, it is assumed that the density of flesh color is corrected if the value entered is "0". It will, however, be apparent to one skilled in the art that software may be so designed that the intended correction is performed when "1" is entered.

As described on the foregoing pages, the "flesh color density correcting mode selection" enables or disables the correction of the density of flesh color merely by entering either "0" or "1" at a predetermined address in NVM 705. Hence, the serviceman is capable of completing the necessary servicing in an easy and efficient way.

(10) FP Registration Adjustment

The copier under discussion is adapted to produce copies from positive or negative color films either by projection with FP Or by placing them in contact with the platen glass. Scan areas are set as shown in FIG. 18(a) depending upon film size, film type (negative or positive) or exposure method (projection or contact exposure). In FIG. 18(a), the term "vert./hori." means that the film is placed either vertically or horizontally, and the term "free" means that the film can be placed not only vertically or horizontally but also obliquely since it is not a single film but composed of several uncut films. Companies A, B and C in the "Manufacturer" column refer to the names of manufacturers of the films that are commonly used. The term "registered" means that those films which are not preset but which are commonly selected by users are registered in the machine. The term "others" refers to those films which are manufactured by companies other than A, B and C and which are not registered. SCAN AREAS X0 and X1 represent the start and end points, respectively, of scanning in the subsidiary scanning direction (i.e., the start and end positions of scanning with IU 1), and SCAN AREAS Y0 and Y1 represent the start and end points, respectively, of scanning in the main scanning direction (i.e., the positions in which the production of an output from CCD line sensor assembly that is held to be a valid image by IPS starts and ends).

Figure 18B:
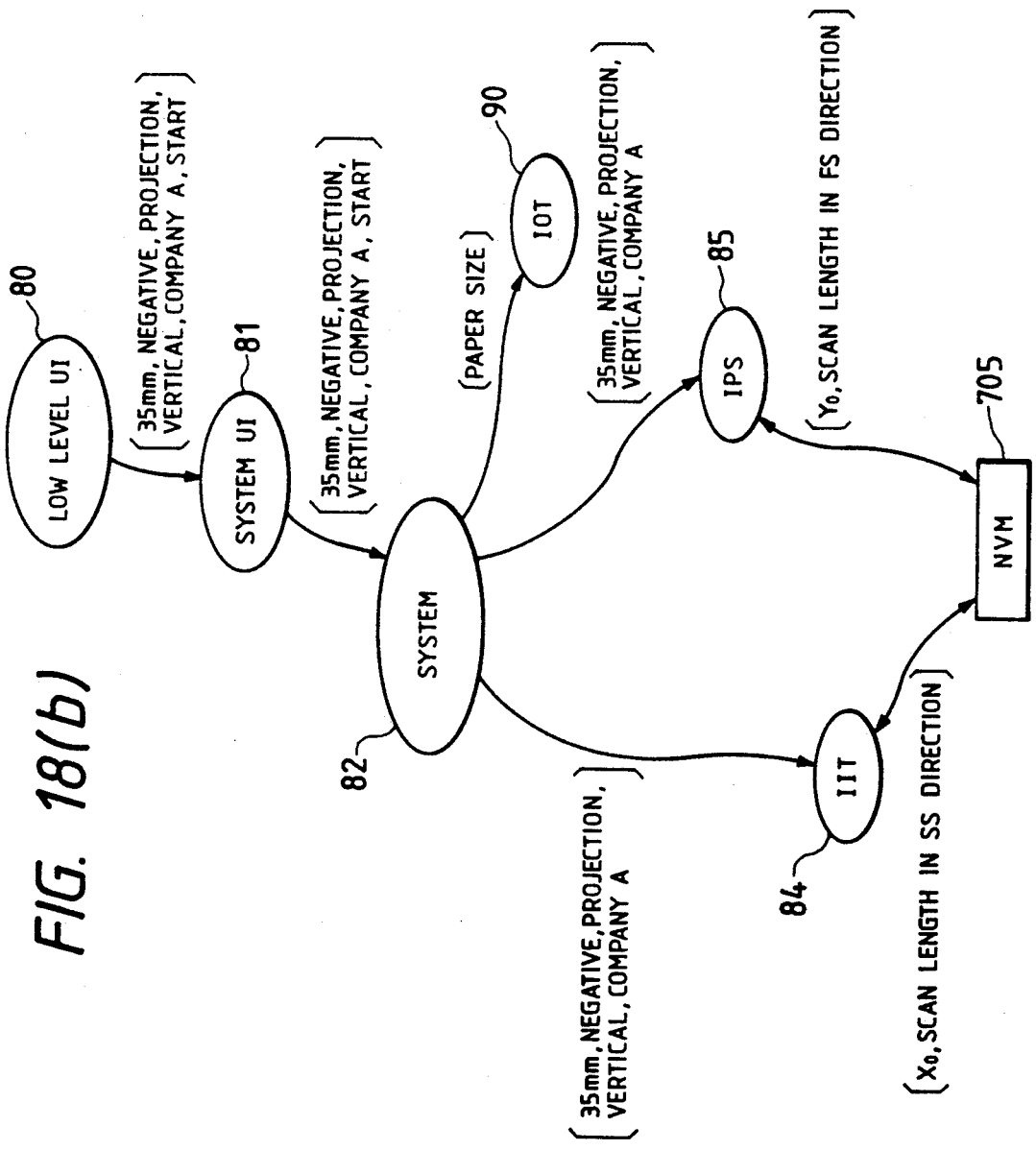

An outline of data flow in FP copy mode is as follows. Suppose that the user sets a 35-mm negative film (product of Company A) on FP vertically and performs copying by projection onto the platen glass. The user enters these setting conditions on UI 9 and depresses "START" button. As shown in FIG. 18(b), the relevant button information is notified from LOW LEVEL UI module 80 to SYSTEM module 82 via SYSTEM UI module 81. SYSTEM module 82 informs remote controlling modules such as IIT module 84 and IPS module 85 of the information necessary to execute copying under the conditions set by the user. IIT module 84 determines scan start position X0 and scan end position X1 based on the copy executing conditions notified from SYSTEM module 82 and further accesses NVM 705 to obtain the amounts of correction of scan area to determine the final scan start and end positions in the subsidiary scanning direction. Similarly, IPS module 85 determines scan start position Y0 and scan end position Y1 based on the copy executing conditions notified from SYSTEM module 82 and further accesses NVM 705 to obtain the amounts of correction of scan area to determine the final output start and end positions in the main scanning direction. SYSTEM module 82 also notifies IOT module 90 of paper size over the high-speed communication line. Since copying in FP copy mode is performed with the platen cover being left open, document size detector circuit 303 is not activated and the copy paper size is determined in the following manner: if the user designates a desired size, paper of that size is selected and, if AUTOMATIC PAPER SELECTION mode is set, SYSTEM module 82 selects paper of minimum size that covers the scan area and informs IOT module 90 of that size. Although not shown, is FP is notified of any necessary information including instructions on the type of filter used and the quantity of light from the lamp. With these settings completed, SYSTEM module 82 activates the respective remotes to execute copying.

Figure 18D:
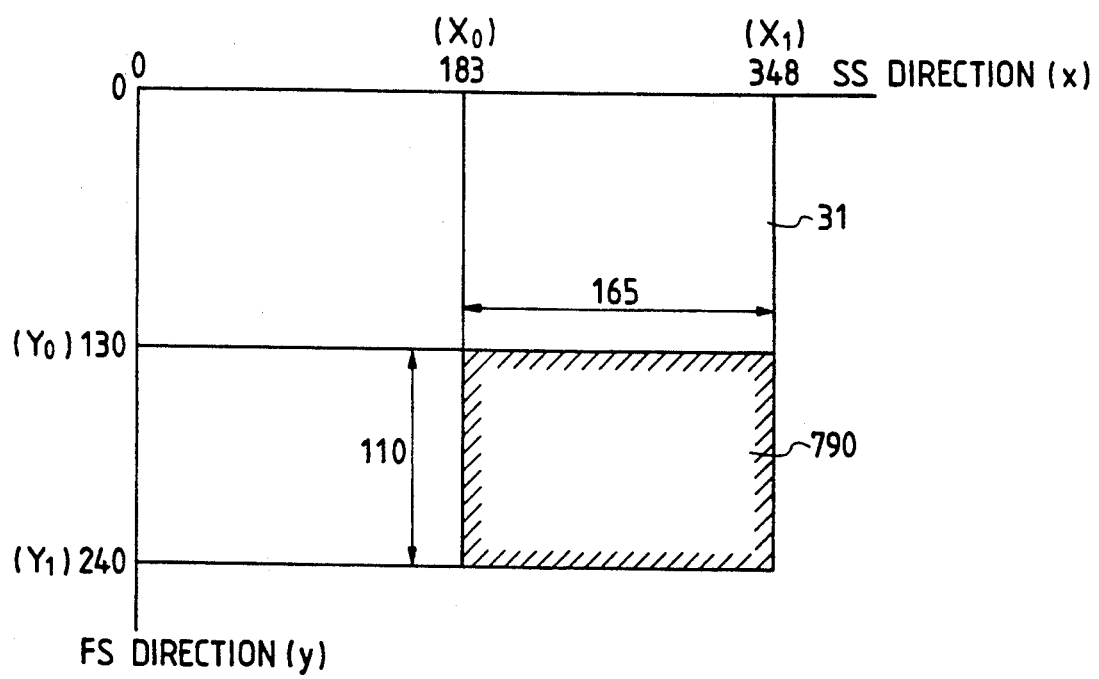
Figure 19:
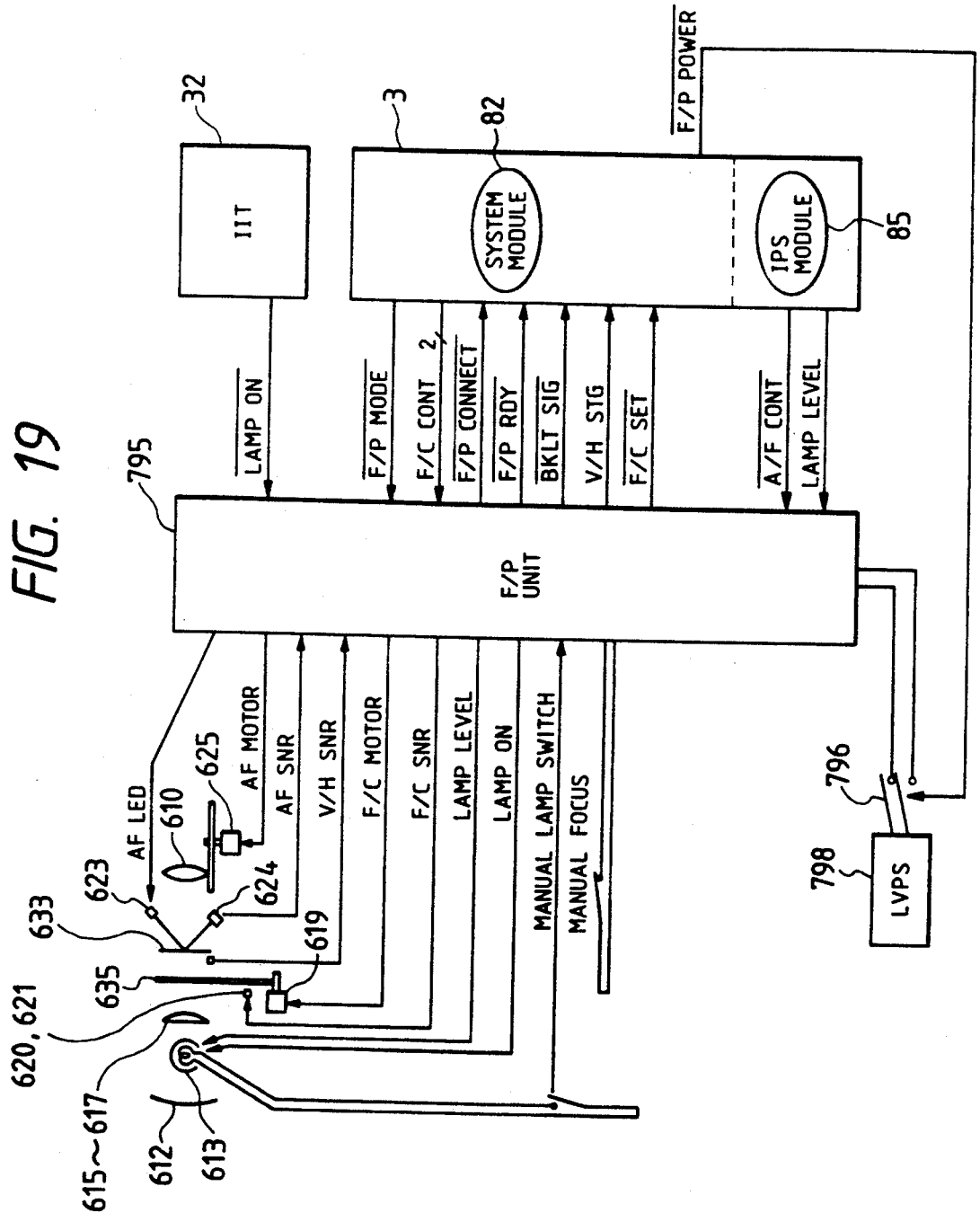
FIG. 19 is a diagram for explaining FP control check.

As shown in FIG. 18(c), NVM 705 may be loaded with four amounts of correction, X0, X1, Y0 and Y1, for each of the following five modes: 35 mm vertical projection mode; 35 mm horizontal projection mode; 6×6 size contact exposure mode; 4×5 size vertical mode; and 4×5 size horizontal mode. Therefore, if all the amounts of correction for 35 mm vertical projection mode are zero, IIT module 84 determines X0 and X1 to be 183 mm and 348 mm, respectively, whereas IPS module 85 determines Y0 and Y1 to be 130 mm and 240 mm, respectively. As a result, the scan area to be covered will be delineated by 790 in FIG. 18(d) and only the pixels within that scan area 790 will be held valid in image processing with IPS. Referring to FIG. 18(d), the position of x=0 and y=0 represents REG position, or the origin of the coordinate system for platen glass 31.

A copy of the film image can be taken in the manner described above.

In the copier under consideration, FP is installed at a predetermined position of the copier body whereas the mirror unit is installed at a predetermined position above the platen glass, so that the film image can be projected onto a predetermined position on the platen glass. In contact exposure mode, the film is placed at a predetermined position on the platen glass by means of guides. In practice, FP, mirror unit and the guides to be used in contact exposure mode, all of which are installed mechanically in the copier, are subject to inevitable mechanical or instrumental errors and the projecting position or the position in which the film is placed in contact with the platen glass are not always in agreement with design values. Data for eliminating such deviations from design values by correcting the position of registration (REG position) or scan area is the amounts of correction stored in NVM 705. These amounts of correction are set for each machine upon its delivery from factory but the settings of registration can vary due to aging and other factors. The FP registration adjustment mode under consideration is provided for the purpose of resetting the amounts of correction under these circumstances and it is executed in the manner described below.

Suppose here that the serviceman performs predetermined procedures on UI 9 and has the system enter into a DIAG mode. If he instructs for the execution of FP registration adjustment mode, a scene appears on the screen as shown in FIG. 15(b) and the currently set amounts of correction are displayed, with a request being made to enter new values for correction. Therefore, the serviceman enters new amounts of correction with a ten-keypad or by some other suitable input means and depresses "JOB PROGRAM" button to set a copy mode, followed by depressing "START" button. As a result, the entered new amounts of correction are written into NVM 705 and copying is performed over the scan area that is determined on the basis of the new amounts of correction. Hence, by examining the copy image obtained, the serviceman can check to see if the new set amounts of correction are valid.

In the FP registration correction mode under consideration, the amounts of correcting the scan area may be determined by setting all of the four parameters, X0, X1, Y0 and Y1 independently of one another. Alternatively, only X0 and Y0 that specify the origin of the scan area may be set independently of X1 and Y1 which are to be moved by the same amounts as those set automatically. Referring to the case shown in FIG. 18(d), if ±X0, ±X1, ±Y0 and ±Y1 are set to be −2 mm, +1 mm, +3 mm and −1 mm, respectively, by the former method, the scan area will range from 181 to 349 mm in the subsidiary scanning direction and range from 133 to 239 mm in the main scanning direction. If ±X0 and ±Y0 are set to be −2 mm and +3 mm, respectively, by the latter method, the scan area will range from 181 to 346 mm in the subsidiary scanning direction and range from 133 to 243 mm in the main scanning direction.

The former method of correction has the advantage that the surface of the scan area can be freely changed. The latter method is based on the idea that since the area of projection is the same, only the position of the origin need be changed with the scan end positions being moved by the same amounts of correction. The copier under discussion may adopt either method of correction. Alternatively, the copier may be so designed that the serviceman can choose whichever method he likes.

As described above, the FP registration adjustment mode under consideration is capable of compensating for the registration mismatch in FP copy mode merely by adding software and this contributes to a minimum increase in the operating cost.

(11) FP Control Check

In the copier under discussion, FP is installed at the end of the copier body and is controlled by SYSTEM module 82, IIT module 84 and IPS module 85. Thus, various interface signals are to be exchanged between FP unit having FP operating circuits mounted thereon and each of IIT 32 and CPU board 3. If those interface signals are not generated or if generated interface signals are not transmitted to the other end of communication for some reason such as wire breaks or poor contact with connectors, FP will not operate normally. Therefore, if FP does not operate normally due to a certain trouble, it is necessary to isolate the trouble by checking to see if interface signals, particularly those to be transmitted from FP unit 795 to CPU board 3 were properly generated. This is the FP control check under consideration.

The interface signals to be exchanged between FP unit 795 and each of IIT 32 and CPUT board 3 are first described below. LAMP ON signal which is supplied from IIT 32 to FP unit 795 controls lamp 613 to be turned on or off. For example, the lamp 613 will turn on if LAMP ON signal is at L level and it will turn off if the signal is at H level. Accordingly, if FP unit 795 detects the L level of LAMP ON signal, it will supply lamp 613 with a voltage of about 16 volts to turn it on. Two interface signals, FP MODE signal and FC CONT signal, are supplied to FP unit from SYSTEM module 82 in CPU board 3. FP MODE signal is generated when UI 9 selects FP copy mode and it is at L level if FP copy mode is selected whereas it is at H level if the mode is not selected. Upon detecting the L level of FP MODE signal, FP unit 795 actuates auto-focus sensor light-emitting device 623, sliding motor 625, drive motor 619, first and second position sensors 620, 621, etc. and causes them to stand by. Correction filter 635 consists of a negative-acting filter and a positive-acting filter that are mounted on a turret, and selection between the two filters depends on the value of FC CONT signal. The FC CONT signal may be composed of two bits and the positive acting filter is set if the signal level is LL and the negative acting filter is set if the signal level is HL, with FP unit being disabled if the signal level is LH or HH. Therefore, if FP unit 795 detects the LL level of FC CINT signal, it delivers FC MOTOR signal to drive motor 619 so that the positive-acting filter is set. If it detects the HL level of FC CONT signal, FP unit 795 delivers FC MOTOR signal so that the negative-acting filter is set. IPS module 82 in CPU board 3 supplies $\overline{\text{AF CONT}}$ signal and LAMP LEVEL signal to FP unit 795. $\overline{\text{AF CONT}}$ signal selects between auto-focus and non-auto-focus modes. For example, if this signal is at L level, auto-focus is performed and if it is at H level, auto-focus is not performed. Therefore, if FP unit 795 detects the L level of $\overline{\text{AF CONT}}$ signal, it sends AF MOTOR signal to sliding motor 625 so that auto-focus is performed. LAMP LEVEL signal is used to control the quantity of light emission from lamp 613 and FP unit 795 will supply the lamp with the lamp voltage indicated by LAMP LEVEL signal.

$\overline{\text{FP POWER}}$ signal is used to supply power to FP unit 795. FP unit 795 is not supplied with power unless SYSTEM module 82 delivers $\overline{\text{FP POWER}}$ signal to turn on power switch 796, whereupon low-voltage power system (LVPS) 798 will supply a predetermined line voltage to FP unit 795. The conditions for generating $\overline{\text{FP POWER}}$ signal are not critical and may be set in a desired way; for example, $\overline{\text{FP POWER}}$ signal may be generated on the condition that UI 9 selects FP copy mode, or it may be generated on the condition that the main power to the copier is turned on to activate SYSTEM module 82.

The signals described above are the interface signals that are to be supplied to FP unit 795 from IIT 32 or from SYSTEM module 82 and IPS module 85 in CPU board 3. Conversely, five interface signals, $\overline{\text{FP CONNECT}}$, $\overline{\text{FP RDY}}$, $\overline{\text{BKLT SIG}}$, V/E SIG and $\overline{\text{FC SET}}$, are supplied from FP unit 795 to SYSTEM module 82. $\overline{\text{FP CONNECT}}$ signal indicates whether FP body is installed on the copier body. For example, this signal assumes L level if FP is set, and it assumes H level if FP is not set. Therefore, SYSTEM module 82 finds FP to have been set if $\overline{\text{FP CONNECT}}$ signal is at L level, and it finds FP to have not been set if $\overline{\text{FP CONNECT}}$ signal is at H level. $\overline{\text{FP RDY}}$ signal checks to see if there is a film set in projection exposure mode and if auto-focus has been completed. For example, $\overline{\text{FP RDY}}$ signal assumes L level if the film is set and auto-focus has ended, or if the film is set and manual focus is selected, and $\overline{\text{FP RDY}}$ signal will assume H level in other cases. Therefore, upon detecting the L level of $\overline{\text{FP RDY}}$ signal, SYSTEM module 82 will recognize that FP stands by. BKLT SIG signal indicates whether lamp 613 has been manually turned on in normal document copy mode. For example, $\overline{\text{BKLT SIG}}$ signal will assume L level only when $\overline{\text{FP MODE}}$ signal is at H level (i.e., FP copy mode has not been selected by UI) and if lamp 613 has been turned on manually, and it will assume H level in other cases. The rationale of $\overline{\text{BKLT SIG}}$ signal is as follows. In projection exposure mode, the image of a document film is projected onto the platen glass and in order to make various checks including estimation of the size of projection and checking for the correctness of focusing, normal document copy mode rather than FP copy mode is selected and FP and mirror unit are set, with a white document being placed between the platen glass and the mirror unit, to project the film image onto the white film. In this case, lamp 613 has to be turned on in order to project the film image onto the white document. To this end, a back light button is provided on FP at a predetermined position. When that button is depressed, $\overline{\text{BKLT SIG}}$ signal is generated and at the same time lamp 613 is turned on. This permits the serviceman to make various checks as to whether the back light button works normally, whether lamp 613 turns on, how the film image is projected, and whether proper focus has been attained.

V/H SIG signal indicates whether the film is set vertically or horizontally in a film holder case. For example, if the film is set horizontally, the signal assumes L level and if it is set vertically, the signal assumes H level. This signal is used for SYSTEM module 82 to determine the scan area. Detection of a vertically or horizontally set film is performed in the following manner. FP is provided with two openings for film insertion, one being on top and the other on the lateral side. For vertical setting, the film is inserted from the top and, for horizontal setting, the film is inserted from the lateral side. Depending on the opening in which the film is inserted, the associated sensor will produce an output that indicates the way the film is inserted (whether it is vertical or horizontal). $\overline{\text{FC SET}}$ signal indicates whether the negative- or positive-working correction filter has been set. For example, the signal assumes L level if either one of those correction filters has been set, and in other cases, the signal assumes H level.

The interface signals described above are sent from FP unit 795 to SYSTEM module 82. As will be clear from the above description, those interface signals indicate whether the system is in a state where copying can be made in FP copy mode, so if any one of these signals is absent, copying cannot be performed in FP copy mode. Therefore, if copying cannot be accomplished in FP copy mode for some reason, a check has to be made in order to see if the necessary interface signals have been generated. The FP control check under consideration is the DIAG mode provided to meet this need.

The FP control check under consideration is performed in the following manner. Suppose that the serviceman performs predetermined procedures on UI and has the system enter into a DIAG mode. If the serviceman selects the FP control check mode, the relevant information is notified from LOW LEVEL UI module 80 to DIAG. EXEC. module 88 via MCB UI module 86. Recognizing that the selected DIAG mode is to be executed by SYS. DIAG. nodule 83, DIAG. EXEC. module 88 informs SYS. DIAG. module 83 that FP control check has been requested. In response to this information, SYS. DIAG. module 83 generates $\overline{\text{FP POWER}}$ signal and supplies FP unit 795 with power from LVPS 798. At the same time, SYS. DIAG. module 83 detects the levels at input ports of the five interface signals sent from FP unit 795 and reports the results of detection to DIAG. EXEC. module 88. As a result, the display unit of UI 9 produces a scene of the same kind as shown in FIG. 12(c), where the levels of five interface signals, $\overline{\text{FP CONNECT}}$, $\overline{\text{FP DRY}}$, $\overline{\text{BKLT SIG}}$, V/H SIG and FC SET are displayed Looking at the level of $\overline{\text{FP CONNECT}}$ signal on the screen, the serviceman can check if FP has been properly installed. If he inserts the film into the film holder case and removes it from the case, the service can check whether $\overline{\text{FP DRY}}$ signal has been correctly generated by examining the resulting change in its level. Further, the serviceman may turn on and off the back light button and by examining the resulting change in the level of $\overline{\text{BKLT SIG}}$ signal, be can check whether that signal has been properly generated. In addition, the serviceman may set the film either vertically or horizontally and by examining the resulting change in the level of V/H SIG signal, he can check whether that signal has been properly generated. Furthermore, the serviceman nay operate UI and set the negative- and positive-acting correction filters alternately and by examining the resulting change in the level of $\overline{\text{FC SET}}$ signal, he can check whether that signal has been properly generated.

As described on the foregoing pages, the FP control check under consideration enables servicemen to easily check as to whether the interface signals being sent from FP unit 795 are normal or not and this contributes to efficient servicing of the machine in a shorter period of time.

(12) FP Lamp Check

The FP lamp check under consideration is a DIAG mode that enables the serviceman to check whether lamp 613 used on FP to project the film image onto the platen glass is turned on in response to $\overline{\text{LAMP ON}}$ signal sent from IIT. By performing this DIAG mode, the serviceman can check whether any fault has occurred in lamp 613 or if there is something abnormal in the circuit for lighting lamp 613.

Suppose that the servicemen performs predetermined procedures on UI and has the system enter into a DIAG mode. If he selects the FP lamp check mode, the relevant information is notified form LOW LEVEL UI module 80 to DIAG. EXEC. module 88 via MCB UI module 86. Recognizing that the DIAG mode should be executed by SYS. DIAG. module 83, DIAG. EXEC. module 88 informs SYS. DIAG. module 83 that FP control check has been requested. In response to this information, SYS. DIAG. module 83 generates $\overline{\text{FP POWER}}$ signal and supplies FP unit 795 with power from LVPS 798. At the same time, SYS. DIAG. module 83 causes IIT module 84 to generate $\overline{\text{LAMP ON}}$ signal of a predetermined waveform. If lamp 613 turns on, it can be verified that the lamp signal circuit including lamp 613 functions normally and this permits trouble isolation from other circuits.

Figure 20A:
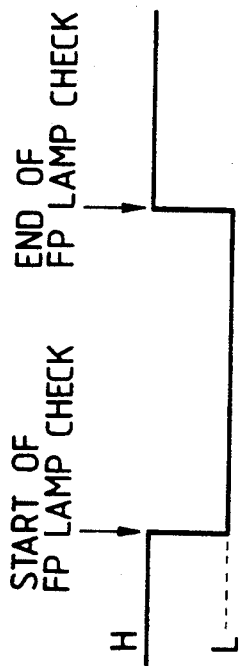
FIGS. 20(a) through 20(c) are diagrams for explaining FP lamp check.
Figure 20B:
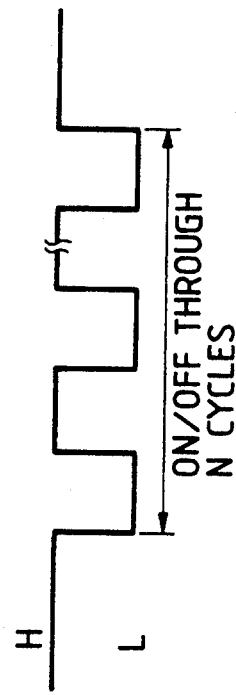
Figure 20C:
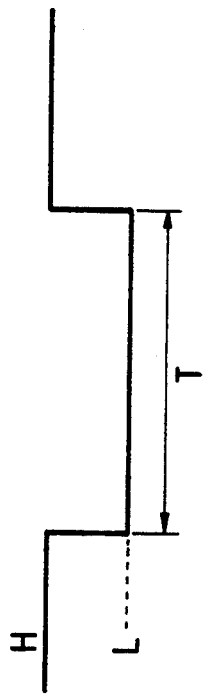

As shown in FIG. 20(a), $\overline{\text{LAMP ON}}$ signal may have such a waveform that lamp 613 will turn on when the DIAG mode under consideration has started and that it will turn off when the mode has ended. However, if lamp 613 is kept on for a prolonged time, it will become dangerously hot. Further, the DIAG mode under consideration will serve the purpose if a check can be made as to whether the lamp signal circuit functions normally or not. Hence, $\overline{\text{LAMP ON}}$ signal may have a waveform as shown in FIG. 20(b), with lamp 613 being turned on and off through N cycles at a predetermined period. If desired, lamp 613 may be turned on for a predetermined time T as shown in FIG. 20(c).

As described above, the FP lamp check mode under consideration enables servicemen to easily check whether the operation of the lamp signal circuit including lamp 613 is normal or not.

What is claimed is:

1. A diagnostics system for use with a recording apparatus comprising:
   an imaging unit having a CCD line sensor assembly mounted thereon;
   a first board for processing dot sequential color video signals from said CCD line sensor assembly to produce them as digital signals;

a second board, having a CPU mounted thereon, for converting the dot sequential color video signals from said first board into simultaneous color video signals and for performing shading correction;

a third board for performing predetermined image processing on the output from said second board;

a fourth board for receiving video signals branched from said third board at predetermined positions to perform predetermined edit processing on the received video signals which are returned to said third board at predetermined positions;

an image output terminal for receiving the output from said third board;

a film projector for projecting a film image; and a user interface, wherein said CPU mounted on said second board performs diagnosis or adjustments on said first board, said second board, said third board, said fourth board and said film projector on the condition that predetermined procedures have been taken on said user interface.

2. A diagnostics system according to claim 1 wherein said first board has an automatic gain control circuit which is supplied with a first control voltage from a first D/A converter, and an automatic offset control circuit which is supplied with a second control voltage from a second D/A converter, said CPU setting predetermined data both for the first and second D/A converters.

3. A diagnostics system according to claim 2 wherein light-emitting devices are connected to the output terminals of the first and second D/A converts, each of said light-emitting devices being operative to emit light at times when the output of the corresponding D/A converter exceeds a predetermined level.

4. A diagnostics system according to claim 3 wherein the data applied to said first and second D/A converters is in a form for generating first and second control voltages at times to operate said light-emitting devices to emit light at predetermined intervals.

5. A diagnostics system according to claim 1 wherein the input stage of said first board, as well as the input and output stages of said second board are respectively provided with a first, second and third pattern generator each for generating a predetermined pattern signal, said CPU allowing said first, second or third pattern generator to generate a predetermined pattern signal and copy said pattern signal on the condition that predetermined procedures have been taken on said user interface.

6. A diagnostics system according to claim 5 wherein said first pattern generator comprises a sawtooth wave oscillating circuit.

7. A diagnostics system according to claim 5 wherein said second pattern generator comprises a pull-down resistor connected to a predetermined bit of the output terminal of a buffer circuit provided at a first stage of said second board.

8. A diagnostics system according to claim 5 wherein said third pattern generator is adapted to generate a predetermined pattern signal by supplying predetermined data to a line memory in a shading correction circuit that is provided at the last stage of said second board.

9. A diagnostics system according to claim 8 wherein the predetermined data supplied to said line memory is capable of copying pure colors.

10. A diagnostics system according to claim 1 wherein said third board has a first bypass circuit that connects the input and output terminals of said third board and a second bypass circuit that allows video signals to bypass said fourth board, said CPU enabling either said first bypass circuit or said second bypass circuit on the condition that predetermined procedures have been taken on said user interface.

11. A diagnostics system according to claim 1 wherein said third board has a latch circuit mounted thereon for latching synchronizing signals generated during the execution of copying, said CPU being adapted to detect the levels of the respective ports of said latch circuit on the condition that predetermined procedures have been taken on said user interface.

12. A diagnostics system according to claim 1 wherein said CPU is disabled for fault detection on the condition that predetermined procedures have been taken on said user interface.

13. A diagnostics system according to claim 1 wherein said CPU manages a non-volatile memory and changes the data on threshold values for document size detection that is stored in said non-volatile memory on the condition that predetermined procedures have been taken on said user interface.

14. A diagnostics system according to claim 13 wherein gain values for said automatic gain control and offset values for said automatic offset control are stored in said non-volatile memory, said CPU changing said gain values and/or offset values on the condition that predetermined procedures have been taken on said user interface.

15. A diagnostics system according to claim 14 wherein said CPU executes copying based on the changed gain and offset values and the initial gain and offset values that have been saved from said non-volatile memory are restored in the latter at the point of time when the diagnostic mode of interest is completed.

16. A diagnostics system according to claim 13 wherein data on threshold values for color detection is stored in said non-volatile memory, said CPU changing said data on threshold values for color detection on the condition that predetermined procedures have been taken on said user interface.

17. A diagnostics system according to claim 16 wherein said data on threshold values for color detection comprises a yellow, cyan and magenta density that are set for each of predetermined numbers of registered colors, designated colors and standard colors, an upper and a lower limit being set for each of the yellow, cyan and magenta densities for detection of a red color and a maker color.

18. A diagnostics system according to claim 13 wherein data for determining as to whether correction of the density of a flesh color should be performed or not is stored in said non-volatile memory, said CPU changing said data on the condition that predetermined procedures have been taken on said user interface.

19. A diagnostics system according to claim 13 wherein data on the amount of correction for determining the scan area for projection copying with said film projector; is stored in said non-volatile memory, said CPU changing said data for the amount of correction on the condition that predetermined procedures have been taken on said user interface.

20. A diagnostics system according to claim 19 wherein said data on the amount of correction is changed for the start and end positions of main scanning, as well as for the start and end positions of subsidiary scanning.

21. A diagnostics system according to claim 19 wherein said data on the amount of correction is changed for the start position of main scanning and the start position of subsidiary scanning, with the end position of main scanning and the end position of subsidiary scanning being automatically changed by the same amounts as said start positions are changed.

22. A diagnostics system according to claim 1 wherein said film projector has a film projector unit that includes a circuit for operating said film projector and which transmits interface signals to and from said CPU, said CPU detecting the levels at input ports of interface signals reported from said film projector unit to said CPU on the condition that predetermined procedures have been taken on said user interface.

23. A diagnostics system according to claim 22 wherein said CPU generates an interface signal for turning on a lamp on said film projector on the condition that predetermined procedures have been taken on said user interface.

24. A diagnostics system according to claim 23 wherein said interface signal for turning on the lamp has such a waveform that the lamp stays lit from the start to the end of the execution of the diagnostic mode of interest.

25. A diagnostics system according to claim 23 wherein said interface signal for turning on the lamp has such a waveform that the lamp is turned on and off cyclically for a predetermined number of times at a predetermined period.

26. A diagnostics system according to claim 23 wherein said interface signal for turning on the lamp has such a waveform that the lamp stays lit for a predetermined time.

* * * * *

UNITED STATES PATENT AND TRADEMARK OFFICE
CERTIFICATE OF CORRECTION

PATENT NO. : 5,168,373
DATED : December 01, 1992
INVENTOR(S) : Hideyasu Nakamura It is certified that error appears in the above-identified patent and that said Letters Patent is hereby corrected as shown below:

Claim 3, column 51, line 31, change "converts" to --converters--.

Signed and Sealed this

Fourth Day of January, 1994

Attest:

BRUCE LEHMAN

*Attesting Officer*          *Commissioner of Patents and Trademarks*